(12) United States Patent
Tomici et al.

(10) Patent No.: US 9,894,556 B2
(45) Date of Patent: Feb. 13, 2018

(54) METHODS, SYSTEMS AND APPARATUS FOR MANAGING AND/OR ENFORCING POLICIES FOR MANAGING INTERNET PROTOCOL ("IP") TRAFFIC AMONG MULTIPLE ACCESSES OF A NETWORK

(71) Applicant: InterDigital Patent Holdings, Inc., Wilmington, DE (US)

(72) Inventors: John L. Tomici, Southold, NY (US); Prabhakar R. Chitrapu, Blue Bell, PA (US); Alexander Reznik, Pennington, NJ (US); Oscar Lopez-Torres, Naucalpan (MX); Chunxuan Ye, San Diego, CA (US); Milan Patel, Harrow (GB); Catherine M. Livet, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/239,059

(22) Filed: Aug. 17, 2016

(65) Prior Publication Data

US 2016/0381594 A1 Dec. 29, 2016

Related U.S. Application Data

(63) Continuation of application No. 13/446,685, filed on Apr. 13, 2012, now Pat. No. 9,473,986.

(Continued)

(51) Int. Cl.
*G06F 15/16* (2006.01)
*H04W 28/02* (2009.01)
(Continued)

(52) U.S. Cl.
CPC ....... *H04W 28/0268* (2013.01); *H04L 45/123* (2013.01); *H04L 45/308* (2013.01);
(Continued)

(58) Field of Classification Search
CPC ..................................................... G06F 15/173
(Continued)

(56) References Cited

U.S. PATENT DOCUMENTS 6,865,185 B1 3/2005 Patel et al.
6,937,566 B1 8/2005 Forslow
(Continued)

FOREIGN PATENT DOCUMENTS

CN 102300264 12/2011
EP 2170002 3/2010
(Continued)

OTHER PUBLICATIONS

"3rd Generation Partnership Project 2; cdma2000 Packet Data Services; Wireless Local Area Network (WLAN) Interworking Access to Operator Service and Mobility", 3GPP2 TS X.S0028-200-0 V1.0, Mar. 2007, 56 pages.

(Continued)

*Primary Examiner* — Shripal Khajuria
(74) *Attorney, Agent, or Firm* — Quasim A. Shah

(57) ABSTRACT

Methods, systems and apparatus for managing and/or enforcing one or more policies for managing internet protocol ("IP") traffic among multiple accesses of a network in accordance with a policy for managing bandwidth among the multiple accesses are disclosed. Among the methods, systems and apparatus is a method that may include obtaining performance metrics associated with the multiple accesses. The method may also include adapting one or more rules of one or more the policies for managing IP traffic among the plurality of accesses based, at least in part, on the (Continued)

performance metrics and the policy for managing bandwidth among the plurality of accesses. The method may further include managing IP traffic associated with at least one wireless transmit and/or receive unit ("WTRU") among the plurality of accesses responsive to the adapted rules.

28 Claims, 31 Drawing Sheets

Related U.S. Application Data

(60) Provisional application No. 61/475,023, filed on Apr. 13, 2011, provisional application No. 61/546,543, filed on Oct. 12, 2011.

(51) Int. Cl.
*H04L 12/721* (2013.01)
*H04L 12/725* (2013.01)
*H04W 28/16* (2009.01)
*H04M 15/00* (2006.01)
*H04W 76/02* (2009.01)
*H04W 88/02* (2009.01)

(52) U.S. Cl.
CPC ............ *H04L 45/38* (2013.01); *H04M 15/66* (2013.01); *H04W 28/0289* (2013.01); *H04W 28/16* (2013.01); *H04W 76/022* (2013.01); *H04W 88/02* (2013.01)

(58) Field of Classification Search
USPC ........................................................ 709/224
See application file for complete search history.

(56) References Cited

U.S. PATENT DOCUMENTS

| | | | |
|---|---|---|---|
| 7,324,553 B1 | 1/2008 | Varier et al. | |
| 8,130,655 B2 | 3/2012 | Foottit et al. | |
| 8,346,225 B2 | 1/2013 | Raleigh | |
| 8,416,690 B2 | 4/2013 | Zhao et al. | |
| 8,681,739 B1 | 3/2014 | Zhao et al. | |
| 8,743,829 B2 | 6/2014 | Guan et al. | |
| 9,197,378 B2 | 11/2015 | Ikeda et al. | |
| 9,225,726 B2 | 12/2015 | Liang et al. | |
| 9,585,054 B2 | 2/2017 | Ahmad et al. | |
| 2002/0114305 A1 | 8/2002 | Oyama et al. | |
| 2004/0132436 A1 | 7/2004 | Dupont et al. | |
| 2004/0166835 A1 | 8/2004 | Johansson et al. | |
| 2004/0205752 A1 | 10/2004 | Chou et al. | |
| 2004/0215828 A1 | 10/2004 | Li et al. | |
| 2005/0058131 A1 | 3/2005 | Samuels et al. | |
| 2007/0097926 A1 | 5/2007 | Liu et al. | |
| 2007/0259673 A1 | 11/2007 | Willars et al. | |
| 2008/0020775 A1 | 1/2008 | Willars | |
| 2008/0212583 A1 | 9/2008 | Rey et al. | |
| 2008/0214189 A1 | 9/2008 | Taaghol | |
| 2009/0069025 A1 | 3/2009 | Pischella | |
| 2009/0279522 A1 | 11/2009 | Leroy et al. | |
| 2009/0305701 A1 | 12/2009 | Giaretta et al. | |
| 2010/0034089 A1 | 2/2010 | Kovvali et al. | |
| 2010/0040024 A1 | 2/2010 | Wu | |
| 2010/0067400 A1 | 3/2010 | Dolganow et al. | |
| 2010/0080172 A1 | 4/2010 | Jin et al. | |
| 2010/0081444 A1 | 4/2010 | Jin et al. | |
| 2010/0208698 A1 | 8/2010 | Lu et al. | |
| 2010/0208706 A1 | 8/2010 | Hirano et al. | |
| 2010/0216462 A1 | 8/2010 | Aso et al. | |
| 2010/0216484 A1 | 8/2010 | Zhou et al. | |
| 2011/0007706 A1 | 1/2011 | Shaikh | |
| 2011/0038304 A1 | 2/2011 | Lin et al. | |
| 2011/0044279 A1 | 2/2011 | Johansson et al. | |
| 2011/0055572 A1 | 3/2011 | Vogt et al. | |
| 2011/0090794 A1 | 4/2011 | Cherian et al. | |
| 2011/0103260 A1 | 5/2011 | Jeyatharan et al. | |
| 2011/0158171 A1 | 6/2011 | Centonza et al. | |
| 2011/0170408 A1 | 7/2011 | Furbeck et al. | |
| 2011/0170410 A1 | 7/2011 | Zhao et al. | |
| 2011/0170517 A1 | 7/2011 | Bakker et al. | |
| 2011/0194535 A1 | 8/2011 | Johansson et al. | |
| 2011/0280130 A1 | 11/2011 | Foottit et al. | |
| 2012/0002608 A1 | 1/2012 | Vesterinen et al. | |
| 2012/0044804 A1* | 2/2012 | Rahman ................. H04L 45/22 370/225 |
| 2012/0069797 A1 | 3/2012 | Lim et al. | |
| 2012/0079559 A1 | 3/2012 | Reznik et al. | |
| 2012/0147750 A1 | 6/2012 | Pelletier et al. | |
| 2012/0173661 A1 | 7/2012 | Mahaffey et al. | |
| 2012/0178416 A1 | 7/2012 | Miklos et al. | |
| 2012/0188895 A1 | 7/2012 | Punz et al. | |
| 2012/0201137 A1* | 8/2012 | Le Faucheur ..... H04W 28/0226 370/235 |
| 2012/0246325 A1 | 9/2012 | Pancorbo Marcos et al. | |
| 2012/0257499 A1* | 10/2012 | Chatterjee ......... H04W 28/0284 370/232 |
| 2012/0314568 A1 | 12/2012 | Tan et al. | |
| 2012/0327779 A1 | 12/2012 | Gell et al. | |
| 2013/0028193 A1 | 1/2013 | Rommer et al. | |
| 2013/0058275 A1 | 3/2013 | Melia et al. | |
| 2013/0121206 A1 | 5/2013 | Turanyi et al. | |
| 2013/0201824 A1 | 8/2013 | Venkatachalam et al. | |
| 2013/0242754 A1 | 9/2013 | Shaikh et al. | |
| 2014/0003391 A1 | 1/2014 | Vesterinen et al. | |
| 2014/0126362 A1 | 5/2014 | Ogura | |
| 2014/0219248 A1 | 8/2014 | Reddiboyana et al. | |
| 2014/0341109 A1 | 11/2014 | Cartmell et al. | |
| 2015/0016299 A1 | 1/2015 | Zhang et al. | |

FOREIGN PATENT DOCUMENTS

| | | |
|---|---|---|
| EP | 2192799 | 6/2010 |
| EP | 2448194 | 5/2012 |
| JP | 2006-101400 | 4/2006 |
| JP | 2013-530640 | 7/2013 |
| WO | WO-2004/084500 | 9/2004 |
| WO | WO-2010/022374 | 2/2010 |
| WO | WO-2010/072652 A1 | 7/2010 |
| WO | WO-2010/080966 | 7/2010 |
| WO | WO-2010/102652 | 9/2010 |
| WO | WO-2010/121191 | 10/2010 |
| WO | WO-2011/039985 | 4/2011 |
| WO | WO-2011/069096 A2 | 6/2011 |
| WO | WO-2011/149533 | 12/2011 |
| WO | WO-2012/018824 | 2/2012 |
| WO | WO-2012/033774 A2 | 3/2012 |
| WO | WO-2013/134669 | 9/2013 |

OTHER PUBLICATIONS

"3rd Generation Partnership Project; Technical Specification Group Core Network and Terminals; Access Network Discovery and Selection Function (ANDSF) Management Object (MO) (Release 10)", 3GPP TS 24.312 V10.2.1, Apr. 2011, 153 pages.

"3rd Generation Partnership Project; Technical Specification Group Core Network and Terminals; Access Network Discovery and Selection Function (ANDSF); Management Object (MO); Release 10", 3GPP TS 24.312 V10.3.0, Jun. 2011, 155 pages.

"3rd Generation Partnership Project; Technical Specification Group Core Network and Terminals; Access to the 3GPP Evolved Package Core (EPC) via non-3GPP access networks; Stage 3 (Release 10)", 3GPP TS 24.302 V10.4.0, Jun. 2011, 58 pages.

"3rd Generation Partnership Project; Technical Specification Group Core Network and Terminals; Access to the 3GPP Evolved Packet Core (EPC) via non-3GPP access networks; Stage 3 (Release 10)", 3GPP TS 24.302 V10.3.1, Apr. 2011, 57 pages.

"3rd Generation Partnership Project; Technical Specification Group Core Network and Terminals; Access to the 3GPP Evolved Packet Core (EPC) via non-3GPP access networks; Stage 3 (Release 10)", 3GPP TS 24.302 V10.7.0, Mar. 2012, 58 pages.

(56) References Cited

OTHER PUBLICATIONS

"3rd Generation Partnership Project; Technical Specification Group Core Network and Terminals; Access to the 3GPP Evolved Packet Core (EPC) via non-3GPP access networks; Stage 3 (Release 8)", 3GPP TS 24.302 V8.10.0, Sep. 2011, 50 pages.

"3rd Generation Partnership Project; Technical Specification Group Core Network and Terminals; Access to the 3GPP Evolved Packet Core (EPC) via non-3GPP access networks; Stage 3 (Release 9)", 3GPP TS 24.302 V9.7.0, Sep. 2011, 53 pages.

"3rd Generation Partnership Project; Technical Specification Group Core Network and Terminals; IP multimedia call control protocol based on Session Initiation Protocol (SIP) and Session Description Protocol (SDP); Stage 3 (Release 10)", 3GPP TS 24.229 V10.3.0, Mar. 2011, 702 pages.

"3rd Generation Partnership Project; Technical Specification Group Core Network and Terminals; Non-Access-Stratum (NAS) protocol for Evolved Packet System (EPS); Stage 3 (Release 8)", 3GPP TS 24.301 V8.10.0, Jun. 2011, 277 pages.

"3rd Generation Partnership Project; Technical Specification Group Core Network and Terminals; Policy and Charging Control over Gx/Sd reference point (Release 11)", 3GPP TS 29.212 V11.1.0, Jun. 2011, 152 pages.

"3rd Generation Partnership Project; Technical Specification Group Core Network and Terminals; Proxy Mobile IPv6 (PMIPv6) based Mobility and Tunnelling protocols; Stage 3 (Release 10)", 3GPP TS 29.275 V10.2.0, Jun. 2011, 72 pages.

"3rd Generation Partnership Project; Technical Specification Group Core Network and Terminals; Proxy Mobile IPv6 (PMIPv6) based Mobility and Tunnelling protocols; Stage 3 (Release 9)", 3GPP TS 29.275 V9.5.0, Jun. 2011, 71 pages.

"3rd Generation Partnership Project; Technical Specification Group Core Network and Terminals; Proxy Mobile IPv6 (PMIPv6) based Mobility and Tunnelling protocols; Stage 3 (Release 9)", 3GPP TS 29.275 V9.2.0, Jun. 2010, 74 pages.

"3rd Generation Partnership Project; Technical Specification Group Core Network and Terminals; User Data Convergence (UDC); Technical realization and information flows; Stage 2 (Release 10)", 3GPP TS 23.335 V10.0.0, Mar. 2011, 39 pages.

"3rd Generation Partnership Project; Technical Specification Group Core Network and Terminals; User Data Convergence (UDC); Technical realization and information flows; Stage 2 (Release 9)", 3GPP TS 23.335 V9.3.0, Dec. 2010, 39 pages.

"3rd Generation Partnership Project; Technical Specification Group Radio Access Network; Evolved Universal Terrestrial Radio Access Network (E-UTRAN); S1 Application Protocol (S1AP) (Release 8)", 3GPP TS 36.413 V8.10.0, Jun. 2010, 217 pages.

"3rd Generation Partnership Project; Technical Specification Group Radio Access Network; Evolved Universal Terrestrial Radio Access Network (E-UTRAN); S1 Application Protocol (S1AP) (Release 10)", 3GPP TS 36.413 V10.5.0, Mar. 2012, 255 pages.

"3rd Generation Partnership Project; Technical Specification Group Radio Access Network; Evolved Universal Terrestrial Radio Access Network (E-UTRAN); S1 Application Protocol (S1AP) (Release 9)", 3GPP TS 36.413 V9.8.0, Dec. 2011, 243 pages.

"3rd Generation Partnership Project; Technical Specification Group Radio Access Network; Physical layer; Measurements (FDD) (Release 10)", 3GPP TS 25.215 V10.0.0, Mar. 2011, 23 pages.

"3rd Generation Partnership Project; Technical Specification Group Services and System Aspects; 3GPP System Architecture Evolution (SAE); Security aspects of non-3GPP accesses (Release 10)", 3GPP TS 33.402 V10.3.0, Mar. 2012, 52 pages.

"3rd Generation Partnership Project; Technical Specification Group Services and System Aspects; 3GPP system to Wireless Local Area Network (WLAN) interworking; System description (Release 9)", 3GPP TS 23.234 V9.0.0, Dec. 2009, 84 pages.

"3rd Generation Partnership Project; Technical Specification Group Services and System Aspects; Architecture enhancements for non-3GPP accesses (Release 10)", 3GPP TS 23.402 V10.3.0, Mar. 2011, 227 pages.

"3rd Generation Partnership Project; Technical Specification Group Services and System Aspects; Architecture enhancements for non-3GPP accesses (Release 10)", 3GPP TS 23.402 V10.1.0, Sep. 2010, 227 pages.

"3rd Generation Partnership Project; Technical Specification Group Services and System Aspects; Architecture enhancements for non-3GPP accesses (Release 10)", 3GPP TS 23.402 V10.2.1, Jan. 2011, 228 pages.

"3rd Generation Partnership Project; Technical Specification Group Services and System Aspects; Architecture enhancements for non-3GPP accesses (Release 10)", 3GPP TS 23.402 V10.7.0, Mar. 2012, 232 pages.

"3rd Generation Partnership Project; Technical Specification Group Services and System Aspects; Architecture enhancements for non-3GPP accesses (Release 8)", 3GPP TS 23.402 V8.10.0, Mar. 2012, 199 pages.

"3rd Generation Partnership Project; Technical Specification Group Services and System Aspects; Architecture enhancements for non-3GPP accesses (Release 9)", 3GPP TS 23.402 V9.5.0, Jun. 2010, 200 pages.

"3rd Generation Partnership Project; Technical Specification Group Services and System Aspects; Architecture enhancements for non-3GPP accesses (Release 9)", 3GPP TS 23.402 V9.12.0, Mar. 2012, 200 pages.

"3rd Generation Partnership Project; Technical Specification Group Services and System Aspects; Data Identification in ANDSF (DIDA) (Release 11)", 3GPP TR 23.8xy V0.1.0, Apr. 2011, 8 pages.

"3rd Generation Partnership Project; Technical Specification Group Services and System Aspects; Feasibility study on 3GPP system to Wireless Local Area Network (WLAN) interworking (Release 9)", 3GPP TR 22.934 V9.0.0, Dec. 2009, 30 pages.

"3rd Generation Partnership Project; Technical Specification Group Services and System Aspects; Feasibility study on 3GPP system to Wireless Local Area Network (WLAN) interworking (Release 9)", 3GPP TR 22.934 V9.1.0, Sep. 2010, 30 pages.

"3rd Generation Partnership Project; Technical Specification Group Services and System Aspects; Feasibility study on user plane congestion management (Release 12)", 3GPP TR 22.805 V12.1.0, Dec. 14, 2012, 36 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 10)", 3GPP TS 23.401 V10.0.0, Jun. 2010, 261 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 10)", 3GPP TS 23.401 V10.4.0, Jun. 2011, 281 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 9)", 3GPP TS 23.401 V9.5.0, Jun. 2010, 259 pages.

"3rd Generation Partnership Project; Technical Specification Group Services and System Aspects; General Packet Radio Service (GPRS); Service description; Stage 2 (Release 9)", 3GPP TS 23.060 V9.5.0, Jun. 2010, 298 pages.

"3rd Generation Partnership Project; Technical Specification Group Services and System Aspects; Generic Authentication Architecture (GAA); Access to network application functions using Hypertext Transfer Protocol over Transport Layer Security (HTTPS)", 3GPP TS 33.222 V10.0.1, Dec. 2011, 22 pages.

"3rd Generation Partnership Project; Technical Specification Group Services and System Aspects; Generic Authentication Architecture (GAA); Generic Bootstrapping Architecture (GBA) (Release 10)", 3GPP TS 33.220 V10.1.0, Mar. 2012, 75 pages.

"3rd Generation Partnership Project; Technical Specification Group Services and System Aspects; Generic Authentication Architecture (GAA); Support for subscriber certificates (Release 10)", 3GPP TS 33.221 V10.0.0, Mar. 2011, 25 pages.

"3rd Generation Partnership Project; Technical Specification Group Services and System Aspects; IP flow mobility and seamless Wire-

(56) References Cited

OTHER PUBLICATIONS less Local Area Network (WLAN) offload; Stage 2 (Release 10)", 3GPP TS 23.261 V10.0.0, Jun. 10, 2010, 20 pages.
"3rd Generation Partnership Project; Technical Specification Group Services and System Aspects; IP flow mobility and seamless Wireless Local Area Network (WLAN) offload; Stage 2 (Release 10)", 3GPP TS 23.261 V10.2.0, Mar. 2012, 22 pages.
"3rd Generation Partnership Project; Technical Specification Group Services and System Aspects; IP flow mobility and seamless Wireless Local Area Network (WLAN) offload; Stage 2 (Release 10)", 3GPP TS 23.261 V10.1.0, Sep. 2010, 22 pages.
"3rd Generation Partnership Project; Technical Specification Group Services and System Aspects; IP Flow Mobility and seamless WLAN offload; Stage 2 (Release 10)", 3GPP TS 23.261 V0.3.0, Mar. 2010, 20 pages.
"3rd Generation Partnership Project; Technical Specification Group Services and System Aspects; IP Multimedia Subsystem (IMS); Stage 2 (Release 11)", 3GPP TS 23.228 V11.0.0, Mar. 2011, 272 pages.
"3rd Generation Partnership Project; Technical Specification Group Services and System Aspects; Mobility between 3GPP-Wireless Local Area Network (WLAN) interworking and 3GPP systems (Release 10)", 3GPP TS 23.327 V10.0.0, Mar. 2011, 27 pages.
"3rd Generation Partnership Project; Technical Specification Group Services and System Aspects; Mobility between 3GPP-Wireless Local Area Network (WLAN) interworking and 3GPP systems (Release 9)", 3GPP TS 23.327 V9.0.0, Dec. 2009, 27 pages.
"3rd Generation Partnership Project; Technical Specification Group Services and System Aspects; Multi access PDN connectivity and IP flow mobility (Release 9)", 3GPP TR 23.861 V1.3.0, Sep. 2009, 49 pages.
"3rd Generation Partnership Project; Technical Specification Group Services and System Aspects; Policy and charging control architecture (Release 10)", 3GPP TS 23.203 V10.0.0, Jun. 2010, 126 pages.
"3rd Generation Partnership Project; Technical Specification Group Services and System Aspects; Policy and charging control architecture (Release 11)", 3GPP TS 23.203 V11.1.0, Mar. 2011, 136 pages.
"3rd Generation Partnership Project; Technical Specification Group Services and System Aspects; Policy and charging control architecture (Release 11)", 3GPP TS 23.203 V11.2.0, Jun. 2011, 142 pages.
"3rd Generation Partnership Project; Technical Specification Group Services and System Aspects; Policy and charging control architecture (Release 11)", 3GPP TS 23.203 V11.3.0, Sep. 2011, 167 pages.
"3rd Generation Partnership Project; Technical Specification Group Services and System Aspects; Policy and charging control architecture (Release 9)", 3GPP TS 23.203 V9.5.0, Jun. 2010, 123 pages.
"3rd Generation Partnership Project; Technical Specification Group Services and System Aspects; Study on Policy solutions and enhancements (Release 10)", 3GPP TR 23.813 V0.5.0, Feb. 2011, 40 pages.
"3rd Generation Partnership Project; Technical Specification Group Services and System Aspects; Study on Policy solutions and enhancements (Release 11)", 3GPP TR 23.813 V11.0.0, Jun. 2011, 41 pages.
"Email Thread Re: [MEXT] Text for Binding Update Race condition issue", Mobile IPv6 Extensions, Apr. 6, 2009, 5 pages.
"Examination Notification", Taiwanese Patent Application No. 102125682, dated Oct. 14, 2016, 3 pages.
"Examination Notification (English Translation)", Taiwanese Patent Application No. 102125682, dated Oct. 14, 2016, 3 pages.
"International Preliminary Report on Patentability from the International Preliminary Examining Authority", International Application No. PCT/US2014/011099, dated Jan. 16, 2015, 16 pages.
"International Search Report and the Written Opinion of the International Searching Authority", International Application No. PCT/US2013/026550, dated May 21, 2013, 10 pages.
"International Search Report and Written Opinion of the International Search Authority", International Application No. PCT/US2012/057068, dated Feb. 8, 2013, 14 pages.
"International Search Report and Written Opinion of the International Searching Authority", International Application No. PCT/US2014/011099, dated Apr. 15, 2014, 12 pages.
"International Search Report and Written Opinion of the International Searching Authority", International Application No. PCT/US2012/033560, dated Jul. 19, 2012, 14 pages.
"International Search Report and Written Opinion of the International Searching Authority", International Application No. PCT/US2011/050577, dated Sep. 19, 2012, 18 pages.
"Invitation to Pay Additional Fees and Partial International Search", International Application No. PCT/US2013/046174, dated Oct. 10, 2013, 5 pages.
"Invitation to Pay Additional Fees and Partial International Search", International Application No. PCT/US2011/050577, dated Jan. 19, 2012, 6 pages.
"Invitation to Pay Additional Fees and Partial International Search", International Application No. PCT/US2013/051029, dated Nov. 27, 2013, 7 pages.
"New WID for Data identification in ANDSF", 3GPP Tdoc SP-110084, 3GPP TSG SA Meeting #51 Kansas City, USA, Mar. 21-23, 2011, 5 pages.
"Official Notice of Rejection", Japanese Patent Application No. 2015-523244, dated Feb. 2, 2016, 6 pages.
"Official Notice of Rejection (English Translation)", Japanese Patent Application No. 2015-523244, dated Feb. 2, 2016, 7 pages.
"Patent Abstracts of Japan", JP 2006-101400, dated Apr. 13, 2006, 1 page.
"United States Office Action", U.S. Appl. No. 13/944,077, dated Jun. 16, 2016, 25 pages.
"United States Office Action", U.S. Appl. No. 14/376,973, dated Mar. 30, 2016, 36 pages.
"WID for Study on User plane congestion management", 3GPP Tdoc S2-113383, 3GPP SA WG2 Meeting #85 Naantali, Finland, Jul. 11-15, 2011, 5 pages.
"WID for Study on User plane congestion management", 3GPP Tdoc S2-113752, 3GPP SA WG2 Meeting #85 Naantali, Finland, Jul. 11-15, 2011, 5 pages.
"Written Opinion of the International Preliminary Examining Authority", International Application No. PCT/US2013/026550, dated Jun. 3, 2014, 10 pages.
"Written Opinion of the International Preliminary Examining Authority", International Application No. PCT/US2012/057068, dated Oct. 17, 2013, 7 pages.
Alcatel-Lucent, "Policy based terminal triggered, ANDSF decided access selection", 3GPP Tdoc S2-081658, 3GPP TSG SA WG2 Architecture—S2 Meeting #63, Athens, Greece, Feb. 18-22, 2008, 6 pages.
Bernardos, C.J., "Proxy Mobile IPv6 Extensions to Support Flow Mobility", draft-bernardos-netext-pmipv6-flowmob-03 (work in progress), Mar. 14, 2011, 20 pages.
China Mobile, "Interface/Network Selection based on UE detected Network Information", 3GPP Tdoc S2-113264; 3GPP SA WG2 Meeting #86, Naantali, Finland, Jul. 11-15, 2011, 2 pages.
China Mobile, et al., "Policy control based on network condition", 3GPP Tdoc S2-105228, 3GPP TSG WG2 Meeting #81, Prague, Czech Republic, Oct. 11-15, 2010, 4 pages.
Das, S., et al., "DHCPv4 and DHCPv6 Options for Access Network Discovery and Selection Function (ANDSF) Discovery", The Internet Engineering Task Force (IETF) Request for Comment (RFC) 6153, Feb. 2011, 7 pages.
Huawei, "Discussion on H(e)NB LIPA/SIPTO management requirements", 3GPP Tdoc S5-101780, 3GPP TSG-SA5 (Telecom Management) SA5 Meeting #72, Jul. 12-16, 2010, 3 pages.
I2R, "eICIC for HeNB UL and MUE DL based on HeNB UL Measurement", 3GPP Tdoc R1-104732, 3GPP TSG RAN WG1 Meeting #62;, Madrid, Spain, Aug. 23-27, 2010, 5 pages.
IEEE, "Part 11: Wireless LAN Medium Access Control (MAC) and Physical Layer (PHY) Specifications, Amendment 9: Interworking with External Networks", IEEE Std 802.11u-2011, Feb. 25, 2011, 208 pages.

(56) References Cited

OTHER PUBLICATIONS

Johnson, D., et al., "Mobility Support in IPv6", The Internet Engineering Task Force (IETF) Request for Comment (RFC) 3775, Jun. 2004, 165 pages.
LG Electronics, "Traffic steering across multiple PDN connections over 3GPP access", 3GPP Tdoc S2-105026, 3GPP TSG SA WG2 Meeting # 81 Prague, Czech Republic, Oct. 11-15, 2010, 5 Pages.
Mark, Brian, et al., "A Multipath Flow Routing Approach for Increasing Throughput in the Internet", George Mason University, Dept. of Electrical and Computer Engineering, Aug. 2007, 4 pages.
Melia, T., "Logical Interface Support for multi-mode IP Hosts", draft-melia-netext-logical-interface-support-01, Jul. 5, 2010, 20 pages.
Nokia Siemens Networks, "On X2 Signaling for TDM eICIC in Macro+Pico Scenarios", 3GPP Tdoc R3-103555, 3GPP TSG RAN WG3 #70 Meeting, Jacksonville, United States, Nov. 15-19, 2010, 4 pages.
Open Mobile Alliance, "OMA Device Management Representation Protocol", OMA-TS-DM RepPro-V2_0-20101011-D, Oct. 11, 2010, 76 pages.
Shehada, Mohammed, "Overview of 3GPP Study Item UPCON: User Plane Congestion Control (TR 22.805 V0.2.0 (Feb. 2012))", 38th Meeting of the VDE/ITG group 5.2.4 "Mobility in IP-based networks", Mar. 13, 2012, 19 pages.
Sklower, "The PPP Multilink Protocol (MP)", The Internet Engineering Task Force (IETF) Request for Comment (RFC) 1990, Aug. 1996, 23 pages.
Soliman, H., et al., "Flow Bindings in Mobile IPv6 and NEMO Basic Support", draft-ietf-mext-flow-binding-01 (work in progress), Feb. 13, 2009, 31 pages.
Soliman, H., et al., "Flow Bindings in Mobile IPv6 and NEMO Basic Support", draft-ietf-mext-flow-binding-04 (work in progress), Nov. 9, 2009, 37 pages.
Soliman, H., et al., "Flow Bindings in Mobile IPv6 and NEMO Basic Support", draft-ietf-mext-flow-binding-06 (work in progress), Mar. 1, 2010, 39 pages.
Soliman, H., "Mobile IPv6 Support for Dual Stack Hosts and Routers", The Internet Engineering Task Force (IETF) Request for Comment (RFC) 5555, Jun. 2009, 41 pages.
Swetina, Joerg, et al., "Use Cases for User Plane Congestion Management (UPCON)", 3GPP Tdoc S1-113149, Sep. 6, 2011, 11 pages.
Tansir, Ahmed, et al., "Multi Access Data Network Connectivity and IP Flow Mobility in Evolved Packet System (EPS)", Wireless Communications and Networking Conference (WCNC) 2010, IEEE, Piscataway, NJ; USA, Apr. 18, 2010, 6 pages.
Tsirtsis, G., et al., "Traffic Selectors for Flow Bindings", draft-ietf-mext-binary-ts-02 (work in progress), Dec. 16, 2009, 18 Pages.
Tsirtsis, G., et al., "Traffic Selectors for Flow Bindings", draft-ietf-mext-binary-ts-04 (work in progress), Feb. 26, 2010, 19 pages.
Wakikawa, Ryuji, et al., "Multiple Care-of Addresses Registration", The Internet Engineering Task Force (IETF) Request for Comment (RFC) 5648, Oct. 2009, 36 pages.
"U.S. Appl. No. 12/684,227", filed Jan. 8, 2010.
"U.S. Appl. No. 13/820,724", filed Sep. 6, 2011.
"U.S. Appl. No. 13/446,685", filed Apr. 13, 2012.
"U.S. Appl. No. 13/944,077", filed Jul. 17, 2013.
"U.S. Appl. No. 14/376,973", filed Feb. 16, 2013.
"U.S. Appl. No. 14/408,133", filed Jun. 17, 2013.
"U.S. Appl. No. 14/720,739", filed May 23, 2015.
"U.S. Appl. No. 14/759,818", filed Jan. 10, 2014.
"U.S. Appl. No. 15/056,512", filed Feb. 29, 2016.
"United States Office Action", U.S. Appl. No. 14/759,818, dated Jan. 11, 2017, 13 pages.
"United States Office Action", U.S. Appl. No. 15/056,512, dated Feb. 1, 2017, 24 pages.
"Notice of Allowance", U.S. Appl. No. 14/376,973, dated Jun. 21, 2017, 6 pages.
"United States Office Action", U.S. Appl. No. 15/427,523, dated May 3, 2017, 16 pages.
"United States Office Action", U.S. Appl. No. 14/408,133, dated Jun. 22, 2017, 53 pages.
"English Language Abstract", Chinese Patent Application No. 102300264, Dec. 28, 2011, 1 page.
"First Notification of Office Action", Chinese Patent Application No. 201380038480.4, dated Jul. 24, 2017, 19 pages.
"First Notification of Office Action (English Translation)", Chinese Patent Application No. 201380038480.4, dated Jul. 24, 2017, 12 pages.
"Notice of Allowance", U.S. Appl. No. 14/759,818, dated Nov. 22, 2017, 9 pages.

* cited by examiner

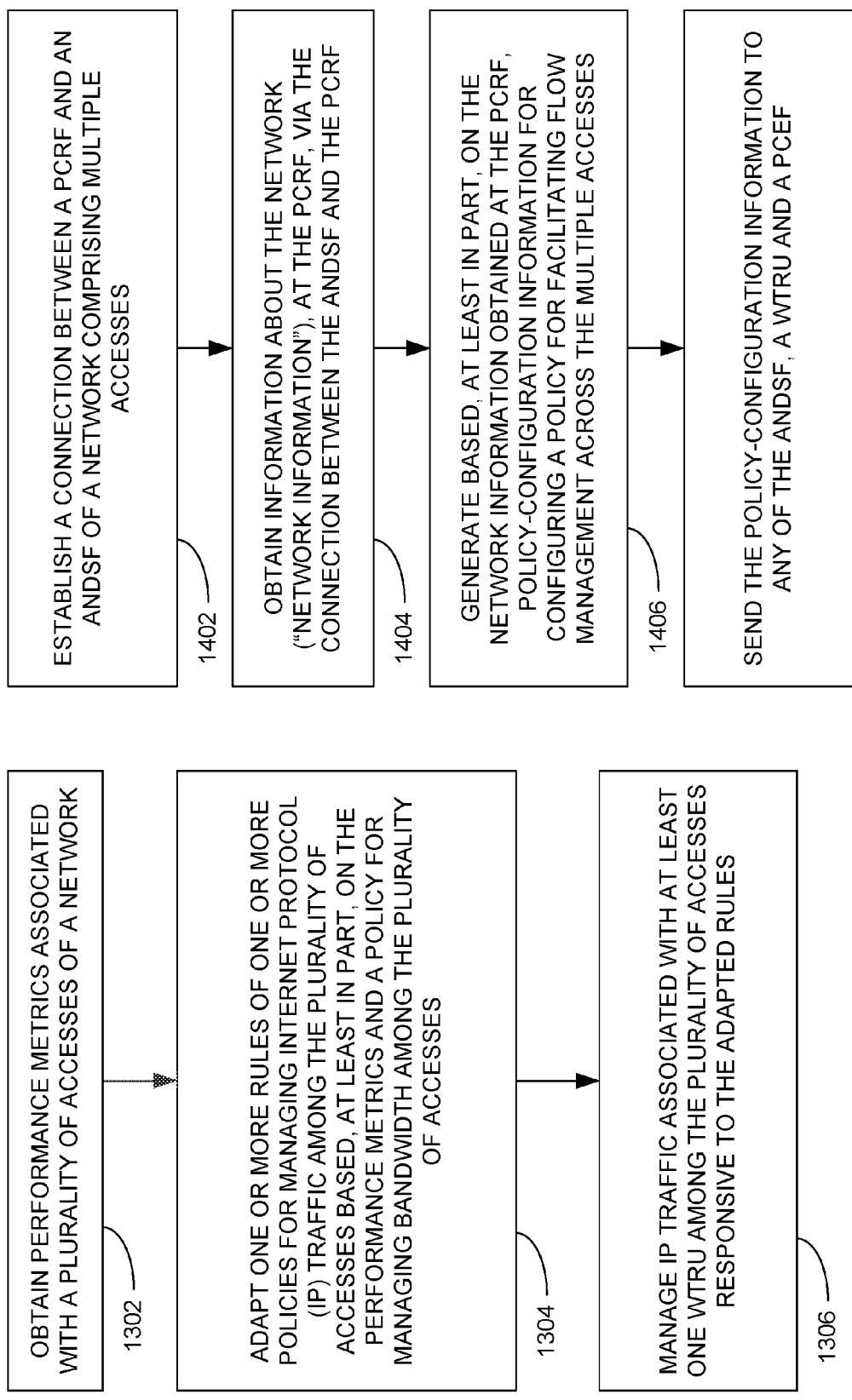

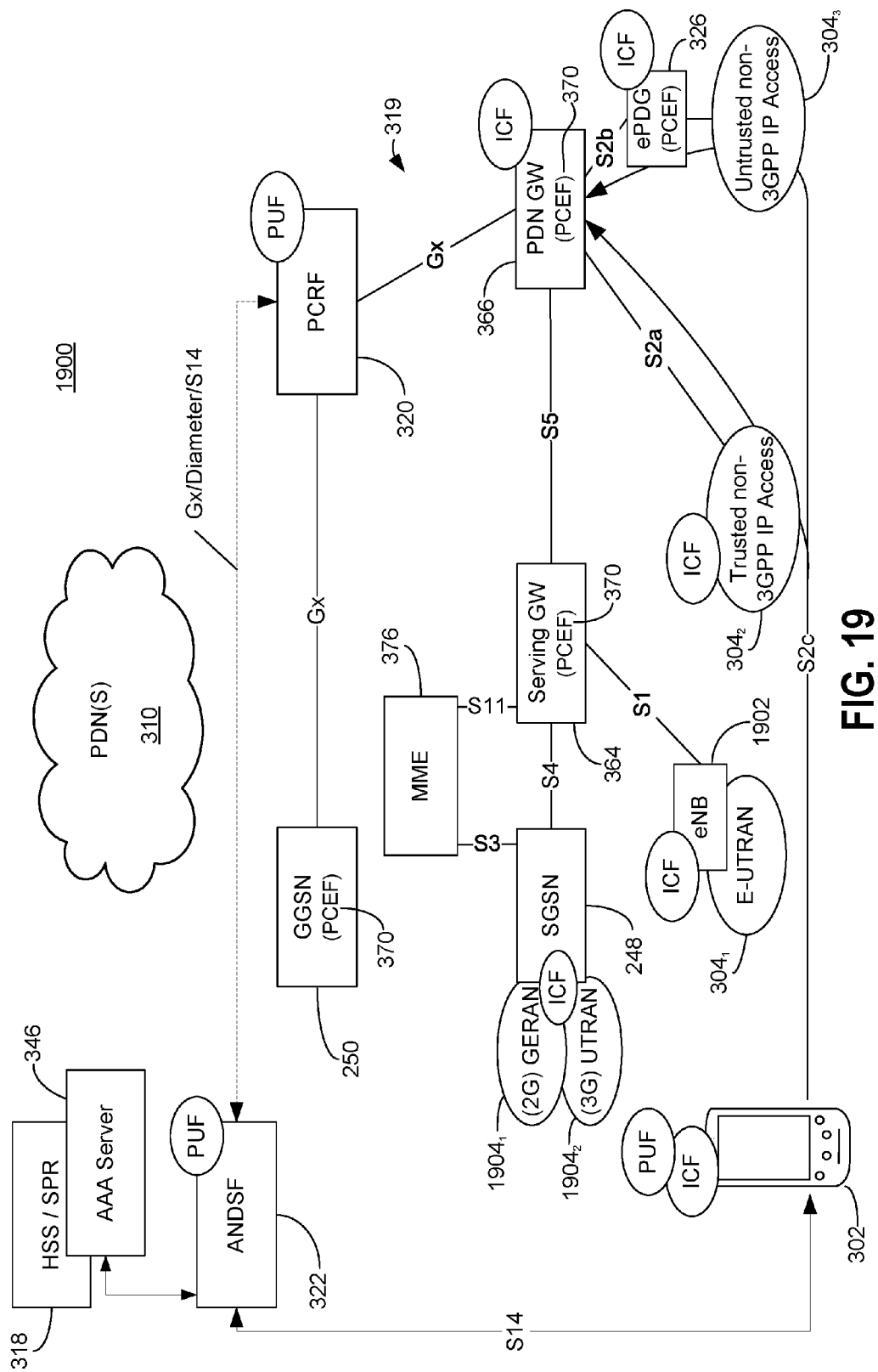

| ENTITY | EXAMPLE INFORMATION TYPES | DESCRIPTION (Examples of the corresponding information types may include...) |
|---|---|---|
| ANDSF | UE LOCATION INFORMATION | A geo-location and/or a specific access network area, such as, e.g., any of a PLMN; Location, Routing, and/or Tracking Area; Cell; etc. |
| | ACCESS NETWORK DISCOVERY INFORMATION | Any type(s), location(s), etc. of corresponding access network(s) (ANs); and the like. |
| | INTER SYSTEM MOBILITY POLICIES (ISMP) | Any of an access priority; policy validity area and/or time period; rule priority; and the like. |
| | INTER SYSTEM ROUTING POLICIES (ISRP) | Any of an access point name (APN); IP-flow description; routing rule; policy validity APN, area, and/or time period; rule priority and the like. |
| | VENDOR-SPECIFIC INFORMATION | Any of vendor specified information |
| ICF/ eANDSF | APPLICATION AND/OR TRAFFIC INFORMATION | Any of:<br>(i) an IP-flow description, such as, e.g., a 5-tuple (may have one for each IP flow, sub-flow, etc.);<br>(ii) type of application;<br>(iii) application expected QoS;<br>(iv) application performance metric, such as, e.g., error rate, retransmission rate, video rate, packet transfer delay, etc.; and<br>(v) the like. |
| | MOBILITY INFORMATION | Information about UE mobility, such as, e.g., and indication of whether the UE is static, in motion, at a high/low speed, etc. |
| | RADIO ACCESS INFORMATION | A set or collection of radio parameters for a radio interface, such as, e.g., any of throughput, link packet error rate, neighbor ssid(s), QoS, and the like. May have a set or collection of radio parameters for each radio interface. Each set or collection may include the same or different parameters, and such may depend on the radio type. |
| | LINK CHANGE INFORMATION | An indication or multiple indications of a change in a radio link, such as, e.g., whether a (new and/or existing) radio is any of turned on, turned off, active, etc. |
| | UE CAPABILITIES | An indication of RAT(s) available at the UE. |
| | MISCELLANEOUS PLATFORM INFORMATION | An indication or indications of any type of device, battery level, etc. |

FIG. 20 – TABLE 1

| EXAMPLE INFORMATION TYPES | DESCRIPTION (Examples of the corresponding information types may include...) |
|---|---|
| CELL SPECIFIC INFORMATION | Information associated with network provisioning, such as, for example, SSID, cell size, hot-spot, security, etc. Such information may be (i) static, (ii) setup during the network provisioning; (iii) deployment specific and/or (iv) based on the RAN type |
| LOAD AND/OR CONGESTION INFORMATION | A metric (e.g., level) and/or information indicative of any of load, congestion, etc. of the cell. |

TABLE 2: ICF INFORMATION (RAN SIDE)

FIG. 21

| EXAMPLE INFORMATION TYPES | DESCRIPTION (Examples of the corresponding information types may include...) |
|---|---|
| TUNNEL COUNT | A count of tunnels supported by the network. Granularity of the report may include any of a total count; a per-UE count (e.g., when more than one tunnel per UE exists); a per access point (per-AP) count; a per access network (per-AN) count; and the like. |
| TUNNEL PROPERTIES | A set or collection of properties of a tunnel. The set or collection may include, e.g., a protocol used to establish the tunnel, whether the tunnel is secure, etc. May have a set or collection of properties for each tunnel. |
| TUNNEL PERFORMANCE METRIC(S) | One or more metrics and/or other information associated with performance of a (or each tunnel), such as, e.g., any of end-to-end latency; average tunnel throughput; instantaneous tunnel throughput; peak tunnel throughput; tunnel error rate (in terms of packet loss, for instance); tunnel lifetime (e.g., an indication of how long the tunnel has been in existence); and the like. |

TABLE 3: UE-TO-GW TUNNEL INFORMATION

FIG. 22

| EXAMPLE INFORMATION TYPES | DESCRIPTION (Examples of the corresponding information types may include...) |
|---|---|
| TUNNEL PROPERTIES | For each tunnel, certain properties may be reportable. Examples include: protocol used to establish a tunnel, whether the tunnel is secure, etc. |
| TUNNEL PERFORMANCE METRIC | Examples include: end-to-end latency; any of average, instantaneous and peak tunnel throughput; tunnel error rate (e.g., in terms of packet loss); and total UE/flow count per tunnel (e.g., as an average or instantaneous metric); etc. |

TABLE 4: ACCESS NETWORK TUNNEL

FIG. 23

| Information | Description |
|---|---|
| Backhaul properties | Properties that can be reportable, e.g. the IP protocol used (IPv4, IPv6, PMIP...), whether it is secure, expected bandwidth, etc. (We note that this information is typically known by the network already). |
| Backhaul load | Report the load (low, medium, high, not available) of the backhaul. |
| Backhaul Architecture information | In certain advanced backhaul designs, it is possible that the backhaul is a composite construction, made up of multiple physical paths, such as Wi-Fi and Cable. It may also be a composite of TDM schemes of transport (e.g. T1/E1) or Packet schemes. Finally, the backhaul may also be a mesh network (e.g. of Wi-Fi links). In such cases, the backhaul properties would include the number of constituent links, and their individual properties, as well as routing information in case of backhaul mesh networks (e.g. number of hops), latency, jitter, etc. |

BACKHAUL INFORMATION

FIG. 24 – TABLE 5

METHODS, SYSTEMS AND APPARATUS FOR MANAGING AND/OR ENFORCING POLICIES FOR MANAGING INTERNET PROTOCOL ("IP") TRAFFIC AMONG MULTIPLE ACCESSES OF A NETWORK

CROSS-REFERENCE TO RELATED APPLICATIONS

This application is a continuation of U.S. patent application Ser. No. 13/446,685, filed 13 Apr. 2012, which claims the benefit of U.S. Provisional Pat. Appln. Ser. Nos. 61/475,023, filed on 13 Apr. 2011, and 61/546,543, filed on 12 Oct. 2011; all of which are incorporated herein by reference.

BACKGROUND

Field

This application is related to wireless communications.

Related Art

In its initial response to an ever increasing bandwidth crunch, the wireless industry has been experimenting with a number of ad-hoc data offloading and tariffing schemes—some offering partial temporary relief, but no scalability for broad deployments. More efficient and robust solutions will be required to meet the future data needs of, potentially, billions of Smartphone users around the world.

Experts envision a "Network of Networks" with connectivity and mobility across multiple access networks (such as, for example, cellular and Wi-Fi accesses), a richer multimedia experience and new mobile broadband capabilities. It is believed by the inventors of the presently claimed and/or unclaimed subject matter herein that innovative policy-driven bandwidth management ("BWM") and radio-agnostic technologies across devices (e.g., mobile devices), networks, and services are among a multitude of advancements in the art likely needed for achieving such vision.

SUMMARY

Provided herein are methods, systems and apparatus for managing and/or enforcing one or more policies for managing internet protocol ("IP") traffic among multiple accesses of a network, including accesses employing different radio access technologies ("RAT"), in accordance with a policy for managing bandwidth among the multiple accesses ("BWM policy"). Such methods, systems and apparatus may be useful, for instance, for performing multi-access flow management, and/or bandwidth aggregation among the multiple accesses.

Among the methods, systems and apparatus is a method that may include obtaining performance metrics associated with the multiple accesses. The method may also include adapting one or more rules of one or more the policies for managing IP traffic among the plurality of accesses based, at least in part, on the performance metrics and the policy for managing bandwidth among the plurality of accesses. The method may further include managing IP traffic associated with at least one wireless transmit and/or receive unit ("WTRU") among the plurality of accesses responsive to the adapted rules.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the Figures indicate like elements, and wherein:

FIG. 13 is a flow diagram illustrating an example process for managing and/or enforcing polices for IP traffic management among multiple accesses;

FIG. 14 is a flow diagram illustrating an example process for enabling interaction among access network discovery and selection function ("ANDSF") and policy control and charging ("PCC") entities;

FIG. 19 is a block diagram illustrating an example of a communications system in which one or more disclosed embodiments may be implemented and/or carried out;

FIG. 20 is a chart illustrating Table 1 listing various information that may be collected by the WTRU ICF and/or an ANDSF configured in accordance with various embodiments;

FIG. 21 is a chart illustrating Table 2 listing information that may be collected at cell edge and be reported to any of a ANDSF and a PCRF;

FIG. 22 is a chart illustrating Table 3 listing information that may be collected from WTRU-to-GW tunnels and be reported to any of a ANDSF and a PCRF;

FIG. 23 is a chart illustrating Table 4 listing information that be collected at the CN gateway from each access network tunnel;

FIG. 24 is a chart illustrating Table 5 listing backhaul information that may be collected, reported and/or used for managing IP traffic;

DETAILED DESCRIPTION

Figure 1A:
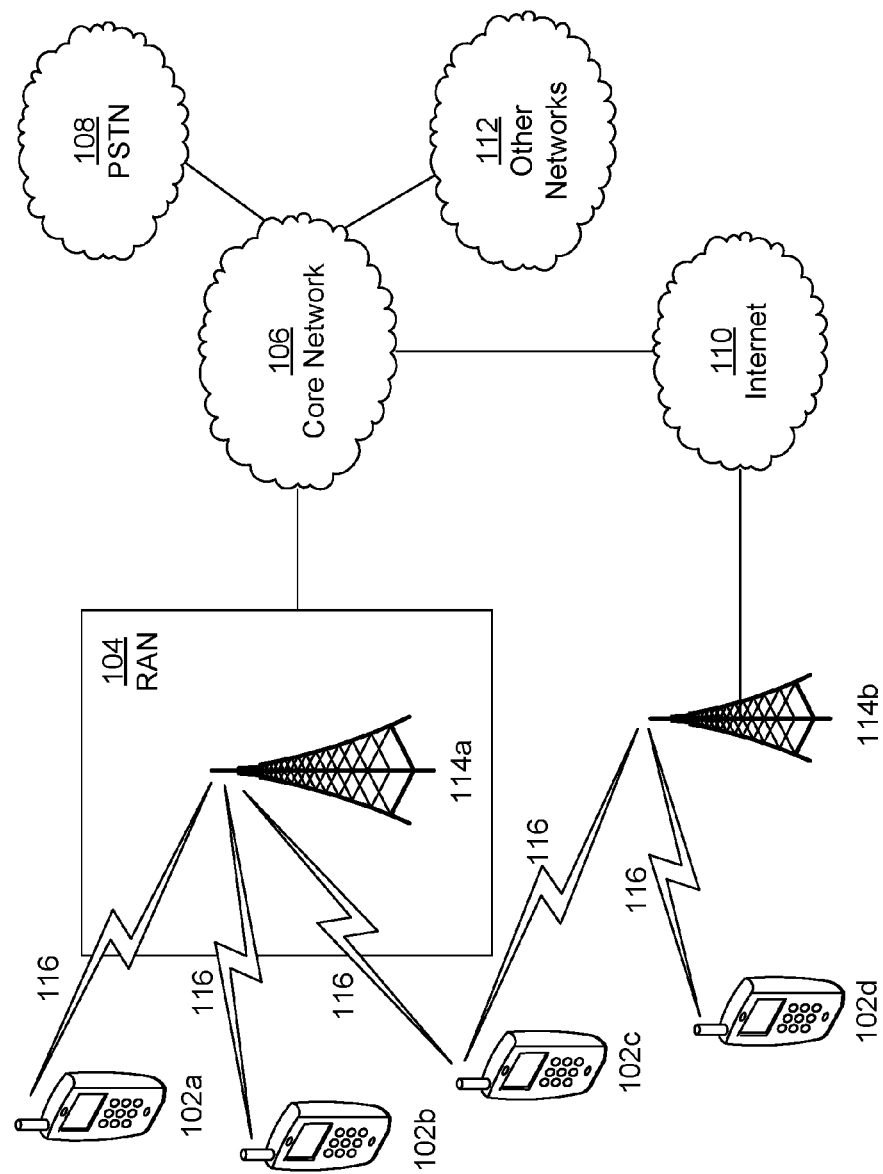
FIG. 1A is a block diagram illustrating an example of a communications system in which one or more disclosed embodiments may be implemented and/or carried out.

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples disclosed herein.

Moreover, in the following description, various standards are referred to and/or incorporated by reference herein in connection with the embodiments and/or examples disclosed herein. Unless otherwise indicated, details of the various standards (incorporated herein or otherwise) are set forth as examples. Incorporated by reference herein are 3rd Generation Partnership Project ("3GPP") Technical Specification ("TS") 23.203, v11.1.0, (Policy and Charging Control ("PCC") architecture); 3GPP TS 23.261, v10.1.0, (Internet Protocol ("IP") flow mobility ("IFOM") and Seamless WLAN Offload); 3GPP TS 23.402, v10.3.0, (Architecture Enhancements for Non-3GPP Accesses); 3GPP TS 24.302, v10.3.1, (Access to the 3GPP Evolved Packet Core (EPC) via non-3GPP access); 3GPP TS 23.401, v10.4.0, (GPRS Enhancements for E-UTRAN); 3GPP TS 24.312, v10.3.0, (Access Network Discovery and Selection Function ("ANDSF") Management Object (MO)); 3GPP Technical Report ("TR") 23.861, v1.3.0, (Multi-access PDN Connectivity and IFOM); and 3GPP TR 23.813, v0.5.0 (2011-02) (Study on Policy Solutions and Enhancements (Release 10)).

Overview

Policy management is already viewed as an important tool used by operators to control how their networks get utilized, manage user behavior and maximize whatever measure or metric of network utility is used by the operator (e.g. capacity). In general, policies may be characterized by specification of rules and expected enforcement of the rules by various entities in the network. The rules may be statically configured or dynamically updated; specified by end users, network operators, or service providers; and may be considered as guidelines or mandates depending on particular policy enforcement requirements.

As data consumption by mobile/wireless users continues to increase, and as the range of mobile network access options grows to include different radio access technologies (cellular, Wi-Fi, WiMAX, etc.), different backhaul mechanisms (TDM, carrier Ethernet, fiber/cable/DSL, etc.), and different network infrastructures (mobile core networks, public Internet, IMS networks, private networks including enterprise and residential, etc.), operator policies become a critical tool for managing all available network resources in a way that benefits network operators while maintaining the expected user experience for subscribers.

The role of measurement in such policies is ever increasing. In various embodiments, a policy rule does not fully specify a network elements behavior, rather it does so conditional on some set of observations, measurements, metrics of what is going on in the network. This flexibility is may allow operators to maintain centralized control over the network, while distributing actual real-time decision making across the network to reduce complexity and control signaling overhead.

Provided herein are methods, systems and apparatus for managing and/or enforcing one or more policies for managing internet protocol ("IP") traffic among multiple accesses of a network, including accesses employing different radio access technologies ("RAT"), in accordance with a policy for managing bandwidth among the multiple accesses ("BWM policy"). Policy-driven BWM across the multiple accesses may rely on intelligent and comprehensive policies that are driven by numerous criteria, such as, for example, operator policy, user subscription parameters, application requirements, network conditions, location, available power, etc.

The methods, systems and apparatus provided herein may be useful, for instance, for performing multi-access flow management, and/or bandwidth aggregation among the multiple accesses. Among the methods, systems and apparatus provided herein is a method that may include obtaining performance metrics associated with the multiple accesses. The method may also include adapting one or more rules of one or more the policies for managing IP traffic among the plurality of accesses based, at least in part, on the performance metrics and the policy for managing bandwidth among the plurality of accesses. The method may further include managing IP traffic associated with at least one wireless transmit and/or receive unit ("WTRU") among the plurality of accesses responsive to the adapted rules.

Also provided herein are methods, systems and apparatus for enabling interaction among access network discovery and selection function ("ANDSF") and policy control and charging ("PCC") entities. As described in more detail below, such interaction may also be useful for multi-access flow management, and/or bandwidth aggregation among the multiple accesses.

Example Architecture

FIGS. 1A-1E (collectively "FIG. 1") are block diagrams illustrating an example communications system 100 in which one or more disclosed embodiments may be implemented. The communications system 100, for example, may be suitable for implementing and/or carrying out, for example, any of bandwidth management ("BWM"), bandwidth aggregation ("BWA"), flow management, internet protocol ("IP") flow mobility ("IFOM"), and the like to IP traffic that may be carried over, across and/or among (collectively "among") multiple accesses and/or access systems; some, all or none of which use different access technologies.

The IFOM may be based on IP-level protocols. Such IP-level protocols may include, for example, general-packet-radio service ("GPRS") tunneling protocol ("GTP"), and/or protocols based and/or built on Mobile-IP ("MIP"), such as, for example, dual-stack MIP version 6 ("DSMIPv6") and proxy MIP version 6 ("PMIPv6").

In general, the communications system 100 defines an architecture that supports multiple access systems over which multiple wireless users may access and/or exchange (e.g., send and/or receive) content, such as voice, data, video, messaging, broadcast, etc. The architecture also supports having two or more of the multiple access systems use and/or be configured in accordance with different access technologies. This way, the communications system 100 may service both wireless users capable of using a single access technology, and wireless users capable of using multiple access technologies.

The multiple access systems may include respective accesses; each of which may be, for example, an access network, access point and the like. In various embodiments, all of the multiple accesses may be configured with and/or employ the same radio access technologies ("RATs"). Some or all of such accesses ("single-RAT accesses") may be owned, managed, controlled, operated, etc. by either (i) a single mobile network operator and/or carrier (collectively "MNO") or (ii) multiple MNOs. In various embodiments, some or all of the multiple accesses may be configured with and/or employ different RATs. These multiple accesses ("multi-RAT accesses") may be owned, managed, controlled, operated, etc. by either a single MNO or multiple MNOs.

The communications system 100 may enable the wireless users to access the content through sharing and/or distribution of system resources, including, for example, wireless bandwidth. The communications system 100, for example, may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

The communications system 100 may include wireless transmit/receive units ("WTRUs") 102a, 102b, 102c and 102d, a radio access network ("RAN") 104, a core network 106, a public switched telephone network ("PSTN") 108, an internet 110, and other networks 112, though it will be appreciated that the disclosed embodiments contemplate any number of WTRUs, base stations, networks, and/or network elements.

Each of the WTRUs 102a, 102b, 102c and 102d may be any type of device configured to operate and/or communicate in a wireless environment. By way of example, the WTRUs 102a, 102b, 102c and 102d may be configured to transmit and/or receive wireless signals, and may include user equipment ("UE"), a mobile station, a fixed or mobile subscriber unit, a pager, a cellular telephone, a personal digital assistant ("PDA"), a Smartphone, a laptop, a netbook, a personal computer, a wireless sensor, consumer electronics, and the like.

The communications system 100 may also include a base station 114a and a base station 114b. Each of the base stations 114a, 114b may be any type of device configured to wirelessly interface with at least one of the WTRUs and 102d, and may facilitate access to one or more communication networks, such as the core network 106, the internet 110, and/or the other networks 112. The base stations 114a, 114b may be, for example, any of a base transceiver station ("BTS"), Node-B ("NB"), evolved NB ("eNB"), Home NB ("HNB"), Home eNB ("HeNB"), enterprise NB ("ENT-NB"), enterprise eNB ("ENT-eNB"), a site controller, an access point ("AP"), a wireless router, and the like. Although depicted as a single element, each of the base stations 114a, 114b may nonetheless include any number of communicatively coupled base stations and/or network elements. The term "H/E(e)NB" is used hereinafter, for simplicity of exposition, to refer to a HNB, a HeNB, an ENT-NB, an ENT-eNB, a base station of a trusted-3GPP access network or the like.

The base station 114a may be part of the RAN 104. As described in more detail below, the RAN 104 may include base stations and/or network elements other than the base station 114a (not shown), such as a base station controller ("BSC"), a radio network controller ("RNC"), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output ("MIMO") technology and, therefore, may utilize multiple transceivers for each sector of the cell.

The base stations 114a, 114b may communicate with one or more of the WTRUs 102a, 102b, 102c and 102d over an air interface 116, which may be any suitable wireless communication link (e.g., radio frequency ("RF"), microwave, infrared ("IR"), ultraviolet ("UV"), visible light, etc.). The air interface 116 may be established using any suitable RAT.

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b and 102c may implement a radio technology such as Universal Mobile Telecommunications System ("UMTS") Terrestrial Radio Access ("UTRA"), which may establish the air interface 116 using wideband CDMA ("WCDMA"). WCDMA may include communication protocols such as High-Speed Packet Access ("HSPA") and/or Evolved HSPA ("HSPA+"). HSPA may include High-Speed DL Packet Access ("HSDPA") and/or High-Speed UL Packet Access ("HSUPA").

In another embodiment, the base station 114a and the WTRUs 102a, 102b and 102c may implement a radio technology such as Evolved UMTS Terrestrial Radio Access ("E-UTRA"), which may establish the air interface 116 using Long Term Evolution ("LTE") and/or LTE-Advanced ("LTE-A").

In other embodiments, the base station 114a and the WTRUs 102a, 102b and 102c may implement radio technologies such as IEEE 802.16 (i.e., Worldwide Interoperability for Microwave Access ("WiMAX")), CDMA2000, CDMA2000 12X, CDMA2000 EV-DO, Interim Standard 2000 ("IS-2000"), Interim Standard 95 ("IS-95"), Interim Standard 856 ("IS-856"), Global System for Mobile communications ("GSM"), Enhanced Data rates for GSM Evolution ("EDGE"), GSM EDGE ("GERAN"), and the like.

The base station 114b in FIG. 1A may be a wireless router, Home Node-B, Home eNodeB, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network ("WLAN"). In another embodiment, the base station 114b and the WTRUs 102c, 102d may implement a radio technology such as IEEE 802.15 to establish a wireless personal area network ("WPAN"). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol ("VoIP") services to one or more of the WTRUs 102a, 102b, 102c and 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c and 102d to access the PSTN 108, the Internet 110, and/or other networks 112. The PSTN 108 may include circuit-switched telephone networks that provide plain old telephone service ("POTS"). The Internet 110 may include a global system of interconnected computer networks and devices that use common communication protocols, such as the transmission control protocol ("TCP"), user datagram protocol ("UDP") and the internet protocol ("IP") in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c and 102d of the communications system 100 may include multi-mode capabilities, i.e., the WTRUs 102a, 102b, 102c and 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
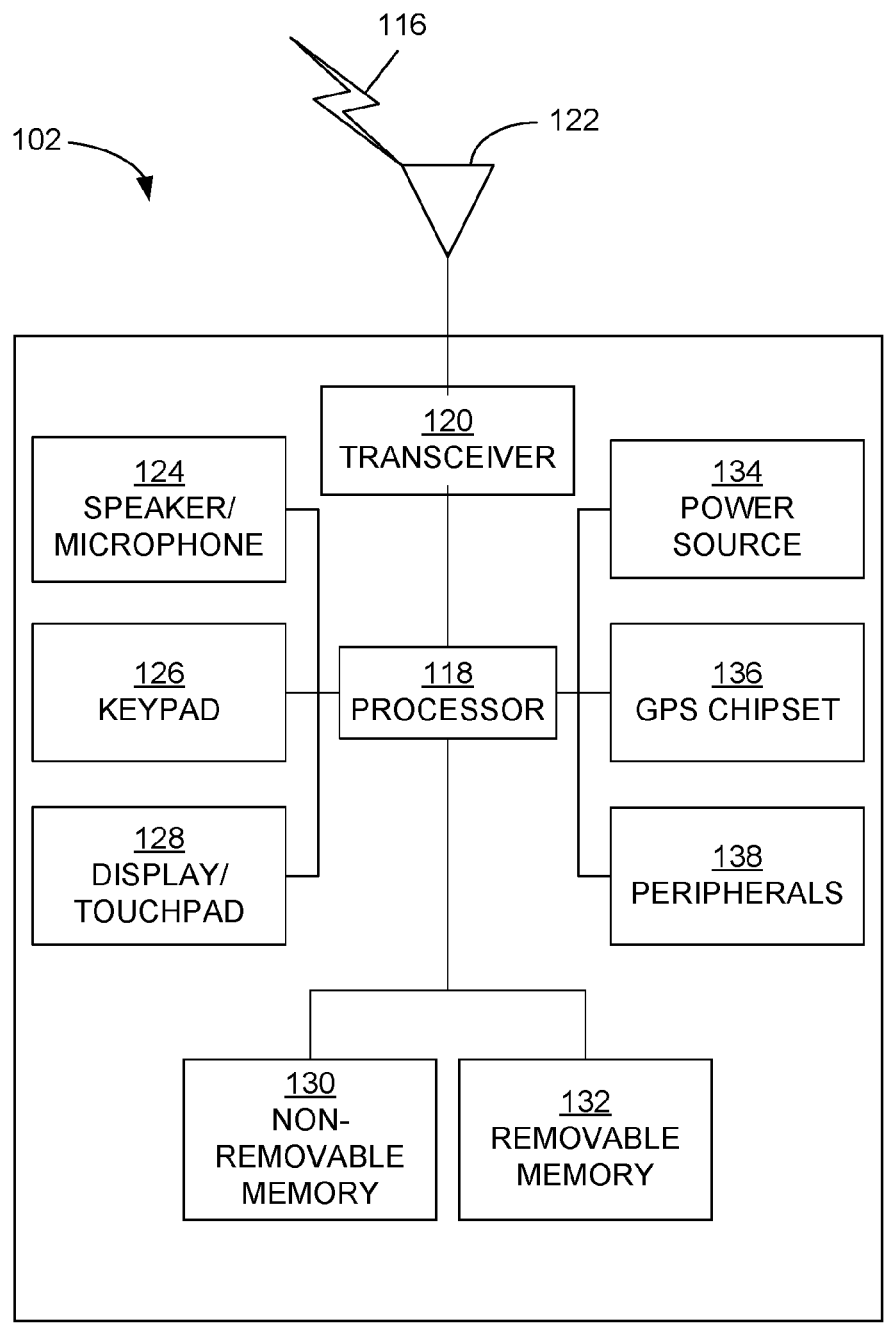
FIG. 1B is a block diagram illustrating an example wireless transmit/receive unit (WTRU) that may be used within the communications system illustrated in FIG. 1A.

FIG. 1B is a block diagram illustrating example architecture of a WTRU, such as the WTRU 102 of FIG. 1A. As shown in FIG. 1B, the WTRU 102 may include a processor 118, a transceiver 120, a transmit/receive element 122, a speaker/microphone 124, a keypad 126, a display/touchpad 128, a non-removable memory 130, a removable memory 132, a power source 134, a global positioning system ("GPS") chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor ("DSP"), a plurality of microprocessors, one or more microprocessors in association with a DSP core, a controller, a microcontroller, Application Specific Integrated Circuits ("ASICs"), Field Programmable Gate Array ("FPGAs") circuits, any other type of integrated circuit ("IC"), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display ("LCD") display unit or organic light-emitting diode ("OLED") display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory ("RAM"), read-only memory ("ROM"), a hard disk, or any other type of memory storage device. The removable memory 132 may include a subscriber identity ("ID") module ("SIM") card, a memory stick, a secure digital ("SD") memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium ("NiCd"), nickel-zinc ("NiZn"), nickel metal hydride ("NiMH"), lithium-ion ("Li-ion"), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus ("USB") port, a vibration device, a television transceiver, a hands free headset, a Bluetooth® module, a frequency modulated ("FM") radio unit, a digital music player, a media player, a video game player module, an Internet browser, and the like.

Figure 1C:
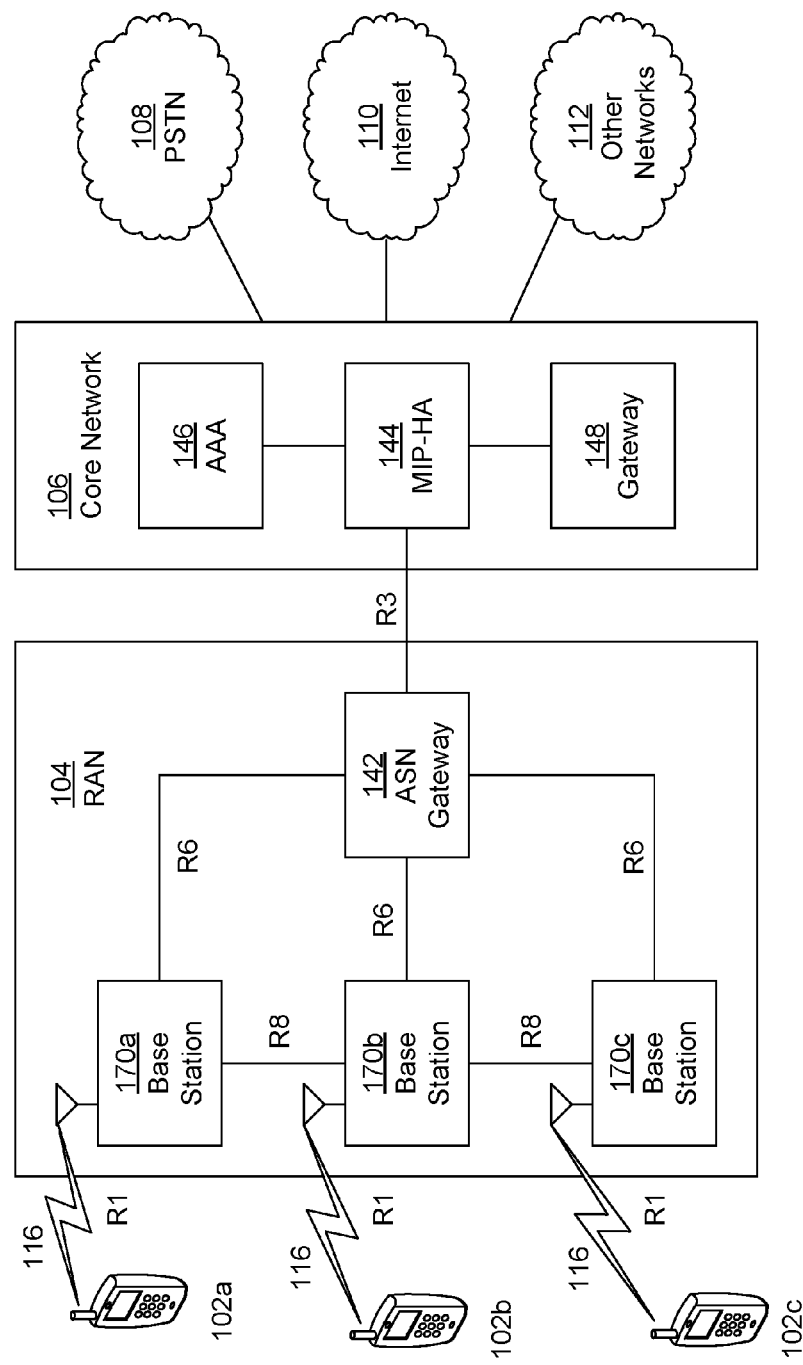
FIG. 1C is a block diagram illustrating an example radio access network ("RAN") and an example core network ("CN") that may be used within the communications system illustrated in FIG. 1A.

FIG. 1C is a block diagram illustrating example architectures of the RAN 104 and core network 106 according to an embodiment. The RAN 104 may be an access service network ("ASN") that employs IEEE 802.16 radio technology to communicate with the WTRUs 102a, 102b and 102c over the air interface 116. As will be further discussed below, the communication links between the different functional entities of the WTRUs 102a, 102b and 102c, the RAN 104, and the core network 106 may be defined as reference points.

As shown in FIG. 1C, the RAN 104 may include base stations 140a, 140b and 140c, and an ASN gateway 142, though it will be appreciated that the RAN 104 may include any number of base stations and ASN gateways while remaining consistent with an embodiment. The base stations 140a, 140b and 140c may each be associated with a particular cell (not shown) in the RAN 104 and may each include one or more transceivers for communicating with the WTRUs 102a, 102b and 102c over the air interface 116. In one embodiment, the base stations 140a, 140b and 140c may implement MIMO technology. Thus, the base station 140a, for example, may use multiple antennas to transmit wireless signals to, and receive wireless signals from, the WTRU 102a. The base stations 140a, 140b and 140c may also provide mobility management functions, such as handoff triggering, tunnel establishment, radio resource management, traffic classification, quality of service ("QoS") policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b and 102c and the RAN 104 may be defined as an R1 reference point that implements the IEEE 802.16 specification. In addition, each of the WTRUs 102a, 102b and 102c may establish a logical interface (not shown) with the core network 106. The logical interface between the WTRUs 102a, 102b and 102c and the core network 106 may be defined as an R2 reference point, which may be used for authentication, authorization, IP host configuration management, and/or mobility management.

The communication link between each of the base stations 140a, 140b and 140c may be defined as an R8 reference point that includes protocols for facilitating WTRU handovers and the transfer of data between base stations. The communication link between the base stations 140a, 140b and 140c and the ASN gateway 142 may be defined as an R6 reference point. The R6 reference point may include protocols for facilitating mobility management based on mobility events associated with each of the WTRUs 102a, 102b, 100c.

As shown in FIG. 1C, the RAN 104 may be connected to the core network 106. The communication link between the RAN 104 and the core network 106 may be defined as an R3 reference point that includes protocols for facilitating data transfer and mobility management capabilities, for example. The core network 106 may include a mobile IP ("MIP") home agent ("MIP-HA") 144, an authentication, authorization, accounting ("AAA") server 146, and a gateway 148. While each of the foregoing elements is depicted as part of the core network 106, it will be appreciated that any one of these elements may be owned and/or operated by an entity other than the core network operator.

The MIP-HA may be responsible for IP address management, and may enable the WTRUs 102a, 102b and 102c to roam between different ASNs and/or different core networks. The MIP-HA 144 may provide the WTRUs 102a, 102b and 102c with access to packet-switched networks, such as the Internet 110, to facilitate communications between the WTRUs 102a, 102b and 102c and IP-enabled devices. The AAA server 146 may be responsible for user authentication and for supporting user services. The gateway 148 may facilitate interworking with other networks. For example, the gateway 148 may provide the WTRUs 102a, 102b and 102c with access to circuit-switched networks, such as the PSTN 108, to facilitate communications between the WTRUs 102a, 102b and 102c and traditional land-line communications devices. In addition, the gateway 148 may provide the WTRUs 102a, 102b and 102c with access to the networks 112, which may include other wired or wireless networks that are owned and/or operated by other service providers.

Although not shown in FIG. 1C, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b and 102c between the RAN 104 and the other ASNs. The communication link between the core network 106 and the other core networks may be defined as an R5 reference, which may include protocols for facilitating interworking between home core networks and visited core networks.

Figure 1D:
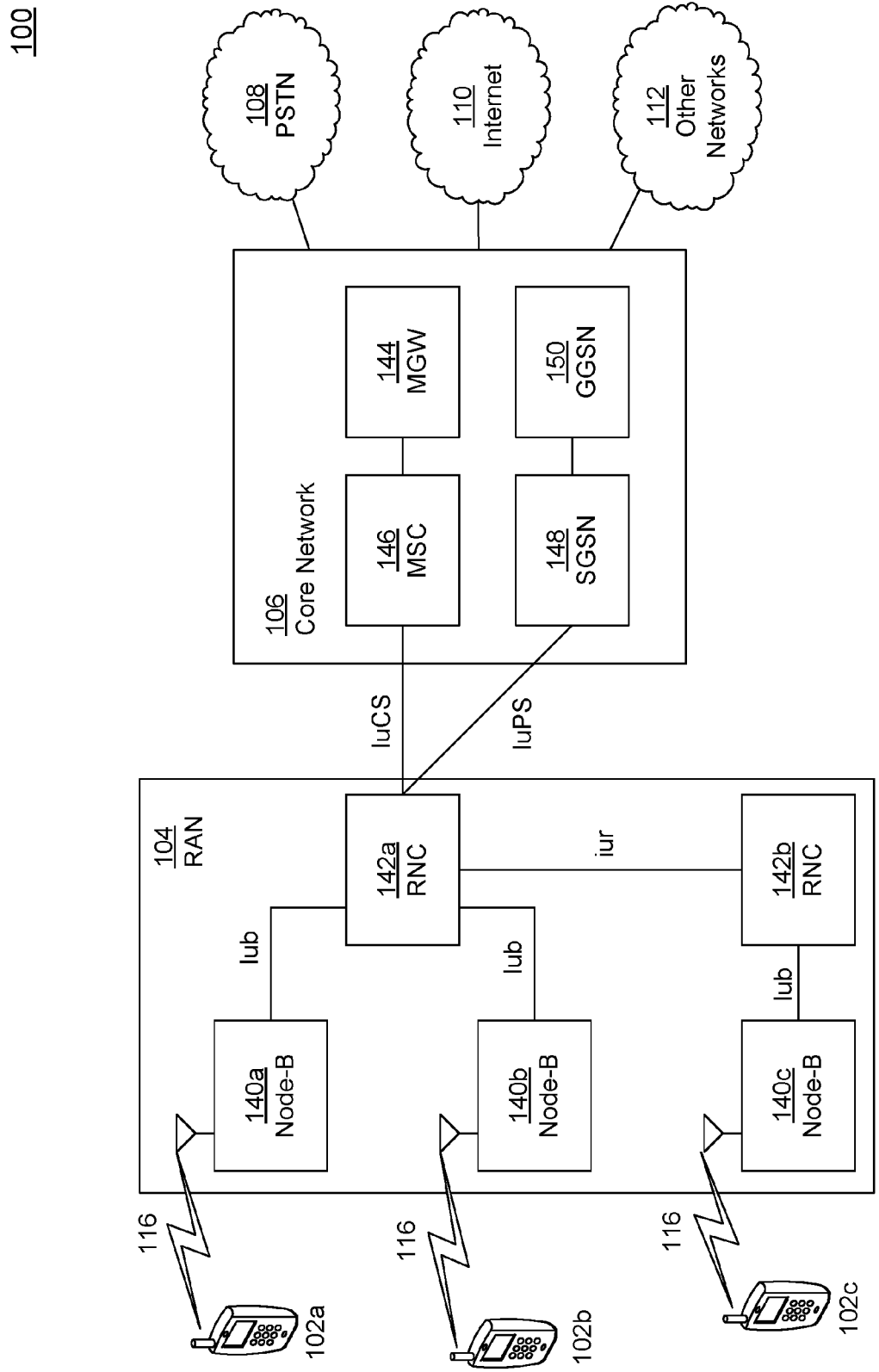
FIG. 1D is a block diagram illustrating an example of a RAN and a example of a CN.

FIG. 1D is a block diagram illustrating an example of the RAN 104 and the core network 106. As noted above, the RAN 104 may employ a UTRA radio technology to communicate with the WTRUs 102a, 102b and 102c over the air interface 116. The RAN 104 may also be in communication with the core network 106. As shown in FIG. 1D, the RAN 104 may include Node-Bs 140a, 140b and 140c, which may each include one or more transceivers for communicating with the WTRUs 102a, 102b and 102c over the air interface 116. The Node-Bs 140*a*, 140*b* and 140*c* may each be associated with a particular cell (not shown) within the RAN 104. The RAN 104 may also include RNCs 142*a*, 142*b*. It will be appreciated that the RAN 104 may include any number of Node-Bs and RNCs while remaining consistent with an embodiment.

As shown in FIG. 1D, the Node-Bs 140*a*, 140*b* may be in communication with the RNC 142*a*. Additionally, the Node-B 140*c* may be in communication with the RNC 142*b*. The Node-Bs 140*a*, 140*b* and 140*c* may communicate with the respective RNCs 142*a*, 142*b* via an Iub interface. The RNCs 142*a*, 142*b* may be in communication with one another via an Iur interface. Each of the RNCs 142*a*, 142*b* may be configured to control the respective Node-Bs 140*a*, 140*b* and 140*c* to which it is connected. In addition, each of the RNCs 142*a*, 142*b* may be configured to carry out or support other functionality, such as outer loop power control, load control, admission control, packet scheduling, handover control, macrodiversity, security functions, data encryption, and the like.

The core network 106 shown in FIG. 1D may include a media gateway ("MGW") 144, a mobile switching center ("MSC") 146, a serving GPRS support node ("SGSN") 148, and/or a gateway GPRS support node ("GGSN") 150. While each of the foregoing elements is depicted as part of the core network 106, it will be appreciated that any one of these elements may be owned and/or operated by an entity other than the core network operator.

The RNC 142*a* in the RAN 104 may be connected to the MSC 146 in the core network 106 via an IuCS interface. The MSC 146 may be connected to the MGW 144. The MSC 146 and the MGW 144 may provide the WTRUs 102*a*, 102*b* and 102*c* with access to circuit-switched networks, such as the PSTN 108, to facilitate communications between the WTRUs 102*a*, 102*b* and 102*c* and traditional land-line communications devices.

The RNC 142*a* in the RAN 104 may also be connected to the SGSN 148 in the core network 106 via an IuPS interface. The SGSN 148 may be connected to the GGSN 150. The SGSN 148 and the GGSN 150 may provide the WTRUs 102*a*, 102*b* and 102*c* with access to packet-switched networks, such as the Internet 110, to facilitate communications between and the WTRUs 102*a*, 102*b* and 102*c* and IP-enabled devices.

As noted above, the core network 106 may also be connected to the networks 112, which may include other wired or wireless networks that are owned and/or operated by other service providers.

Figure 1E:
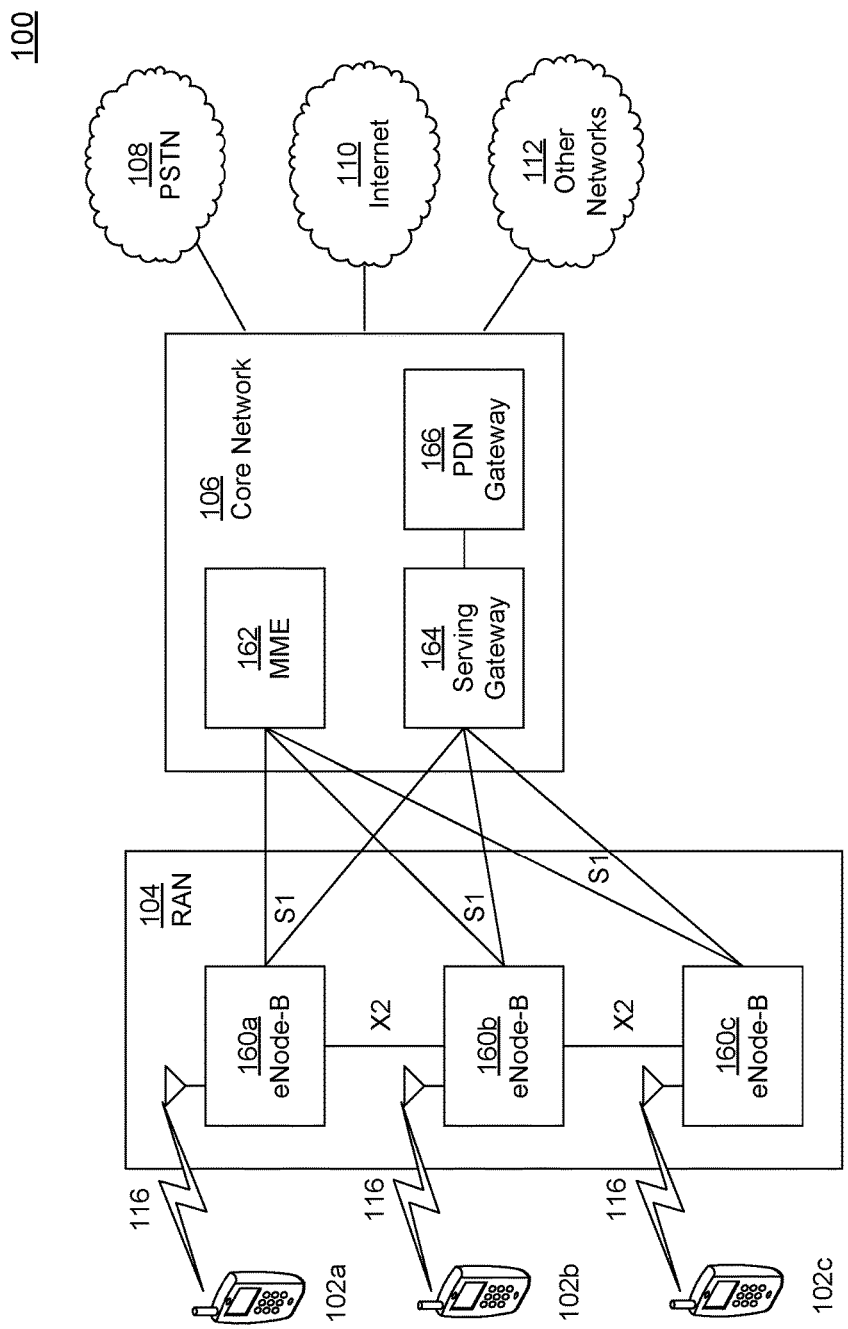
FIG. 1E is a block diagram illustrating an example of a RAN and a example of a CN.

FIG. 1E is a block diagram illustrating an example of the RAN 104 and the core network 106. As noted above, the RAN 104 may employ an E-UTRA radio technology to communicate with the WTRUs 102*a*, 102*b* and 102*c* over the air interface 116. The RAN 104 may also be in communication with the core network 106.

The RAN 104 may include eNode-Bs 140*a*, 140*b* and 140*c*, though it will be appreciated that the RAN 104 may include any number of eNode-Bs while remaining consistent with an embodiment. The eNode-Bs 140*a*, 140*b* and 140*c* may each include one or more transceivers for communicating with the WTRUs 102*a*, 102*b* and 102*c* over the air interface 116. In one embodiment, the eNode-Bs 140*a*, 140*b* and 140*c* may implement MIMO technology. Thus, the eNode-B 140*a*, for example, may use multiple antennas to transmit wireless signals to, and receive wireless signals from, the WTRU 102*a*.

Each of the eNode-Bs 140*a*, 140*b* and 140*c* may be associated with a particular cell (not shown) and may be configured to handle radio resource management decisions, handover decisions, scheduling of users in the uplink and/or downlink, and the like. As shown in FIG. 1E, the eNode-Bs 140*a*, 140*b* and 140*c* may communicate with one another over an X2 interface.

The core network 106 shown in FIG. 1E may include a mobility management gateway ("MME") 142, a serving gateway 144, and a packet data network ("PDN") gateway 146. While each of the foregoing elements is depicted as part of the core network 106, it will be appreciated that any one of these elements may be owned and/or operated by an entity other than the core network operator.

The MME 142 may be connected to each of the eNode-Bs 140*a*, 140*b* and 140*c* in the RAN 104 via an S1 interface and may serve as a control node. For example, the MME 142 may be responsible for authenticating users of the WTRUs 102*a*, 102*b* and 102*c*, bearer activation/deactivation, selecting a particular serving gateway during an initial attach of the WTRUs 102*a*, 102*b* and 102*c*, and the like. The MME 142 may also provide a control plane function for switching between the RAN 104 and other RANs (not shown) that employ other radio technologies, such as GSM or WCDMA.

The serving gateway 144 may be connected to each of the eNode Bs 140*a*, 140*b* and 140*c* in the RAN 104 via the S1 interface. The serving gateway 144 may generally route and forward user data packets to/from the WTRUs 102*a*, 102*b* and 102*c*. The serving gateway 144 may also perform other functions, such as anchoring user planes during inter-eNode B handovers, triggering paging when downlink data is available for the WTRUs 102*a*, 102*b* and 102*c*, managing and storing contexts of the WTRUs 102*a*, 102*b* and 102*c*, and the like.

The serving gateway 144 may also be connected to the PDN gateway 146, which may provide the WTRUs 102*a*, 102*b* and 102*c* with access to packet-switched networks, such as the Internet 110, to facilitate communications between the WTRUs 102*a*, 102*b* and 102*c* and IP-enabled devices.

The core network 106 may facilitate communications with other networks. For example, the core network 106 may provide the WTRUs 102*a*, 102*b* and 102*c* with access to circuit-switched networks, such as the PSTN 108, to facilitate communications between the WTRUs 102*a*, 102*b* and 102*c* and traditional land-line communications devices. For example, the core network 106 may include, or may communicate with, an IP gateway (e.g., an IP multimedia subsystem ("IMS") server) that serves as an interface between the core network 106 and the PSTN 108. In addition, the core network 106 may provide the WTRUs 102*a*, 102*b* and 102*c* with access to the networks 112, which may include other wired or wireless networks that are owned and/or operated by other service providers.

Figure 2:
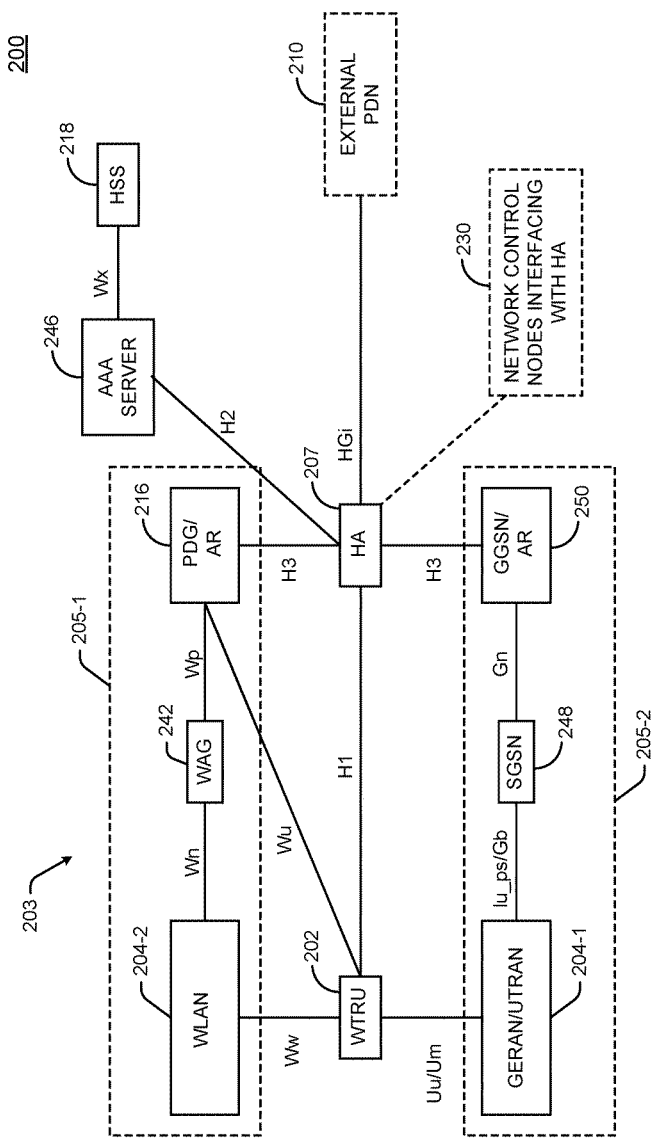
FIG. 2 is a block diagram illustrating an example of a communications system in which one or more disclosed embodiments may be implemented and/or carried out.

FIG. 2 is a block diagram illustrating an example of a communications system 200 in which one or more disclosed embodiments may be implemented and/or carried out. The communications system 200 may be suitable for implementing and/or carrying out any of BWM, BWA, flow management, IFOM and the like to IP traffic that may be carried among multiple accesses and/or access systems. And like the communications system 100 of FIGS. 1A-E, the communications system 200 may include multiple access systems configured in accordance with different access technologies.

The communications system 200 may include a WTRU 202 and a network 203. The network 203 may be configured, for example, in accordance with a home mobility service architecture for interworking WLAN ("I-WLAN") mobility. The network 203 may include first and second access systems 205₁, 205₂, a home agent ("HA") 207, an authentication, authorization and accounting ("AAA") server 246, a home subscriber server ("HSS") 218 and network control nodes 230 interfacing with the HA 207. The AAA server 246 may be, for example, a 3GPP AAA server. As shown, the HA 207 may communicate with an external PDN 210 via an HGi interface. The external PDN 210 may be, for example, any of a public internet network and an operator service network.

The first access system 205₁ may be configured in accordance with at least one release of 3GPP, and/or an access technology protocol of a non-3GPP cellular or cellular-like protocol (collectively hereinafter "3GPP/Cellular access system 205₁"). The 3GPP/Cellular access system 205₁ may include, for example, a GERAN/UTRAN 204₁, a SGSN 248 and a GGSN/access router ("AR") 250.

The GERAN/UTRAN 204₁ may communicate with the WTRU 202 via a Uu/Um interface, and with the SGSN 248 via an Iu_ps/Gb interface. The SGSN 248 may communicate with the GGSN/AR 250 using a Gn interface. The GGSN/AR 250 may communicate with the HA 207 via a connection established using an H3 reference point ("H3 connectivity").

The second access system 205₂ may be configured in accordance with an access technology of a WLAN, WPAN and like-type wireless networks (collectively hereinafter "WLAN access system 205₂"). The WLAN access system 205₂ may include a WLAN access network 204₂, a WLAN access gateway ("WAG") 242 and a PDG/AR 216. The WLAN access network 205₂ may communicate with the WTRU 202 via a Ww interface, and with the WAG 242 via a Wn interface. The WAG 1314, in turn, may communicate with the PDG/AR 216 using a Wp interface. The PDG/AR 216 may communicate with the HA 207 using H3 connectivity.

The WTRU 202 may communicate with the PDG/AR 216 via a Wu interface. The Wu interface may be a defined interface of the WLAN access network 205₂, for example. The WTRU 202 and the HA 207 may communicate via a connection established using, for example, an H1 reference point ("H2connection"). The H1 connection may be established via any of the 3GPP/Cellular and WLAN access systems 205₁, 205₂. The H1 interface may be realized via a Dual Stack MIP ("DSMIP") tunnel between the WTRU 202 and HA 207 inside an IPSec tunnel between the WTRU 202 and PDG/AR 216.

The HA 207 and WTRU 202 may, for example, exchange signaling messages over the H1 connection. The signaling messages may include DSMIPv4 signaling messages; DSMIPv6 signaling messages; signaling messages that are based on, extensions of, related to, modifications of the DSMIPv4 and DSMIPv6 signaling messages; and other like-type signaling messages (collectively "DSMIP signaling messages"). Examples of the DSMIP signaling messages include a binding update ("BU") message, a binding acknowledgment ("BA") message, a reject binding update ("Rej-BU") message, a modify binding update request ("Mod-BU") message and a binding confirmation ("BC") message.

The HA 207 and WTRU 202 may use the DSMIP signaling messages, for example, to keep track of which of the 3GPP/Cellular and WLAN access systems 205₁, 205₂ the WTRU 220 is camping on and/or has recently camped on. The HA 207 and WTRU 202 may also use the DSMIP signaling messages to facilitate multi access PDN connectivity ("MAPCON") and IFOM ("MAPIM"). Both WTRU-initiated and network-initiated MAPIM may be carried out, such as described in detail in, for example, U.S. Prov. Pat. Appln. Ser. No. 61/514,895, filed on 3 Aug. 2011, and entitled "Network-Initiated and/or Network-Managed Internet Protocol Flow Mobility across Multiple-Access Technologies" and PCT International Patent Application Number PCT/US2011/50577, filed on 7 Sep. 2011, and entitled "Bandwidth Management, Aggregation and Internet Protocol Flow Mobility across Multiple-Access Technologies". The DSMIP signaling messages may traverse the H1 connection using UDP over IP, and may be transparent to the GGSN/AR 250 and the PDG/AR 216.

Although the HA 207 is shown as a stand-alone entity in FIG. 2, the HA 207 may be co-located with and/or distributed among any of the GGSN/AR 250, PDG/AR 216 or another entity of the 3GPP/Cellular and/or WLAN access systems 205₁, 205₂ (not shown). Alternatively, functionality of the HA 207 may be distributed among any of the GGSN/AR 250, PDG/AR 216 or another entity of the 3GPP/Cellular and/or WLAN access systems 205₁, 205₂.

Figure 3A:
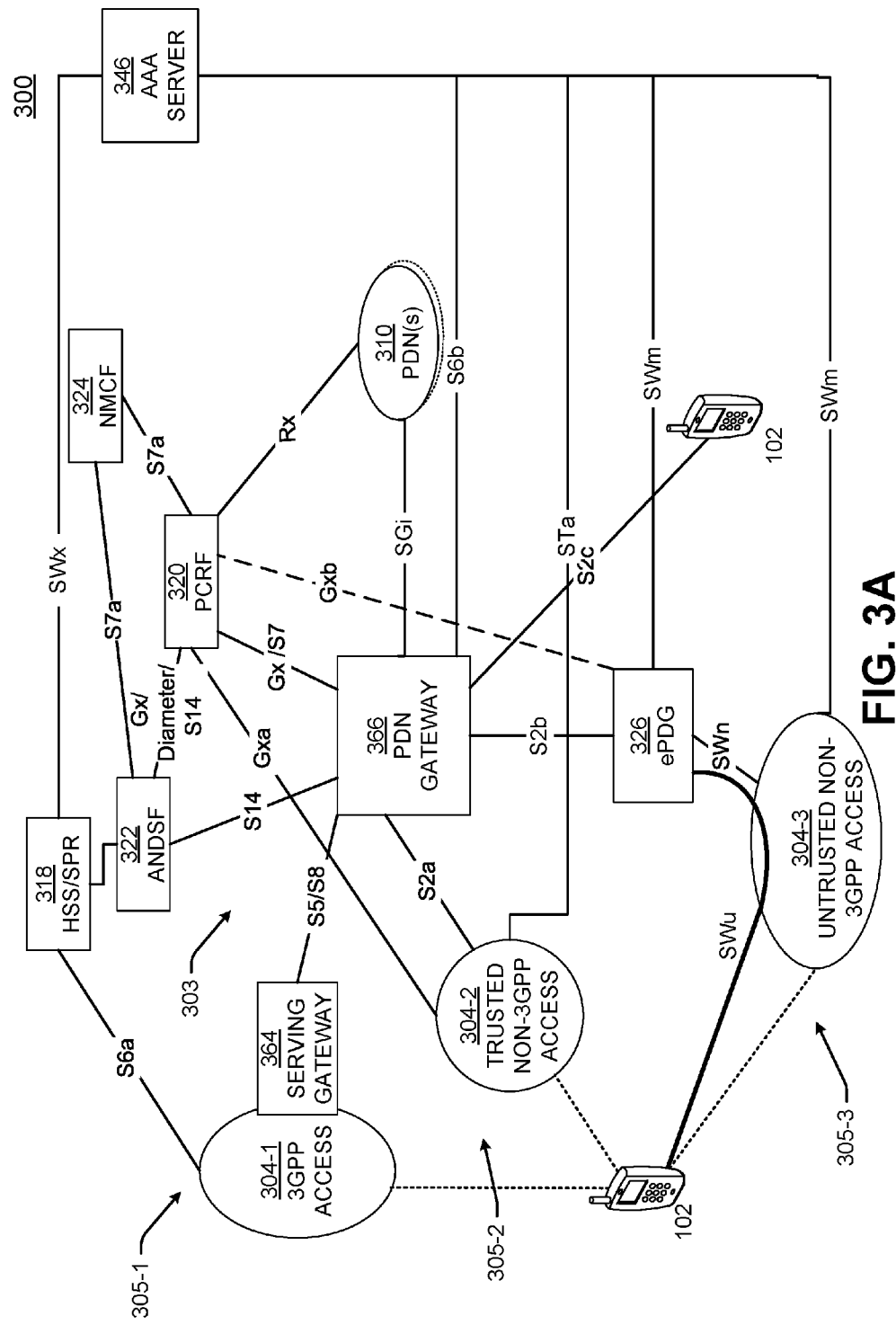
FIGS. 3A-3C are block diagrams illustrating an example of a communications system in which one or more disclosed embodiments may be implemented and/or carried out.
Figure 3B:
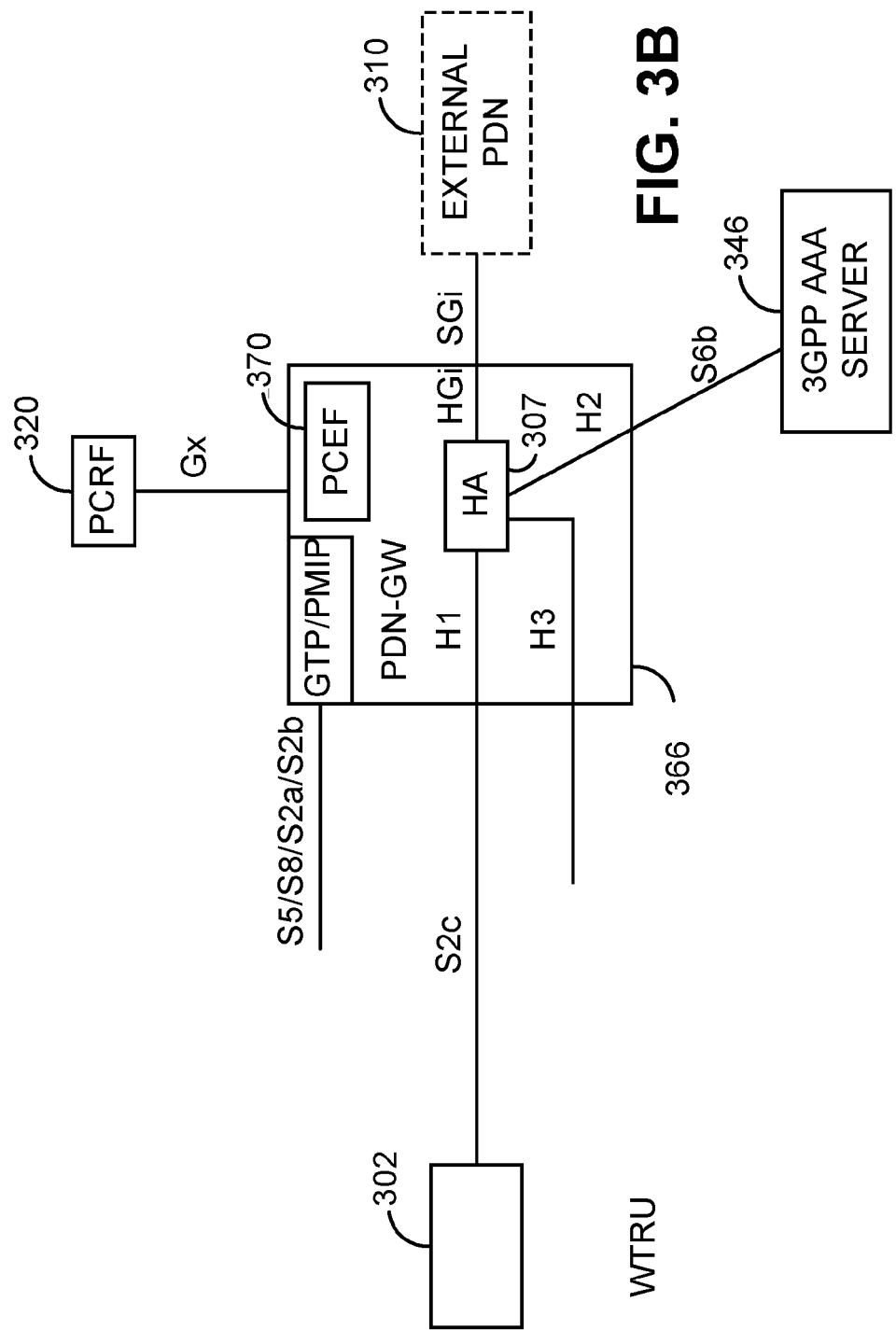
Figure 3C:
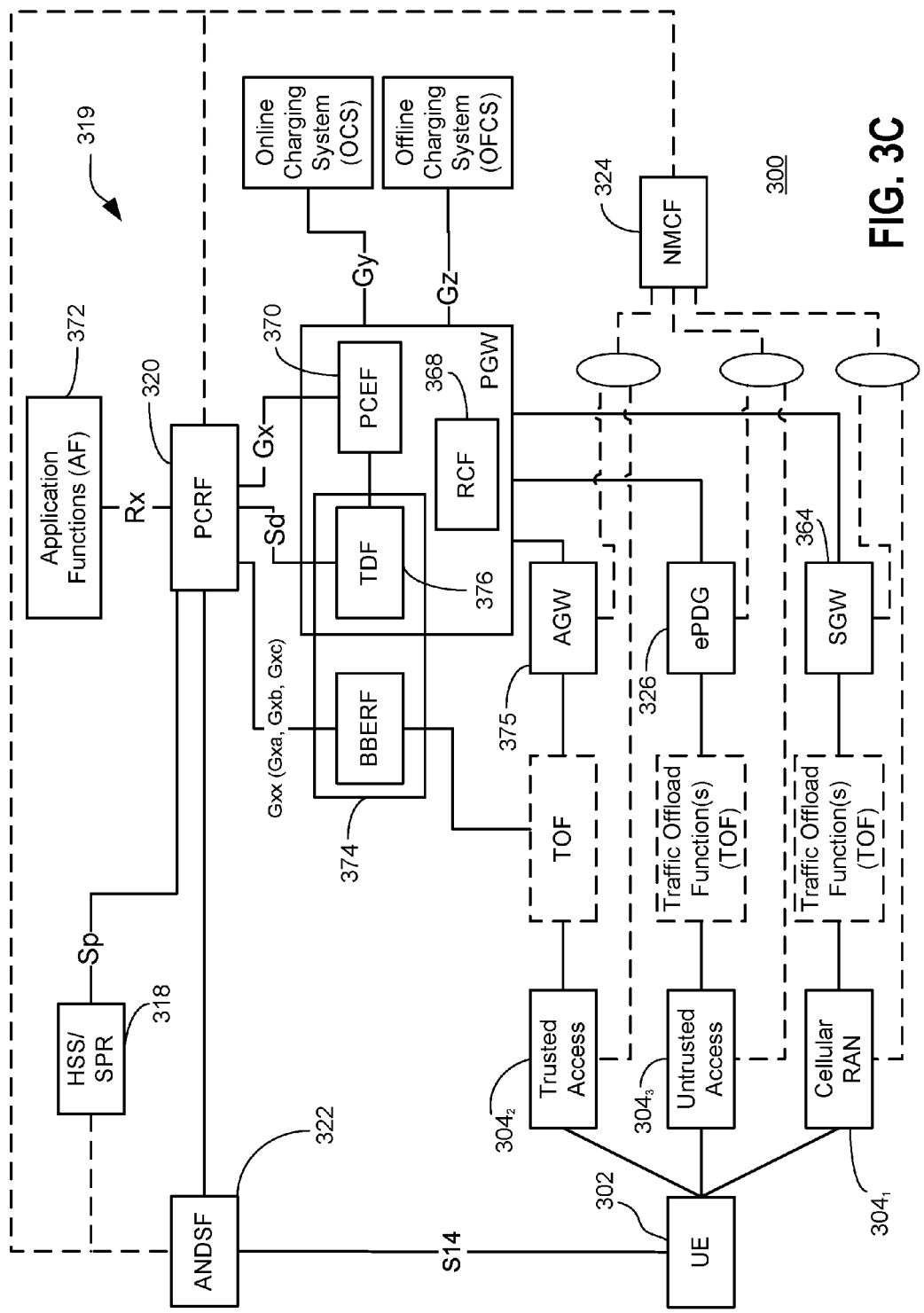

FIGS. 3A-3C are block diagrams illustrating an example of a communications system 300 in which one or more disclosed embodiments may be implemented and/or carried out. The communications system 300 may be suitable for implementing and/or carrying out any of BWM, BWA, flow management, IFOM and the like to IP traffic that may be carried over among multiple accesses and/or access systems; some, all or none of which use different access technologies.

The communications system 300 may include a WTRU 302 and an enhanced packet core ("EPC") network (shown generally 303). The EPC network 303 may include a 3GPP access 304₁, a trusted non-3GPP access 304₂, an untrusted non-3GPP access 304₃; a HA 307 (FIG. 3B), a HSS and/or a subscriber profile repository ("SPR") (collectively "HSS/SPR") 318, Policy and Charging Control ("PCC") architecture shown generally as 319 (FIG. 3C), an access network discovery and selection function ("ANDSF") 322, a network monitoring and control function ("NMCF") 324, an evolved PDG ("ePDG") 326, a 3GPP AAA server 346, a SGW 364, a PGW 366 and a retransmission coordination function ("RCF") 368.

The PCC architecture 319 may support both 3GPP networks and non-3GPP networks interfacing with the EPC network 303. The PCC architecture 319 may also support dynamic PCC for IFOM among multiple simultaneous 3GPP and non-3GPP access connections, e.g., among any of the 3GPP access 304₁, trusted non-3GPP access 304₂, and untrusted non-3GPP access 304₃ (collectively "accesses 304₁₋₃"). The PCC architecture 319 may include, as a baseline, the 3GPP PCC architecture due to general acceptance of such framework by non-3GPP and fixed broadband networks as well as 3GPP, but the concepts may be applied to other architectures as well. The overall PCC architecture 319 may include elements in addition to and/or in lieu of the 3GPP PCC architecture.

The PCC architecture 319 may handle policy and charging for the IP Multimedia Subsystem ("IMS") over operator IP networks, for example, QoS policy control and flow-based charging. The PCC architecture 319 may also handle policy and charging for non-IMS services, including over-the-top services (e.g., video streaming services on the Internet). In various embodiments, preconfigured PCC rules may be used on specific types of IP traffic identified via packet inspection (e.g., deep packet inspection ("DPI")) and/or some other technique or method.

The PCC architecture 319 may perform QoS policy control. The QoS policy control may be used to ensure that delivery of one or more specified sets of IP user plane packets, defined as a service data flow ("SDF"), is maintained at or above a guaranteed bit rate (if specified), and/or to ensure that such delivery does not exceed a specified maximum bit rate. In various embodiments, the guaranteed bit rate may be used to allocate network resources, while the maximum bit rate may be used to enforce the maximum bit rate that the SDF may consume. The SDF may be identified by a 5-tuple. The 5-tuple may include, for example, a source IP address, a destination IP address, a source port number, a destination port number, and a transport protocol (TCP/UDP).

The PCC policy rules may be maintained in a policy and charging rules function ("PCRF") 320 and enforced by a policy charging and enforcement function ("PCEF") 370 (FIG. 3B). The PCEF 370 may be a function of, or collocated in the PGW 366 (or, alternatively, in a GGSN of a packet-switched core network ("PS CN")). The PCEF 370 may reside in the user plane, and may function to ensure that the PCC policy rules are followed. The PCEF 370 may apply, for example, (i) QoS policies related to gating (block/allow) and traffic shaping (reduce the bandwidth), and (ii), online and offline charging policies. The QoS policies may be at SDF-level or other level of granularity.

The PCC architecture 319 may include several (e.g., open) interfaces. These interfaces may include, for example, an Rx interface and a Gx interface. The Rx interface may allow an application function ("AF") 372 (FIG. 3C) in any of the PDNs 310 to provide SDF information, including QoS requirements, to the PCRF 320 using a Diameter protocol. The PCRF 320 may use such information as input to PCC rule generation.

The PCRF 320 may receive a request containing media level information about a flow from the AF 372. The PCRF 320 may analyze the offered characteristics (set forth in the request) against operator defined policy, and authorize a certain QoS reservation and/or reject the request from the AF 372. The PCRF may download service-related and/or subscriber-related information from the HSS/SPR 318. As described in more detail below, the PCRF 320 may also provide rules (e.g., PCC rules, event report triggers, etc.) to the PCEF 370.

The PCRF 320 may have dynamic control over PCC behavior at a PCEF 370. Such dynamic control may be enabled by the Gx interface. Some PCC rules may be pre-configured, and the PCEF 370 may apply these rules to specific types of IP traffic. The specific types of IP traffic may be identified by way of packet inspection, for example.

In addition to using GPRS Tunneling Protocol ("GTP") to provide access to the PGW 366 (or, a GGSN), the PCC architecture 319 may use Internet Engineering Task Force ("IETF") based Mobile IP ("MIP") protocols (e.g., any of MIPv4, PMIPv6 and DSMIPv6) to facilitate convergence of the trusted non-3GPP access $304_2$, untrusted non-3GPP access $304_3$, and other systems, such as 3GPP2, WLAN, and WiMAX (not shown) with the non-3GPP systems. To facilitate the use of MIP protocols that do not support the QoS-related signaling inherent in GTP, the PCC architecture 319 may include a Bearer Binding and Event Reporting Function ("BBERF") 374. The BBERF 374 may include a Diameter-based Gxx interface for QoS information conveyed from the PCRF 320.

The PCC architecture 319 may also support access to home services or direct local services when roaming in a visited Private Land Mobile Network ("PLMN") (not shown). This support may be enabled by PCC policy peering via a Diameter-based S9 interface between Home and Visited PCRFs, for example.

Although not shown, the EPC network 303 may include a User Data Repository ("UDR"), instead of the HSS/SPR 318, to store PCC related subscription data, if, for example, a User Data Convergence ("UDC") architecture is employed. The PCC architecture 319 may include a Traffic Detection Function ("TDF") 376. The TDF 376 may perform application traffic detection, notification, and policy control for traffic detected on the 3GPP access $304_1$, trusted non-3GPP access $304_2$, and untrusted non-3GPP access $304_3$. The PCC architecture 319 may support an SPR-based architecture for roaming with home-routed access, which may be facilitated by S9 roaming interfaces and the TDF 376.

The PCC architecture 319 may handle multiple simultaneous access connections, and support for DSMIPv6 based IFOM, including both WTRU-initiated and/or network-initiated IFOM. The support for such IFOM may involve the PCEF 370 keeping the PCRF 320 up to date about a current routing address and IFOM routing rules for each IP flow. The IFOM routing rules may include information that the PCRF 320 may use to install, in the PCEF 370, the QoS rules for SDFs subject to flow mobility. The IFOM routing rules may be provided to the PCRF 320 from the PCEF 370 during session establishment or modification. The PCEF 370 may derive the IFOM routing rules based on flow binding information received from the WTRU 302.

The PCC architecture 319 may also include an Event Reporting Function ("ERF") (not shown). The ERF may perform event trigger detection. The ERF, for example, may report an event to the PCRF 320 responsive to the event matching the event trigger. The ERF may be integrated into, integral to, combined with co-located with any of the PCEF 370, BBERF 374 and TDF 376 for solicited application reporting (if applicable).

The PCRF 320 may accept input for PCC decision-making from any of the PCEF 370, BBERF 374, TDF 376, the HSS/SPR 318, AF 372, and itself. One or more PCC policy rules, QoS control rules, IP-CAN bearer/session policy information rules, usage monitoring control information rules, IFOM routing rules and application detection and control (ADC) rules may be handled by the PCC architecture 319. For example, the SDFs may be mapped to PCC policy rules sent to the PCEF 370. These PCC policy rules may include a rule name, a service identifier, one or more SDF filters, precedence, gate status (open/closed), QoS parameters, charging key (rating group), other charging parameters, and the like.

The QoS control rules sent to BBERF 374 may include a subset of the PCC policy rules. As an example, the QoS control rules may include the rule name, one or more of the SDF filters, the precedence and the QoS parameters. Alternatively, the QoS control rules may be the same as the PCC policies rules. The QoS parameters provided in both of the PCC policy rules and the QoS control rules may include a QoS Class Identifier ("QCI"), reserved bit rates for guaranteed bearers, maximum bit rates for best effort bearers, allocation/retention priority ("ARP"), APN-Aggregated Maximum Bit Rate ("AMBR"), and the like. The QoS parameters may include other parameters, as well.

Bearer binding may involve association of PCC policy rules to an access bearer. For GTP-based access, both charging and QoS rule enforcement may be carried out by the PCEF 370. For PMIPv6 access, the QoS information might not be conveyed using GTP-based protocols. A Diameter-based control protocol may be used over the Gxx interface instead to convey the QoS rules to the BBERF 374. In various embodiments, the bearer binding may occur in the BBERF 374, but charging and/or gating may be carried out in the PCEF 370.

The ANDSF 322 may provide 3GPP/non-3GPP internetworking information for the WTRU 302 over an IP-based S14 interface, for example. In general, the ANDSF 322 may enable carrier to balance subscribers among the available accesses $304_{1-3}$ using best access selection criteria based on current requirements of the WTRU 302. The ANDSF 322 may provide support for IFOM as currently standardized using DSMIPv6 or otherwise.

The ANDSF 322 may assist the WTRU 302 in discovery of the non-3GPP accesses, such as the trusted and untrusted non-3GPP accesses $304_2$, $304_3$. The ANDSF 322 may provide the WTRU 302 with rules for policing the connection to these networks, such as, inter-system mobility policies ("ISMP") and inter-system routing policies ("ISRP") using, for example, a management object ("MO") ("ANDSF MO"). The relation between the ISMP, the ISRP and discovery information may be that (i) the ISMP prioritize accesses $304_{1-3}$ when the WTRU 302 is not capable of connecting to the EPC network 303 through multiple accesses, (ii) the ISRP indicate how to distribute traffic among available accesses $304_{1-3}$ when the WTRU 302 is capable of connecting to the EPC network 303 through the multiple accesses (e.g., the WTRU 302 is configured for IFOM, MAPCON, non-seamless WLAN offload or any combination of these capabilities); and (iii) and the discovery information provides further information for the WTRU 302 to access the accesses $304_{1-3}$ defined in the ISMP and/or the ISRP.

The ISMP may enable IP flow level control. The ISMP may be provided by a MNO, and may be defined per access point name ("APN"), per IP flow class under any APN or per IP flow class under a specific APN. The ISMP may be defined in other ways, as well. The IP flow class may be identified via any of a media type (e.g. audio), IMS Communication Service Identifier (e.g., MMTEL) for IMS applications and respective 5-tuple (IP source address, IP destination address, source port, destination port, protocol type) for any type of application. The 5-tuple may include wildcard values in any of the possible fields. For example, the ANDSF 322 may indicate that 3GPP access $304_1$ has a highest priority access for a given IP flow class, and the untrusted-non-3GPP access $304_3$ has a highest priority access for another IP flow class.

The ISRP may provide the capability to identify traffic based on types of information, including extrinsic information available to the WTRU 302, such as the APN, and IP packet header information. The IP packet header information may include, for example, transport protocol, destination port and destination IP address.

The ANDSF 322 may also be adapted to perform traffic identification and/or record traffic-identification information. Identification of the traffic may be based on (i) throughput (e.g., identifying traffic based on the total amount of data sent/received); (ii) an application (e.g., identifying traffic based on an application ID/name/etc.); (iii) content type (e.g., identifying traffic based on the type of content (e.g. video, audio, data, control, etc.); and (iv) destination domain (e.g., identifying traffic based on the destination domain, such as the fully qualified destination name ("FQDN") in the web request). The traffic-detection information may be stored in the ANDSF MO along with other ANDSF information described herein and/or set forth in 3GPP TS 24.312.

The ANDSF 322 may receive from the WTRU 302 an indication of its capability to support ISMP and/or ISRP when, for example, the WTRU 302 is in the process of establishing a connection. The ANDSF 322 may provide the policies (e.g., the ISMP and/or ISRP) to the WTRU 302, and, based on the provided policies, the WTRU 302 may request the PGW 366 (e.g., the HA 307 per DSMIPv6-based IFOM) to route IP flows to the 3GPP access $304_1$, trusted non-3GPP access $304_2$, and/or untrusted non-3GPP access $304_3$; as appropriate In various embodiments, the communications system 300 may include support (e.g., any of an interface or reference point) for establishing and/or exploiting interaction (direct or otherwise) between the PCC architecture 319 and ANDSF 322 including, for example, handling of potential policy-related conflicts. The ANDSF 322, PCC architecture 319 and functionality provided herein may include elements and functions to permit interaction between the ANDSF 322 and PCC architecture 319 to facilitate policy-based flow management among any of the accesses $304_{1-3}$. The policy-based flow management may allow MNOs to provide users with an expected quality of experience ("QoE"). The expected QoE may be obtained through, for example, one or more polices ("BWM policies") for managing bandwidth among any of the accesses $304_{1-3}$. Some or all of the BWM policies may be configured to make flexible and/or efficient use of network resources. The interaction may be manifested as control plane functionality (e.g., signaling) between ANDSF 322 and entities of the PCC architecture 319, such as, for example, between the ANDSF 322 and the PCRF 320. The control plane signaling may subsequently affect user plane paths delivering data services.

Depending on capabilities of the WTRU 302 and network, policy-based traffic management may be employed to 1) identify and segregate IP data flows ("IP flows") based on a type of service in use (e.g., "flow identification" and "flow filtering", respectively), and/or 2) assign specific flows or sub-flows over at least two of the accesses $304_{1-s}$ simultaneously ("flow routing" and "sub-flow routing", respectively).

Mobility signaling may be used to provide routing information to the network (e.g., PGW/HA 366/307 in the EPC network 303), resulting in possible establishment, modification, or deletion of bearers carrying IP flows. The PCC signaling may used to provide QoS rules and event report triggers to the appropriate gateways (e.g., e.g., PGW/PCEF 366/370 in the EPC network 303) at a SDF or other level based on a current routing of IP flows.

In addition to WTRU-initiated mobility signaling to the DSMIPv6 Home Agent (HA) 307 to trigger the PCEF-to-PCRF PCC signaling, signaling between the WTRU 302 and ANDSF 322, and between the ANDSF 322 and PCRF 320 may be carried out. For example, measurements or metrics about (e.g., performance of) the network (e.g., local operating environments) may be collected by the WTRU 302 and one or more RANs. These measurements and/or metrics (collectively "measurements") may be extracted from RAT drivers, application statistics, etc., for example.

Once collected, various reporting mechanism may be used by the WTRU 302 and/or RANs to report the measurements to any of the ANDSF 322 and PCRF 320. As an example, the measurements may be reported back to the ANDSF 322 by storing the measurements in the ANDSF MO ("UE-MO") at the WTRU 302, and synchronizing the ANDSF MO ("NETWORK-MO") at the ANDSF 322 using any of a push and/or pull model.

To facilitate reporting the measurements along with other information (e.g., policy information) to the PCRF 320, the PCRF 320 may establish a connection (direct or otherwise) with the ANDSF 322 over a defined interface. This interface may be defined in accordance with a standardized or proprietary protocol. For example, the interface may be defined in accordance with any of a Diameter protocol, Diameter application and a protocol based on the Diameter protocol. Alternatively the interface may be defined in accordance with a device management ("DM") protocol, such as, for example, Open-Mobile Alliance ("OMA") DM protocol. The PCRF 320 may also establish a connection with the WTRU 302 via the connection with the ANDSF 322.

Although the PGW 366 includes the functionality of HA 307, as shown in FIG. 3B, such functionality of the HA 307 may be implemented as a stand-alone entity or as an entity of the EPC network 303 other than the PGW 366. As an alternative, the functionality of the HA 307 may be distributed among a number of entities of the EPC network 303. As another alternative, the HA 307 may be co-located with any of the PGW 366 and another entity of the EPC network 303 (not shown).

The EPC network 303 may define a 3GPP access system $305_1$, a trusted-non-3GPP-access system $305_2$ (e.g., a IevDo access system) and an untrusted-non-3GPP-access system $305_3$ (e.g., a WLAN access system) As shown, the 3GPP access system $305_1$ may include the 3GPP access $304_1$, the SGW 364 and the PGW 366. The trusted-non-3GPP-access system $305_2$ may include the trusted non-3GPP access $304_2$, and the PGW 366. The trusted non-3GPP access $304_2$ may include an access gateway ("AGW") 375 communicatively coupled with the PGW 366 and one or more of the base stations of the trusted non-3GPP access $304_2$ (not shown). The untrusted-non-3GPP-access system $305_3$ may include the untrusted non-3GPP access $304_3$, the ePDG 326 and the PGW 366.

The WTRU 302 may exchange DSMIP signaling messages with the HA 307 via any of the 3GPP access system $305_1$, trusted-non-3GPP-access system $305_2$ and untrusted-non-3GPP-access system $305_3$ The DSMIP signaling messages may be carried via an S2c interface or any other suitable interface.

The NMCF 324 may obtain performance metrics associated with any of the accesses $304_{1-3}$. The NMCF 324 may, for example, collect performance metrics, such as, congestion, connectivity, loading, latency, etc. associated with local radio and/or backhaul links, via interfaces on the accesses $304_{1-3}$. Alternatively, the NMCF 324 may garner the performance metrics from one or more network condition reports (e.g., radio reports) associated with the accesses $304_{1-3}$. The network condition reports may emanate from any of (i) the WTRU(s) 302 ("WTRU network condition report(s)"); (ii) the untrusted non-3GPP access $304_3$ ("untrusted-access network condition report(s)"), trusted non-3GPP access $304_2$ ("trusted-access network condition report(s)") and the 3GPP access $304_1$ ("3GPP network condition report(s)"). The NMCF 324 may receive the network condition reports directly from the WTRUs 302 and/or the accesses $304_{1-3}$. Alternatively and/or additionally, the NMCF 324 may receive the network condition reports by way of one or more network entities, such as any of the PCRF 320, ANDSF 322, HSS/SPR 318 and PGW 366.

The WTRU network condition reports, individually or collectively, may include one or more of the performance metrics associated with one or more of the accesses $304_{1-3}$, as detected, measured or otherwise obtained by the WTRUs 302. The WTRU network condition reports, individually or collectively, may include, in addition to or in lieu of such performance metrics, information from which one or more performance metrics may be derived, generated or otherwise obtained (hereinafter "performance information").

The untrusted-access network condition reports, individually or collectively, may include one or more of the performance metrics and/or performance information associated with the untrusted non-3GPP access $304_3$, as detected, measured or otherwise obtained by one or more BSs (e.g., WLAN APs) of the untrusted non-3GPP access $304_3$. The trusted-access network condition reports may include one or more of the performance metrics and/or performance information associated with the trusted non-3GPP access $304_2$, as detected, measured or otherwise obtained by one or more BSs (e.g., H/E(e)NBs) of the trusted non-3GPP access $304_2$. The 3GPP-RAN reports, individually or collectively, may include one or more of the performance metrics and/or performance information associated with the 3GPP access $304_1$, as detected, measured or otherwise obtained by one or more BSs (e.g., NBs and/or eNBs) of the 3GPP access $304_1$.

For scalability, the performance metrics, performance information and/or the network condition reports may be aggregated by network edge nodes (aggregation points) for exchange with the NMCF 324. In various embodiments, the ePDG 326 may be the aggregation point for the performance metrics, performance information and/or network condition reports associated with the untrusted non-3GPP access $304_3$. The AGW 375 may be the aggregation point for the performance metrics, performance information and/or network condition reports associated with the trusted non-3GPP access $304_2$. The SGW 364 may be the aggregation point for the performance metrics, performance information and/or network condition reports associated with the 3GPP access $304_1$. Aggregation may be carried out using, for example, an OMA-type interface. The OMA-type interface may permit exchange of the performance metrics, performance information and/or network condition reports, including, for example, alarm notifications.

In various embodiments, the NMCF 324 may obtain the performance metrics, performance information and/or network condition reports on a real-time and/or a near real-time basis. The real-time and/or near real-time basis may allow for decisions to be made more accurately than those made using a non-real-time and/or non-near-real-time basis.

The NMCF 324 may use probing and/or passive monitoring techniques to collect, derive, generate or otherwise obtain the performance metrics. The NMCF 324 may, for example, probe and/or passively monitor the performance information and/or network condition reports, and generate performance metrics based, at least in part, on the performance information and/or network condition reports. The NMCF 324 may evaluate the performance metrics, and provide the performance metrics and/or an evaluation of the performance metrics to various entities of the communications system 100. For example, the NMCF 324 may monitor and generate, from the performance information and/or network condition reports, performance metrics related to packet retransmissions ("retransmission metrics") for any of the accesses $304_{1-3}$. Such retransmission metrics may include, for example, statistics related to the packet retransmissions, such as, a number or rate of the packet transmissions.

The NMCF 324 may also send the retransmission metrics to the RCF 368 responsive to such metrics (e.g., the number or rate of retransmissions) for any of the accesses $304_{1-3}$ exceeding, approaching and/or satisfying a threshold ("retransmission threshold"). The retransmission threshold may be and/or be based on a maximum number or rate of retransmissions, and may be defined by a MNO. Values of the retransmission threshold may be defined as policies per access in the PCRF 320. The performance metrics related to packet retransmission may be sent on a per access basis or otherwise.

The RCF 368 may receive the retransmission metrics the NCMF 324 and may decide whether or not to switch retransmitted packets from one of the accesses 304$_{1-3}$ to another. When the number of retransmissions on any of the accesses 304$_{1-3}$ exceeds, approaches and/or satisfies the retransmission-threshold policy value, the RCF 368 may decide to re-route one or more retransmitted packets from one of the accesses 304$_{1-3}$ to another. The RCF 368 may make such decision based on a comparison of values of the retransmission threshold of each of the accesses and values of the retransmission metrics. The RCF 368 may use retransmission rates (e.g., as defined by MNO policies in the PCRF 320). The RCF 368 may receive values of the retransmission threshold of each of the accesses and values of the retransmission metrics as policies. As an example, if the untrusted-3GPP (e.g., a 2 Mbps Wi-Fi) access 304$_3$ is transmitting packets of 1000 bits, and the retransmission threshold of 250 retransmissions per second is satisfied (i.e., a large number of packets are retransmitted), the RCF 368 may decide to switch the packets to any of the 3GPP access 304$_1$ and trusted non-3GPP access 304$_2$, exhibiting a lower retransmission rate.

In cellular systems, advanced retransmission technologies, e.g., chase combining or incremental redundancy, may enable a high probability of successful retransmissions. Since such technologies might not be deployed in WLAN systems, the RCF 368 may decide when retransmission packet traffic may be switched from one of the accesses 304$_{1-3}$ to another with support of (i) operator-based policies stored in the PCRF 320, and (ii) any of the performance metrics, performance information and network condition reports sent from the NMCF 324.

The NMCF 324 may provide any of the performance metrics, performance information and/or network condition reports to the PCEF 370 (FIG. 3B). The NMCF 324 may directly exchange such information with the PCRF 320 via an interface defined between the NMCF 324 and PCRF 320. This interface may be, for example, an S7a interface. The S7a interface may be based on (e.g., a modification of) a S7/Gx interface. Alternatively, may be a S7/Gx interface.

The NMCF 324 may provide any of the performance metrics, performance information and/or network condition reports to the ANDSF 322. The NMCF 324 may directly exchange such information with the ANDSF 322 via an interface defined between the NMCF 324 and ANDSF 322, such as, for example, an S7a interface.

The NMCF 324 may also send to the ANDSF 322 information for updating, modifying or otherwise adapting one or more policies ("policy-adapting information"), including, for example, WTRU-specific policies, based on the performance metrics, performance information and/or network condition reports. The WTRU 302 may request the policy-adapting information from the ANDSF 322, or, alternatively, the policy-adapting information may be pushed to the WTRU 302 based on some event trigger and/or via synchronization.

Alternatively, the NMCF 324 may send the policy-adapting information to the SPR 318, if, for example, a direct interface between NMCF 324 and ANDSF 322 is not available. The SPR 318 may provide the policy-adapting information to the ANDSF 322 so as to allow to the ANDSF 322 to modify the policies, including the WTRU-specific policies, based on the performance metrics (e.g., current network loads). An interface between ANDSF 322 and SPR 318 may be realized as a manifestation of the Ud interface.

The interface between the NMCF 324 and PCRF may 320 also be realized via Ud interface (not shown) or an S7a interface, for example.

Although not shown in FIGS. 3A-3C, the AGW 375 may include the BBERF 374 to facilitate using PMIPv6 between the PGW 366 and the non-3GPP accesses 304$_{1-2}$. As another alternative, the BBERF 374 may be disposed in the SGW 364 to facilitate using PMIPv6 between the PGW 366 and the 3GPP access 304$_1$.

Figure 4:
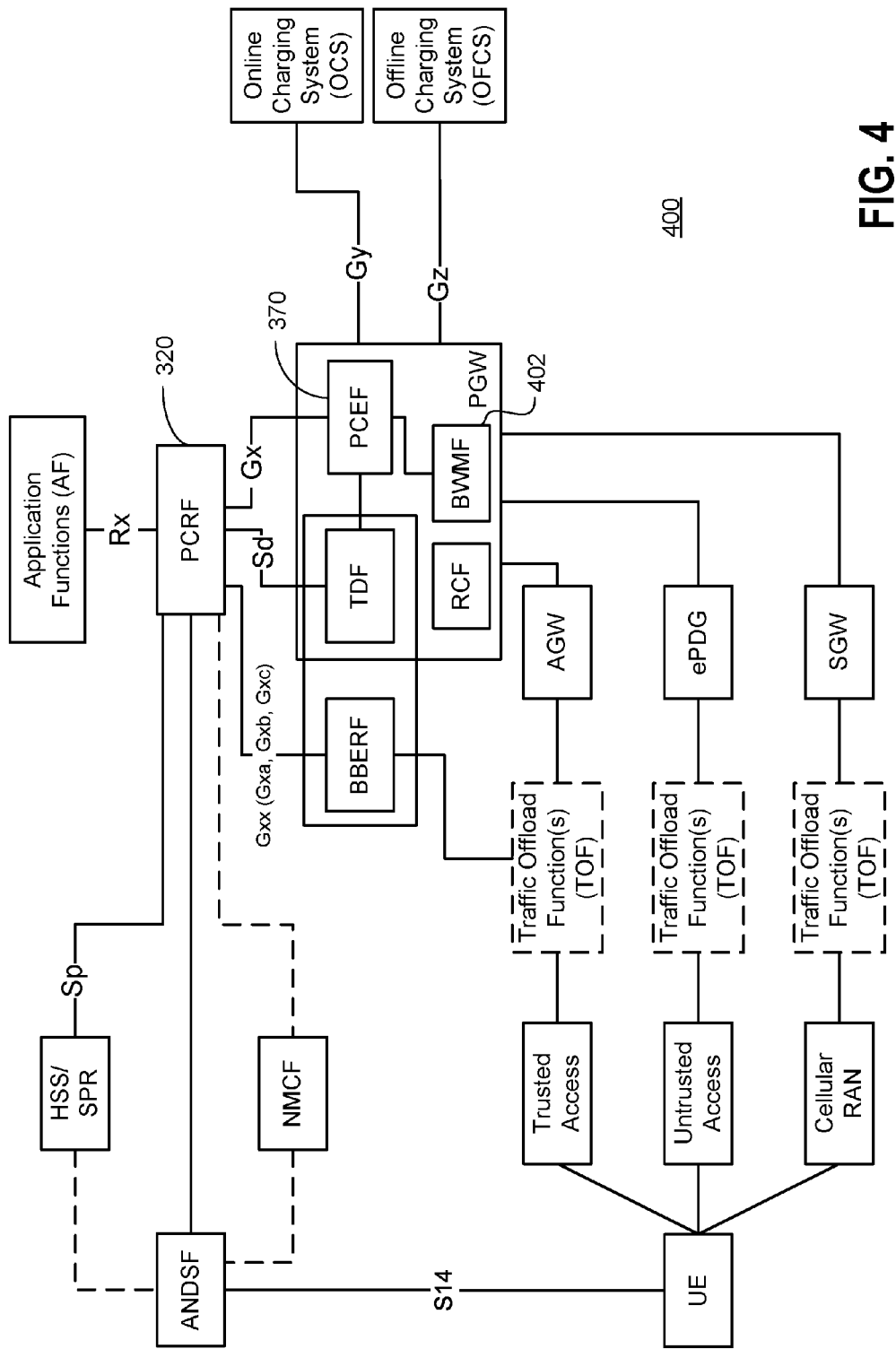
FIG. 4 is a block diagram illustrating an example of a communications system in which one or more disclosed embodiments may be implemented and/or carried out.

FIG. 4 is a block diagram illustrating an example of a communications system 400 in which one or more disclosed embodiments may be implemented and/or carried out. The communications system 400 may be suitable for implementing and/or carrying out any of BWM, BWA, flow management, IFOM and the like to IP traffic that may be carried over among multiple accesses and/or access systems; some, all or none of which use different access technologies. The communications system 400 of FIG. 4 is similar to the communications system 300 of FIGS. 3A-3C.

The Gx interface between the PCRF 320 and PCEF 370 is adapted to support BWM-based policies. For network-initiated BWM, rules may include IP flow identification requirements and flow mobility and/or aggregation policies (e.g., as defined below).

The PCEF 370 may be adapted to support interaction with a Bandwidth Management Function (BWMF) 402. The adapted PCEF 370 may use information from the BWMF 402 to dynamically establish, modify, or release bearers of the accesses 304$_{1-3}$ ("multi-RAT bearers") being used by the WTRU 302 based on the policy rules provided by the PCRF 320.

The BWMF 402 may include inputs that may enable the PCEF 370 to enforce the BWM policies among any of the accesses 304$_{1-3}$. The BWMF 402 may perform packet-based measurements from any of the accesses 304$_{1-3}$ routes (e.g., by monitoring the GTP traffic). The BWMF 402 may also receive input from the NCMF 324. The BWMF 324 may provide the inputted performance metrics, performance information and/or network condition reports to the PCEF 370, enabling it to modify allowed QoS associated with each RAT based on the BWM policies.

Figure 5:
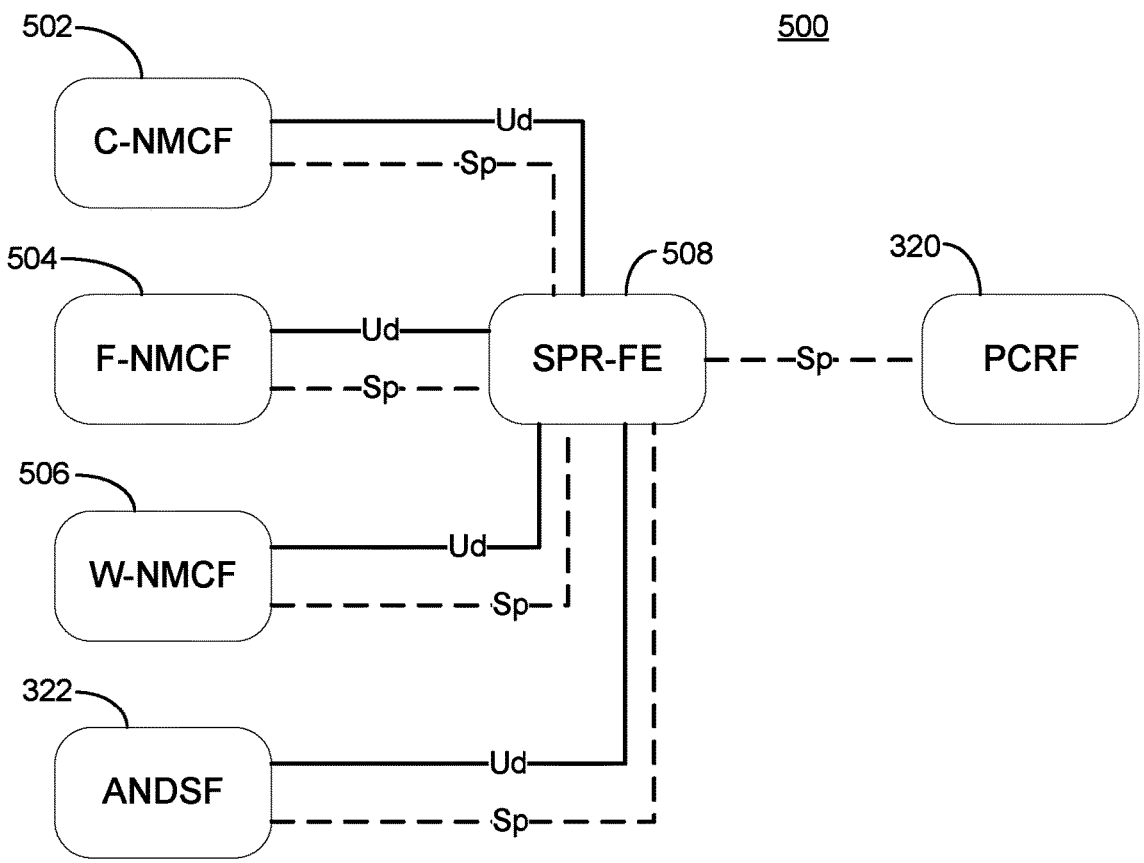
FIG. 5 is a block diagram illustrating an example of a distributed network monitoring and control function ("NMCF")

The NCMF 324 shown in FIGS. 3A-3C and 4 may be a multi-RAT functional entity in that it stores and processes information regarding both the Femto/Macro-Cellular networks as well as Wi-Fi network conditions. FIG. 5 is a block diagram illustrating an example of a distributed NMCF 500. As shown, the distributed NMCF 500 may include separate functions for the cellular and Wi-Fi networks, for example, C-NMCF 502 and W-NMCF 504 respectively. Each of the C-NMCF 502 and W-NMCF 504 may communicate with the PGW 366 using interfaces similar to those between the NCMF 324 and PGW 366 of FIGS. 3A-3C and 4.

Alternatively, the C-NMCF 502 and W-NMCF 504 may communicate using the interface used for direct communication between NCMF 324 and the PCRF 320. Direct communication may be replaced by communication via the SPR 318 as an intermediary. The NCMF 324 may support an Ud interface to SPR 318, which in turn may communicate with the PCRF 320 via a Sp interface. Such indirect communication may be used where a single Multi-RAT NCMF is replaced by multiple single-RAT NMCFs, namely, C-NMCF 502 and W-NCMF 504.

The ANDSF 322 may store information regarding various Wi-Fi APs ("WAPs") and geo-locates them at a cell-ID level. Here, a number of enhancements are disclosed that may make the information in the ANDSF database dynamic to keep track of changes in the network environment as well as to make it capable of handling both Wi-Fi and Femto network environments.

The ANDSF 322 may be made more dynamic by obtaining inputs from F-NCMF 506 and W-NCMF 504, which may report the turning on and/or off of Femto-APs (FAPs) and Wi-Fi APs (WAPs) of the trusted non-3GPP access $304_2$ and the untrusted non-3GPP access $304_3$, respectively.

In addition to on/off status, the FAP information may also include additional parameters, such as those indicating the access mode (e.g. hybrid vs. Open), etc. To accommodate such additional fields of information, the format of the data stored in the ANDSF 322 may be suitably configured. The ANDSF 322 may obtain these inputs using direct interfaces or via the SPR-Front End ("SPR-FE") 508 (e.g., as illustrated in FIG. 5).

The various NMCFs 502-506 and/or the ANDSF 322 may report any of the performance metrics, performance information and network condition reports to the PCRF 320 via the SPR-FE 508 using, for example, the Ud interface. The ANDSF 322 may also support the Sp interface, which may allow it to directly query SPR-FE 506 and/or obtain any of the performance metrics, performance information and network condition reports from the various NMCFs 502-506. Also, as shown in FIG. 5, each of the NMCFs 502-506 may support a Sp interface, as well, allowing the NMCFs 502-506 to query and receive information back from the SPR-FE 508.

In various embodiments, information for storage in an ANDSF client of the WTRU 302 may be supplied to the WTRU 302 by the network as follows. The ANDSF 322 may trigger a network-initiated PDP context activation, followed by transfer of updated information to the WTRU 302. To facilitate this, an interface between ANDSF 322 and SGW 365 may be established. The ANDSF 322 may also communicate the trigger information via the PCRF 320, using interfaces illustrated in FIG. 5.

Figure 6:
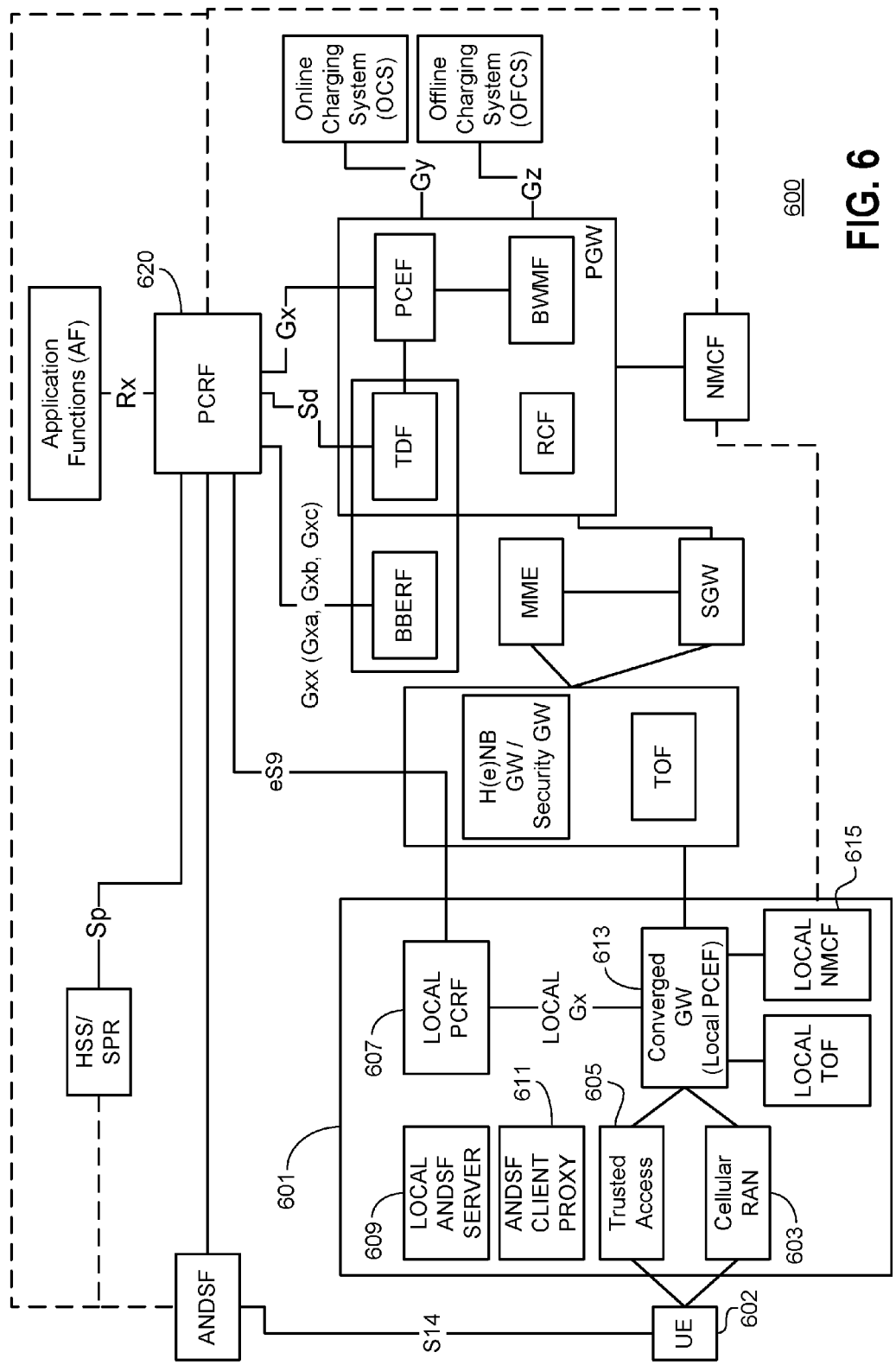
FIG. 6 is a block diagram illustrating an example communications system with enhancements for bandwidth management ("BWM") policies in a local area and/or hotspot served by a CGW.

FIG. 6 is a block diagram illustrating a 3GPP EPC-based communications system 600 with enhancements for BWM policies in a local area/hotspot served by a CGW 601. The CGW 601 may have multiple accesses and/or access systems; some, all or none of which use different access technologies among multiple accesses and/or access systems. The CGW 601 may provide (e.g. QoS, gating, etc.) control policy enforcement performed for access 603, 605 of the CGW 601.

The CGW 601 may include a local PCRF 607, a local ANDSF Server 609, a remote PCRF 620 of a CN, a local ANDSF Client Proxy 611, a local PCEF 613, a local NCMF 615, and a local AF (not shown). The local PCRF 607 may maintain the policy and charging rules to be followed by the CGW 601. This may include local BWM policies related to user priorities, service priorities, etc. The local PCRF 607 may also interface with the remote PCRF 620 via, for example, an extended S9 (eS9) interface. When BWM related services are to be initiated in the CGW 601, the local PCRF 607 may consult the remote PCRF 620 and update the rules. Such update may be mandated by a higher authority.

The local ANDSF Server 609 may provide local policies to authorized WTRUs, such as the WTRU 602. The local ANDSF Client Proxy 611 may act on behalf of authorized WTRUs to exchange WTRU-specific information with external ANDSF servers 622 accessible by the WTRUs.

The CGW 601 may include a capability to intercept WTRU-specific core network control plane signaling (e.g., NAS, RANAP, S1, etc.). It may also be able to intercept WTRU-specific user plane data and route packets over multiple RATs per a WTRU BWM policy. These capabilities may allow the CGW 601 to act as the local PCEF 613 to enforce multi-RAT BWM policies provided by the local PCRF 607.

By being a local network element in an immediate vicinity of the serviced terminals, an MNO-managed CGW, such as the CGW 601, may be in a position to provide a broader set of measurements than possible from a remote RNC/eNB in a macro cell. For example, the CGW 601 may offer multi-technology and technology-independent metrics based on its supported capabilities. Such function may be realized via the local NCMF 615. For instance, radio frequency (RF) measurements from IEEE 802.11 (e.g., Wi-Fi) and IEEE 802.15-based (e.g., Bluetooth) devices may be aggregated, as may measurements from a dedicated RF sensing board. This information may be used along with the local policies to influence the usage of various RATs within the CGW 601. The same and/or similar information may be used by MNOs to optimize utilization of network resources, including licensed and unlicensed spectrum, while maintaining a required QoS.

Figure 7:
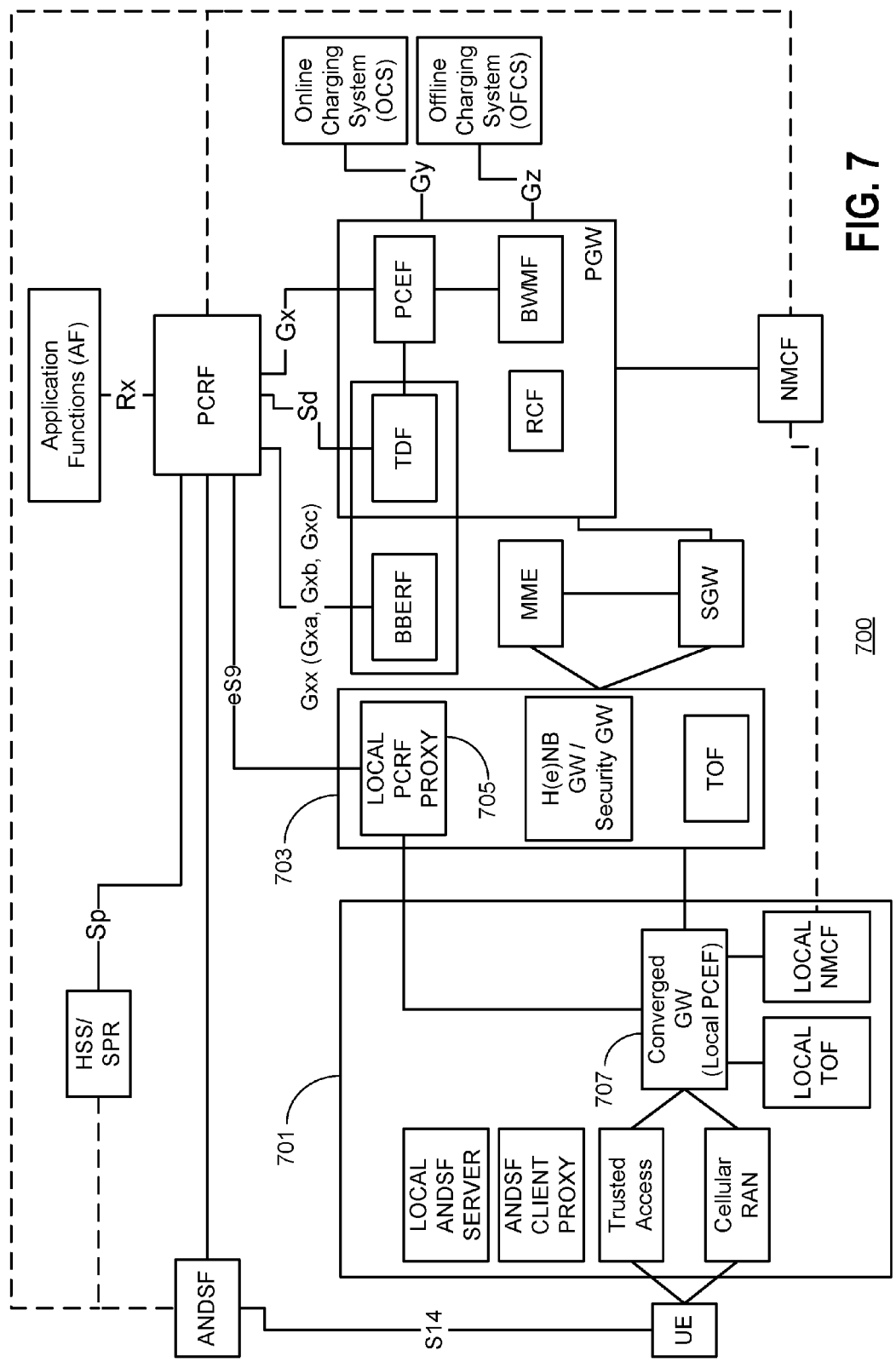
FIG. 7 is a block diagram illustrating an example communications system with enhancements for BWM policies in a local area and/or hotspot served by a CGW.

FIG. 7 is a block diagram illustrating an example 3GPP EPC-based communications system 700 with enhancements for BWM policies in a local area/hotspot served by a CGW 701. The CGW 701 may have multiple accesses and/or access systems; some, all or none of which use different access technologies among multiple accesses and/or access systems. The communications system 700 of FIG. 7 is similar to the communications system 600 of FIG. 6. The communications system 700 of FIG. 7 may differ from the communications system 600 of FIG. 6 in that the communications system 700 may include an edge node 703 at the edge of the CN, and the edge node 703 includes PCRF relay 705 for interacting with the local PCEF 707.

Provided below are examples of a three sets of BWM policies that may be provided to various network components in an evolved multi-RAT mobile network, such as in any of the communications systems 100, 200, 300, 400, 600 and 700. The first set of policies may include policies provided to WTRUs. These policies may provide a network with control over how a WTRU makes decisions that it is "free to make." The policies provided to WTRUs may also provide a network operator with control over behavior of the WTRUs at all times. These policies provided to WTRUs may be provided to the WTRUs via an ANDSF.

The second set of policies may include policies residing in the network's own PCRF and/or PCEF (e.g., policies describing how a network controls its own operation). And the third set of policies may include policies residing in the CGWs. These policies, which may reside in the local PCRF and/or local PCEF at the CGW (e.g. a FAP), may allow the mobile network to indicate preference over an approach that the CGW takes to managing local spectrum.

One aspect of WTRU-decision making is whether the WTRU 302 makes decisions per connection or whether a finer (per flow) granularity is supported. For per-connection decisions, the policy may contain one or more elements, including, for example, any of a policy owner; policy access characteristics; policy activation time (e.g., immediate, for new sessions only, etc.); policy persistence (e.g., overwrite default; revert to default after timeout expiry, etc.); user permissions, policy granularity (e.g., per connection or flow based); flow identification process and policy properties.

The policy owner may be, for example, a network issuing the policy. The policy owner may be used as a criterion for looking up a policy when connected to this network. The policy access characteristics may specify under which condition(s) the policy is to be used when connecting to the policy owner. Examples of the policy access characteristics may include (i) "always", (ii) "when macro-BS connection is the only one available", and (iii) "when a trusted Wi-Fi AP is available", (iv) etc.

The flow identification process may be used if flow-based policy granularity is used. The flow identification process may specify how "hard" the WTRU 302 should try to identify the flow. Example settings of the flow identification process may include packet inspection level (the packet inspection level may be commonly understood by a WTRU 302 and the network); use of well-known port mappings (e.g., TCP port 80 is always HTTP); use of deep packet inspection (if available) and identification of application sub-flows.

The policy properties may include properties to be used for per connection granularity. The policy properties may also be used as a "default" policy for flow-based granularity. Examples of properties of the policy properties may include (i) which initial connection to use (e.g., Cellular, Wi-Fi, peer-to-peer or Bluetooth), and (ii) which access procedure to configure (e.g., network-controlled mobility, mobile IP, BW aggregation, static TCP/IP, etc.).

If flow-based policies are used, for each flow, a sub-policy may be provided that may include a flow description and/or policy properties. A flow description may include a flow name (e.g., HTTP, video, voice, VoIP, etc.) and/or a flow identifier. The flow identifier may include a destination port used (e.g., TCP Port 80 for HTTP) or a DPI signature; for example The policy properties may be the same as for a master policy, which may include, for example, which initial connection to use (e.g., Cellular, Wi-Fi, peer-to-peer or Bluetooth) and which access procedure to configure (e.g., network-controlled mobility, mobile IP, BW aggregation, static TCP/IP, etc.).

If flow-based policies are used, the policy framework may allow for the WTRU 32 to not be able to identify all (or many) flows. A default policy may be provided. The default policy may be explicit provided (e.g., using a flow-specific policy with "default" in a flow description). Alternatively, the master policy may include policy properties that are treated as default.

Policies in the network may be structured around the WTRU 302 or around flows. WTRU-centric policies may apply to all flows associated with a WTRU 302. Flow-based policies may apply to all flows or to a particular type of flow associated with any WTRU 302. Examples of WTRU-centric policies and associated parameters that may be defined for controlling multi-RAT BWM-enabled behavior in macro and CGW environments may include any of a policy activation time (e.g., immediate, for new sessions only, etc.); policy persistence (e.g., overwrite default, revert to default after timer expiry, etc.); user permissions; BWM flow mobility thresholds; BWM flow aggregation thresholds; and RCF retransmission thresholds.

The BWM flow mobility policies may include any of a WTRU identity (e.g., IMSI); WTRU priority for uplink and downlink (e.g., high, low, or the like); service classification and/or identification requirements (e.g., video based on specified IP address, flash videos based on DPI, etc.); preferred access per service for uplink and downlink (e.g., cellular, Wi-Fi, etc.); minimum QoS per IP flow (e.g., bit rate, packet latency, packet loss, etc.); and maximum QoS per IP flow (e.g., bit rate, packet latency, packet loss, etc.).

The BWM flow aggregation policies may include any of a WTRU identify (e.g., IMSI); WTRU priority (e.g., high, low, or the like); service classification and/or identification requirements (e.g., video based on specified IP address, flash videos based on DPI, etc.); minimum QoS per service (e.g., bit rate, packet latency, packet loss, etc.); and maximum QoS per service (e.g., bit rate, packet latency, packet loss, etc.). Execution of these policies may assume that any BWM-enabled capabilities have been communicated between the WTRU 302 and the macro/CGW systems, either explicitly or implicitly.

The CGW may service users in a residence or enterprise. As such, the users may be localized in the vicinity of the CGW, and location-based policies may be employed based on the expected behavior of these users.

Example ANDSF and PCRF Discovery

Figure 8:
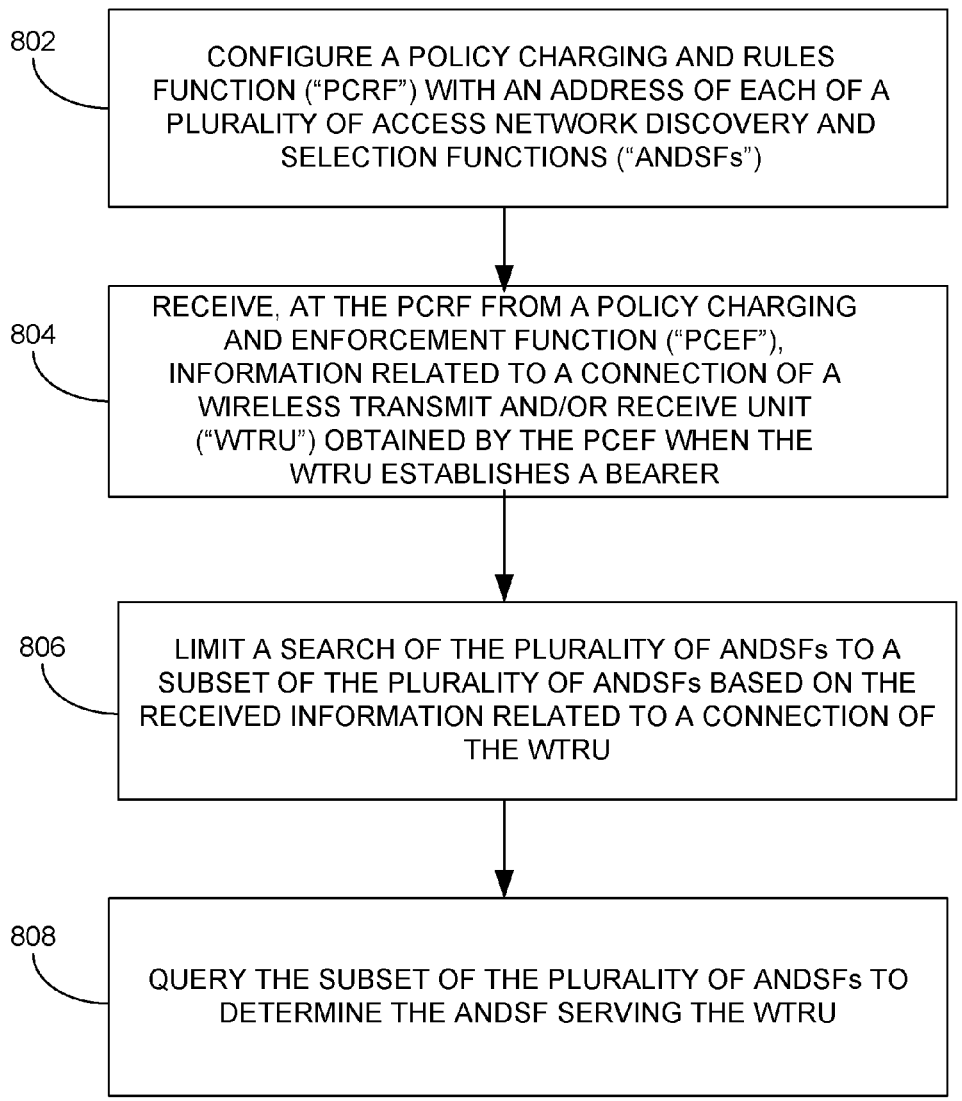
FIGS. 8-9 are flow diagrams illustrating an example process for ANDSF discovery.

Referring now to FIG. 8, a flow diagram illustrating an example process 800 for ANDSF discovery. The process 800 is described with reference to the communications system 300 of FIGS. 3A-3C, for simplicity of exposition. The process 800 may be carried out in other communications systems, as well.

The PCRF 320 may be configured with fully qualified domain names ("FQDNs") and/or IP addresses of one or more ANDSFs, as shown at 802. When a WTRU 302 establishes a bearer through the EPC network 303, the PGW 366 (or more particularly, the PCEF 370) may provide the PCRF 320 with information related to the subscriber connection ("subscriber connection information"), as shown at 804. The subscriber connection information may include for example, a subscriber ID, UE IP address, subscriber location, PDN ID, PLMN ID; etc. Based on the subscriber connection information, the PCRF 320 may be able to narrow a search for the ANDSF(s) serving the WTRU 302 (subscriber), as shown at 806. The search may be narrowed, e.g., based on subscriber location, PLMN ID, etc. Thereafter, the PCRF 320 may query the narrowed set of configured ANDSFs for the ANDSF(s) serving the WTRU 302 (subscriber), as shown at 808. Alternatively, the PCRF may query each the configured ANDSFs for the ANDSF(s) serving the WTRU 302 (subscriber) to determine which serve the WTRU 302 (subscriber).

Figure 9:
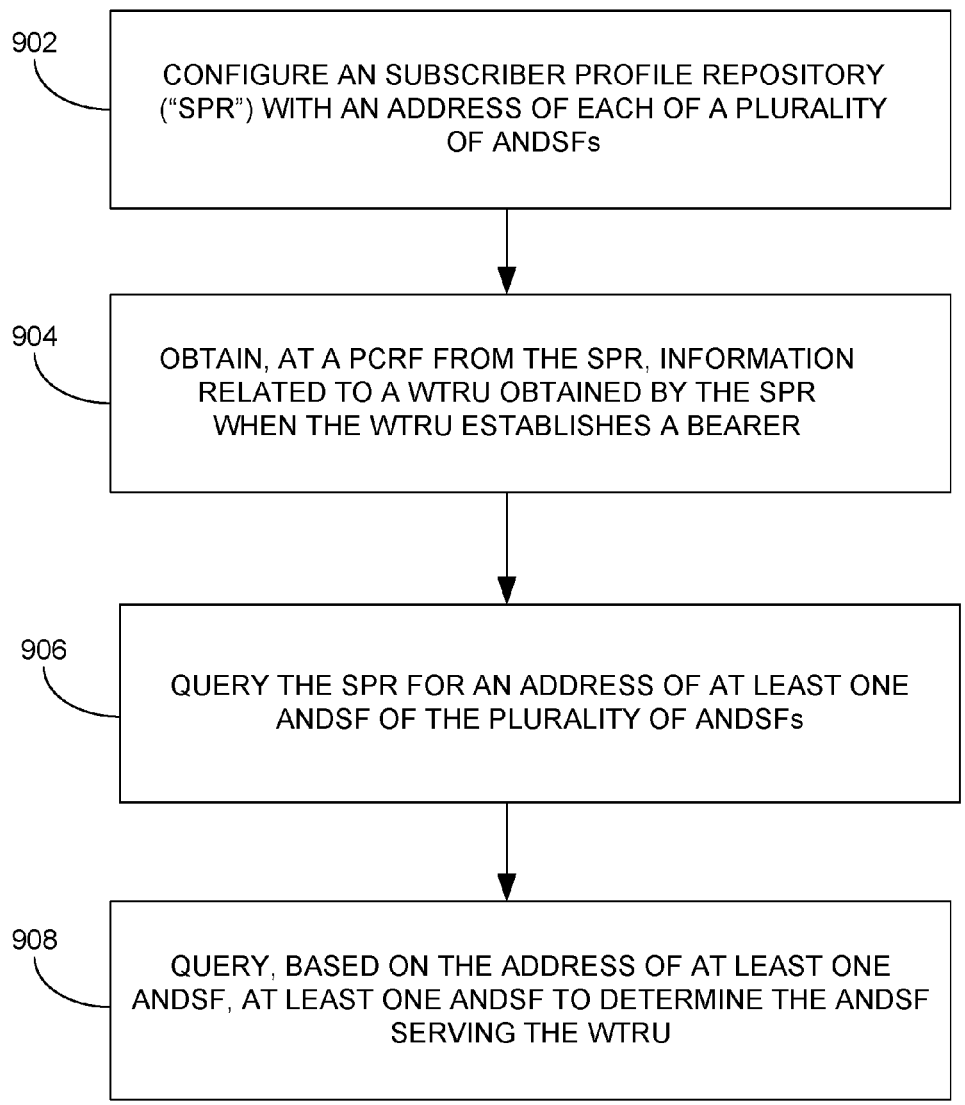

FIG. 9 is a flow diagram illustrating an example process 900 for ANDSF discovery. The process 900 is described with reference to the communications system 300 of FIGS. 3A-3C, for simplicity of exposition. The process 900 may be carried out in other communications systems, as well. The process 900 of FIG. 9 is similar to the process 800 of FIG. 8, except as described herein.

The SPR may be configured with the FQDNs or IP addresses of the ANDSFs provisioned for the WTRU 302 (subscriber), as shown at 902. When a UE establishes a bearer through the EPC, the PCRF may retrieve subscriber-specific ANDSF information from the SPR, as shown at 904. Based on this subscriber-specific ANDSF information, the PCRF may narrow the search for applicable ANDSF(s) serving the subscriber, as shown at 906. Thereafter, the PCRF 320 may query the narrowed set of configured ANDSFs for the ANDSF(s) serving the WTRU 302 (subscriber), as shown at 908. Alternatively, the PCRF may query the SPR to determine ANDSF(s) that serve the WTRU 302 (subscriber)

Example Information Provided by ANDSF to PCRF

The information exchanged between the ANDSF 322 and the PCRF 320 may be the ANDSF MO. Since the ANDSF MO contains policy information and/or policy-related information (collectively "policy information") regarding non-3GPP Network Selection, ISMP and ISRP, the PCRF may obtain (e.g., using a 'get' method) the policy information of interest. Assuming the interface between the PCRF 302 and ANDSF 322 uses a Diameter based protocol, then Diameter messages may be defined, and these messages may encapsulate the ANDSF MO (in whole or in part, as needed). Alternately, assuming the interface between the PCRF 302 and ANDSF 322 is similar to S14, e.g., S14a, then existing MO-synchronization messages (such as Get, Alert, etc) may be used The ANDSF information may include other information in addition to information stored in the ANDSF MO in accordance with 3GPP TS 24.312, v11.0.0 ("conventional ANDSF MO"), this other information may be and/or include information derived, at least in part, from the conventional ANDSF MO. For example, the ANDSF server may retrieve WTRU-network information (from both conventional ANDSF MO information and information set forth above and below) from individual WTRUs based on capabilities of each of the WTRUs. These capabilities may include perceived congestion via specific cells, access points, or PDNs; application detection; etc.). To enable consistent behavior and interoperability, such information may be specified with a level of confidence expected from such reports. An "always-on" IP connection over 3GPP access may be used to convey this information between WTRUs and the ANDSF 322.

The ANDSF 322 may then use this individual WTRU-network information, "as is" or aggregated with other WTRU-network information, including reports from multiple WTRUs. The ANDSF 322 may acquire this other WTRU-network information, which may include, for example, near-real-time subscriber information, via an interface with the HSS/SPR 318. The ANDSF 322 may then provide network status information to the PCRF 320 related to one or more individual WTRUs; one or more individual cells and/or access points (e.g. BSSIDs/AP MAC addresses); one or more individual access networks (as in, for example the case of a Wi-Fi Hotspot where multiple access points use the same SSID); and Individual PDNs.

In addition to the conventional ANDSF MO information, the ANDSF 322 may provide any of the following other WTRU-network information to the PCRF 320, with a specified level of confidence: a timestamp; report type (initial, modification, etc.); subscriber ID (e.g., IMSI, NAI); IPv4 address and/or IPv6 network prefix assigned to the WTRU; subscriber location; PDN ID(s) (e.g., as indicated by APNs); PLMN ID; IP flow routing information (if, for example, WTRU-initiated IP flow mobility is used); detected IP flow description, e.g. 5-tuple (for WTRUs with traffic detection capability, for instance); WTRU-specific cell/AP air interface pre-congestion/congestion information for specified cells/APs (for WTRUs with congestion detection capability, for instance); WTRU-specific cell/AP backhaul pre-congestion/congestion information for specified cells/APs (for WTRUs with congestion detection capability, for instance); WTRU-specific PDN pre-congestion/congestion information for specified PDN (for WTRUs with congestion detection capability, for instance); detected applications, flows (for WTRUs with traffic detection capability, for example)

Example Information Provided by PCRF to ANDSF

As noted above, the PCRF 320 may accept input for PCC decision making. This input may emanate from any of the PCEF 370, BBERF 374, TDF 375, SPR 318 and AF 370, from the reporting air interface status from the RAN/eNodeB/WLAN AP/etc, as well as the its own information. The PCRF 320 may also accept input from the NMCF 345 (of distributed NMCF 500)

Based on this information, the PCRF 320 may inform the ANDSF 322 about the access network(s) currently used for a particular WTRU connection, potentially triggering a "get" from the WTRU 302, e.g., to obtain updated location or IFOM information. The ANDSF 322 may then provide the WTRU 302 with a policy update, if required. The PCRF 320 may also inform the ANDSF 322 when an IP flow has been moved successfully.

Example Mechanisms for Providing ANDSF Information to PCRF

The PCRF 320 may query the ANDSF 322 for specific information on demand. Alternatively, the ANDSF 322 may report events to the PCRF 320 unconditionally and/or based on PCRF subscription for event reports. For instance, the ANDSF 322 may be pre-configured to report some events to the PCRF 320 based on a specified trigger or at a periodic rate. Alternatively, the PCRF 320 may subscribe to reporting of specific events from the ANDSF 322 based on a specified trigger or at a periodic rate.

An event report is a notification of an event which occurs that corresponds with an event trigger. The event report may include information in addition to the notification. An event trigger is a rule specifying the event reporting behavior of the ANDSF 322. The ANDSF 622 may perform event trigger detection. For example, each time the AND SF 322 updates a particular policy of a WTRU 302, the ANDSF 322 may check event report filters to determine if such information should also be reported to the PCRF 320.

Examples of events that may trigger generation of a report to the PCRF 302 may include any of a WTRU policy update from the ANDSF 322 (e.g., based on UE request for policy update based on expiration of policy validity (location-based, time-based, etc.)), a PLMN change, a QoS change; an IFOM routing change; an access network change; an access link up/down; a UE IP address change; a location update; an application detection; etc.

Example Mechanisms for Providing PCRF Information to ANDSF

The PCRF 320 may provide information to the ANDSF 322 at any time. Event triggers may be set up in the ANDSF 322 that may cause the ANDSF 322 to retrieve specific information from the PCRF 320 whenever the specified event is triggered. Similar to the event reporting mechanism described above with respect to ANDSF-to-PCRF event reporting, the ANDSF 322 may subscribe to trigger-based event reports from the PCRF 320. The reports may be based on, for example, any of a detection of congestion in the network; detection of specific application types; detection of cell-based congestion; etc.

Example Use of ANDSF Information by PCRF

In various embodiments, the PCRF 320 may use the ANDSF information in addition to the inputs described in 3GPP TS 23.203, v11.2.0 for PCC decision-making and policy rule generation. The PCRF 320 may accept such additional input from, for example, any of the PCEF 370, the BBERF 374 (if present), the TDF 376 (if present), the HSS/SPR 318 and the AF 372 (if involved). The PCRF 320 may use its own pre-defined information as input, as well. The PCRF 320 may also accept input from the NMCF 324, (or distributed NMCF 500)

When using network-based mobility ("NBM") protocols such as PMIPv6 or GTP, the PCRF 320 may use the ANDSF information to enhance either WTRU-initiated or network-initiated IFOM. For WTRU-initiated IFOM with NBM, for example, the PCRF 32 may use the ANDSF information to re-negotiate the WTRU-initiated IFOM. This way, the PCRF 320 may (e.g., in accordance with 3GPP TS 23.861 v1.3.0) determine through which access to route the SDF, by, for example, providing the PCC rules, including the access network information, to the PCEF 320. For network-initiated IP flow mobility, the ANDSF information may be used to update the PCRF 320 to include expanded IFOM rules.

Figure 10:
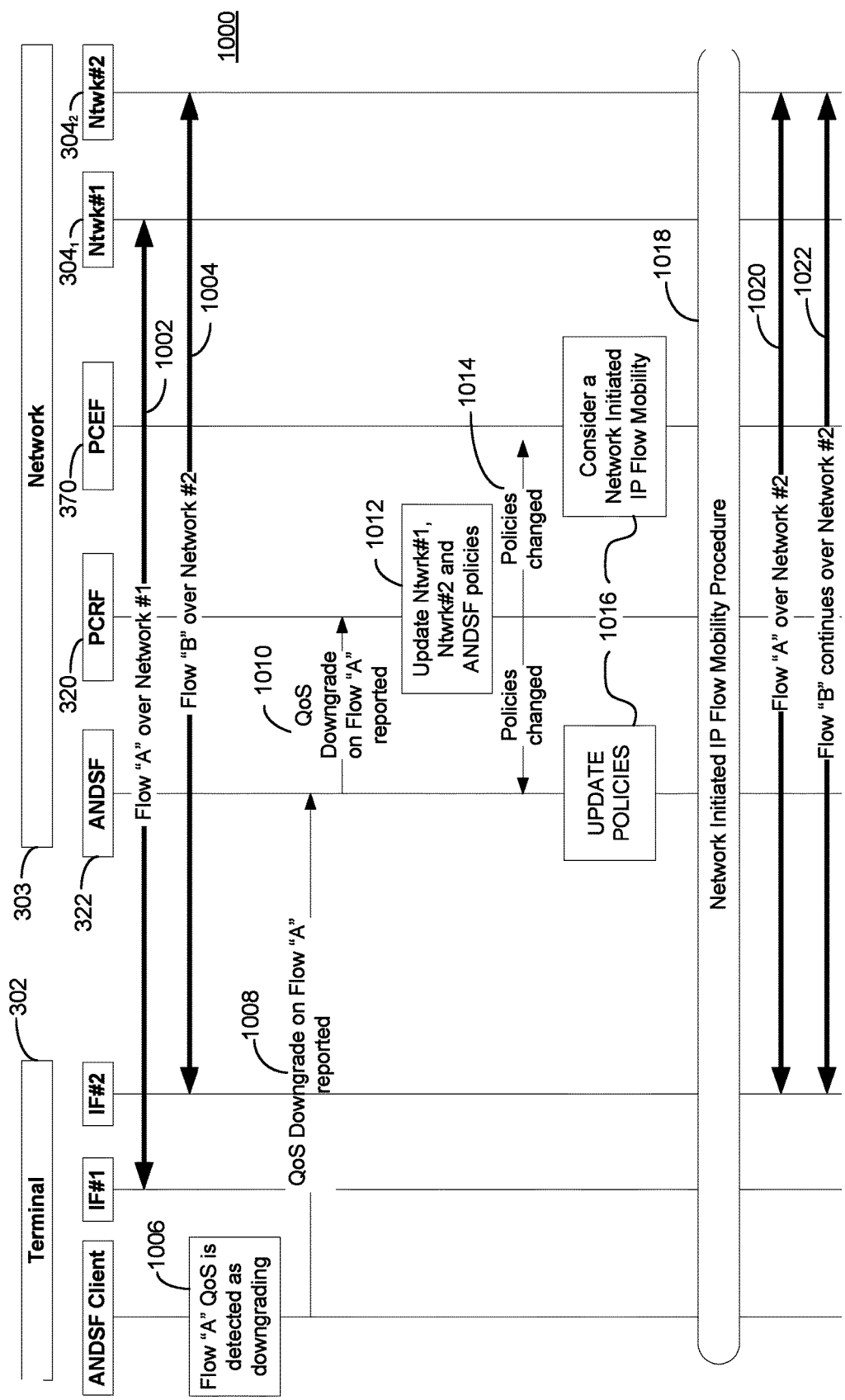
FIG. 10 is a flow diagram illustrating an example process for performing network-initiated IFOM using ANDSF information.

FIG. 10 is a flow diagram illustrating an example process 1000 for performing network-initiated IFOM using ANDSF information. The process 1000 is described with reference to the communications system 300 of FIGS. 3A-3C. The process 1000 may be carried out in other communications systems, as well.

At 1002, the WTRU 302 and a first access, such as, the 3GPP access $304_1$ may exchange flow "A" via a first interface of the WTRU 302. At 1004, the WTRU 302 and a second access, such as, trusted-non-3GPP access $304_2$, may exchange flow "B" via a second interface of the WTRU 302. At 1006, the WTRU 302 may detect QoS of flow "A" QoS has degraded below an acceptable limit, and passes this performance metric ("QoS-degradation metric") to the ANDSF client of the WTRU 302. At 1008, the ANDSF client may alert the ANDSF server 322 and may pass the QoS-degradation metric to the ANDSF server 322. At 1010, the ANDSF server 322 may convey the QoS-degradation metric to PCRF 320.

At 1012, the PCRF 320 may use the QoS-degradation metric to update the policy for the WTRU 302. At 1014, the PCRF 320 may send updated routing rules to the PCEF 370 for the flows "A" and "B", and to the ANDSF 322 to update the ISRP. At 1016, the PCEF 370 may initiate a network-controlled flow mobility to switch flow "A" to the trusted-non-3GPP access $304_2$ and to the second interface of the WTRU 302, and the ANDSF 322 may update the ISRP (which may possibly prevent a contention issue). At 1018, the flow mobility procedure is determined successful. At 1020, the flow "A" is sent via the trusted-non-3GPP access $304_2$, and the second interface of the WTRU. At 1022, the flow "B" continues unchanged.

Example Use of PCRF Information by ANDSF

The PCRF 320 may provide information to the ANDSF 322, which may also potentially get propagated to the WTRU 302. The PCRF 320 may be able to, for example, adjust ANDSF policies (e.g., ISMP, ISRP, etc.). The MNO may designate the ANDSF polices and parameters that are allowed to be modified by the PCRF 320.

In one embodiment, the ANDSF policies may be mechanism for providing "coarse" control of the overall system policies. For example, at some point, the WTRU 302 acts upon the ANDSF policies. Based on a particular trigger, for instance, the WTRU 302 may initiate a connection to a preferred Wi-Fi hotspot either for idle reselection, active handover, or active multi-RAT IP flow mobility. The network may ensure that the procedure is permissible based on (i) the latest operator policies (which might not necessarily be reflected in the WTRU 320 (e.g., UE-MO or other structure)), (ii) current subscriber profile, (iii) current network resources, (iv) etc.

The PCC policies provided by the PCRF 320 may operate as "fine" control of the overall system policies. The PCRF 320 may, for example, modify the allowed parameters in the ANDSF 322 to change the coarse ANDSF policies and re-align WTRU behavior with the latest network conditions (e.g., based on, for example, the network information obtained via the ANDSF 322 and/or the NMCF 324).

For MNO-implemented ANDSF-based WTRU-initiated IP flow mobility, the WTRU 302 may initiate movement of an IP flow from 3GPP access $304_1$ to the untrusted-non-3GPP (Wi-Fi) access $304_3$, for example. If, however, dynamic PCC is implemented in the network and the subscribed QoS cannot be ensured on the untrusted-non-3GPP (Wi-Fi) access $304_3$, the PCRF 320 may update the ANDSF 322 and update an associated policy for that service. The update may include, for example, re-prioritizing Wi-Fi SSIDs; assigning higher priority to the 3GPP access $304_1$; blocking untrusted-non-3GPP (Wi-Fi) access $304_3$ completely; etc. In this way, conflict resolution for a mismatch between the ANDSF policies and PCRF policies may be performed.

Figure 11:
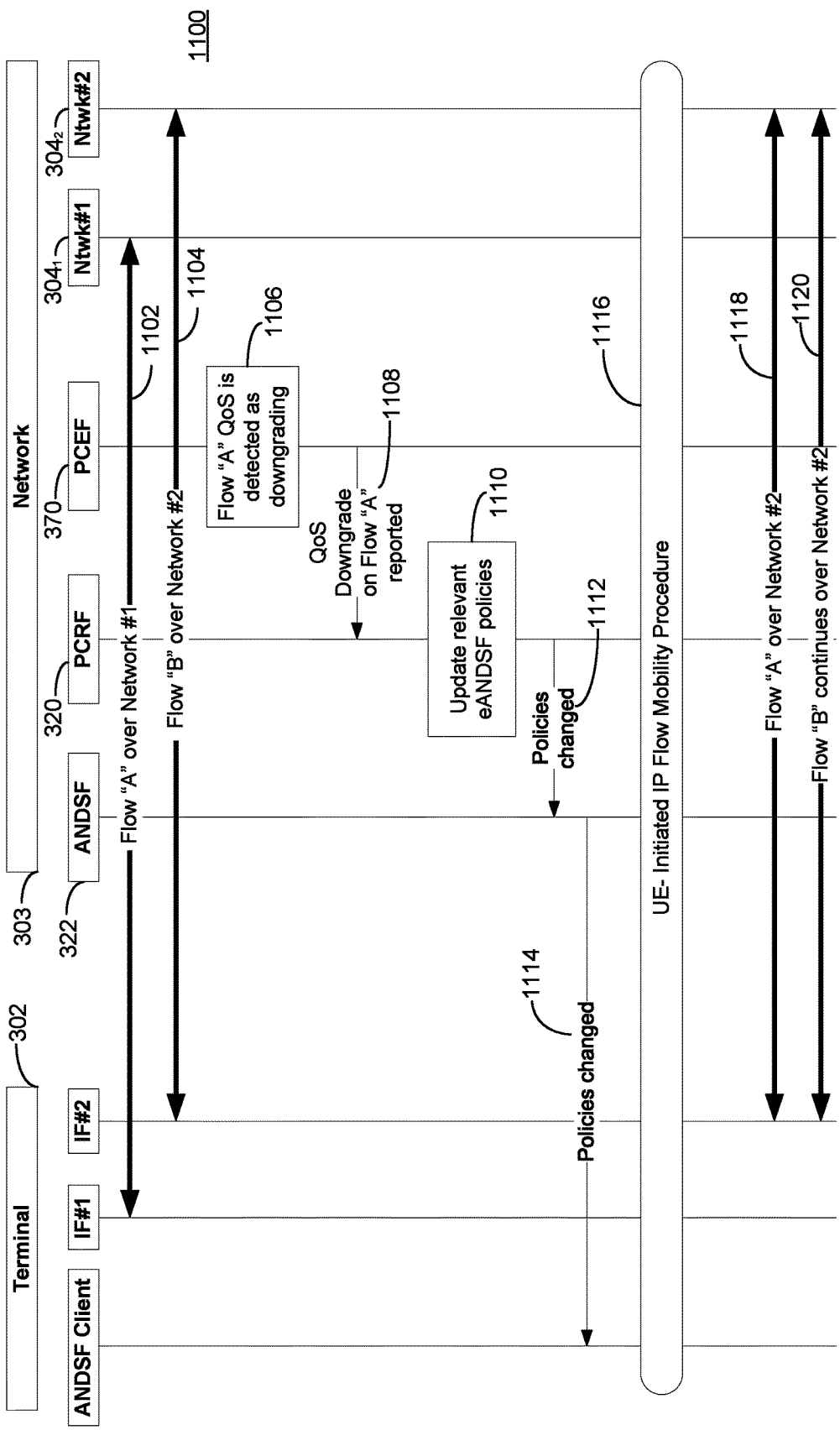
FIG. 11 is a flow diagram illustrating an example process for performing WTRU-initiated IFOM using ANDSF information.

FIG. 11 is a flow diagram illustrating an example process 1100 for performing network-initiated IFOM using ANDSF information. The process 1100 is described with reference to the communications system 300 of FIGS. 3A-3C. The process 1100 may be carried out in other communications systems, as well.

At 1102, the WTRU 302 and a first access, such as, the 3GPP access $304_1$ may exchange flow "A" via a first interface of the WTRU 302. At 1104, the WTRU 302 and a second access, such as, trusted-non-3GPP access $304_2$, may exchange flow "B" via a second interface of the WTRU 302. At 1106, the PCEF 320 may detect QoS of flow "A" QoS has degraded below an acceptable limit. At 1108, the PCEF 320 reports the associated QoS-degradation metric to the PCRF 320. At 1110, the PCRF 320 uses the QoS-degradation metric to update the ANDSF policies.

At 1112, the PCRF conveys updated ANDSF policy information to ANDSF server 322. At 1114, the ANDSF server 322 sends updated routing rules for flow A to the ANDSF client of the WTRU 302. At 1116, the WTRU 302 may initiates flow mobility to switch of flow "A" to the untrusted-non-3GPP (Wi-Fi) access $304_3$ and the second interface of the WTRU 302, and the flow mobility procedure is determined to be successful. At 1118, the WTRU 302 and the untrusted-non-3GPP (Wi-Fi) access $304_3$ may exchange flow "A" via the second interface of the WTRU 302. At 1120, the flow "B" continues unchanged.

As an alternative, the PCEF 370 (operating as a QoS enforcer) detects the QoS degradation on a particular flow and reports the associated QoS-degradation metric to the PCRF 320. Using this information, the PCRF 320 may determine that there is congestion in the network. The PCRF 370 may again modify the allowed parameters in the ANDSF 322. For example, the PCRF 370 may modify the allowed parameters in the ANDSF 322 to, for example, prioritize offload to the untrusted-non-3GPP (Wi-Fi) access $304_3$.

Example of Information Exchanged between ANDSF and PCRF

Congestion Information

Various embodiments herein provide mechanisms for congestion management in the user plane to enable a more efficient use of network resources. In various embodiments, the ANDSF 322 may obtain network information from one or more WTRUs and from the NMCF 324, and provide it "as is" or aggregated to the PCRF 320 for decision making and policy rule generation. In various embodiments, the PCRF 320 may use the WTRU-network information in its decision making and/or NBM decisions, for example.

Application Flow Identification Information

As noted above, the ANDSF 322 is capable of identifying flows using an IP filter. This IP filter may be the IP header 5-tuple (and/or additional optional 3GPP-specific info) provided by the network. Proposed 3GPP R11 extensions (DIDA Work Item) may extend this capability to allow a WTRU to identify such flow according to specific criteria. The WTRU 302 may determine the 5-tuple based on higher-level descriptors ("video flows," "flows with average rate above given threshold," etc.), as an endpoint. The derived flow identities may then be stored in the ANDSF MO at the WTRU 302, and then provided to ANDSF 322 as a measurement and/or report of an event (e.g., "detected a flow according to the defined criteria"). The ANDSF 322 may then provide the flow identifies to the PCRF 320. The PCRF 320 may use the flow identifies from the ANDSF 322, instead of using TDF to derive the same. As an alternative, the HA 307 may derive the flow identifies, and pass them to the PCEF 370. The PCEF 370 may then pass them to the PCRF 320.

Example Operations

Figure 12:
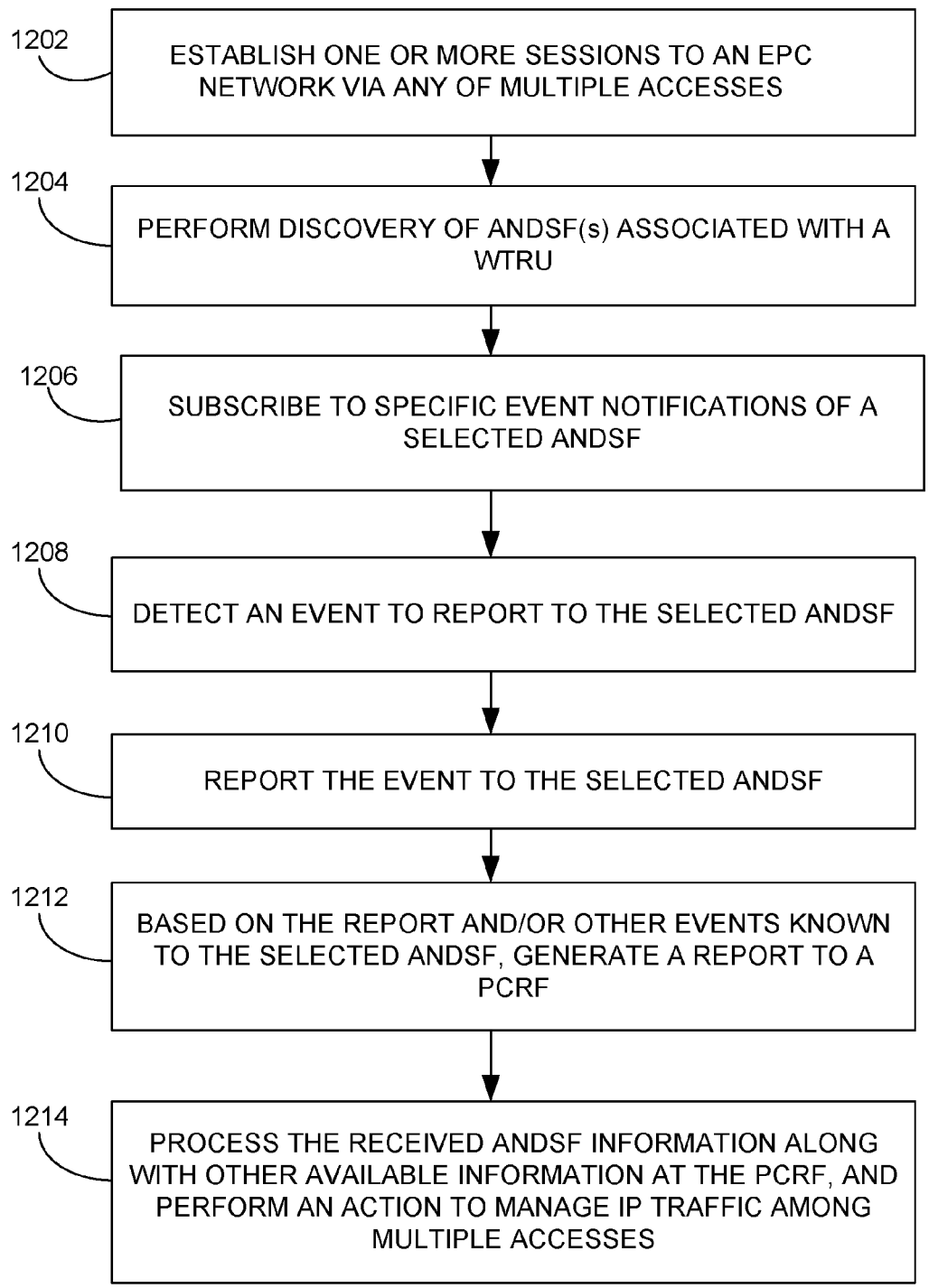
FIG. 12 is a flow diagram illustrating an example process for managing and/or enforcing polices for IP traffic management among multiple accesses.
Figure 15:
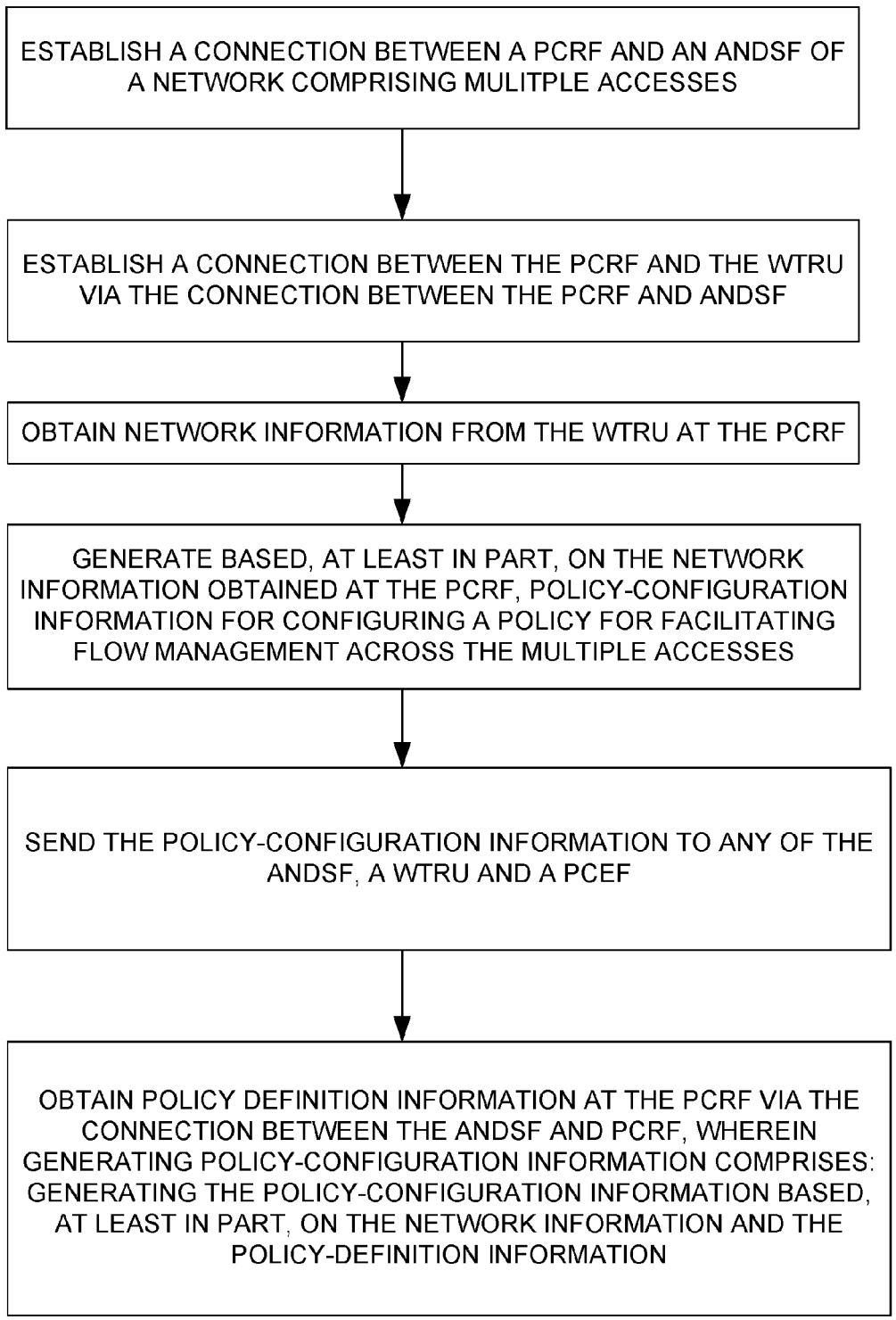
FIGS. 15-18 are flow diagrams illustrating example processes 1500-1800 for enabling interaction among ANDSF and PCC entities.
Figure 16:
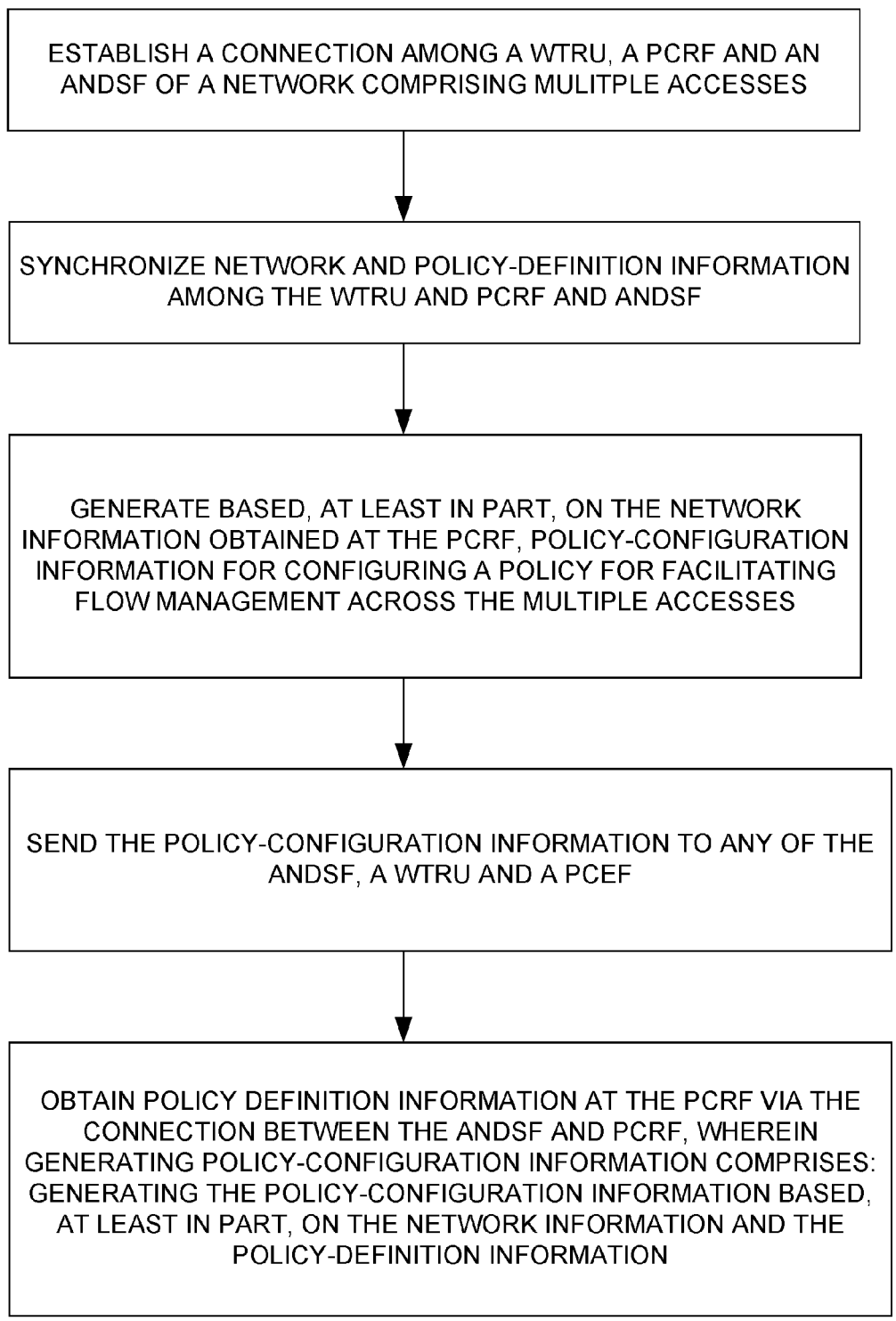
Figure 17:
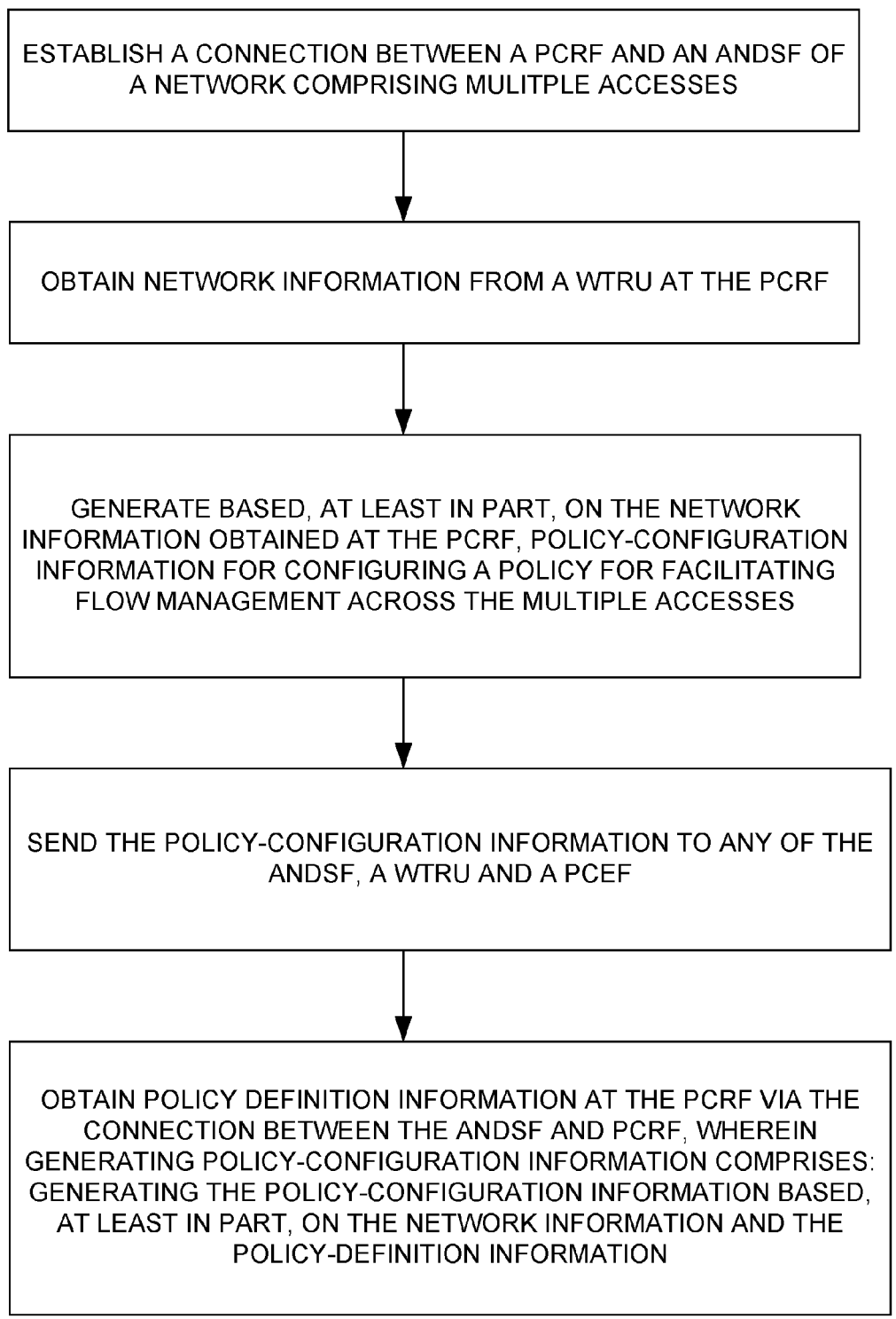
Figure 18:
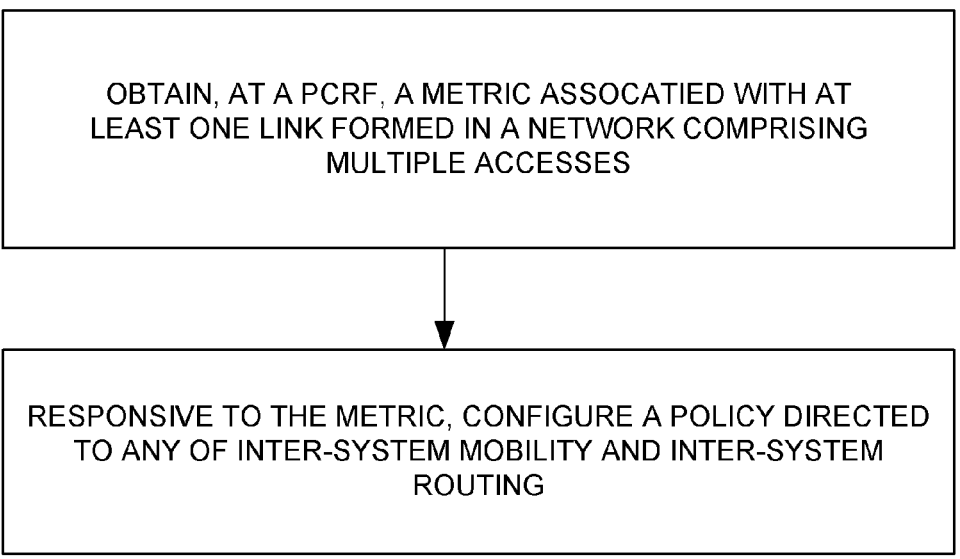

FIG. 12 is a flow diagram illustrating an example process 1200 for managing and/or enforcing polices for IP traffic management among multiple accesses of a network. The process 1200 is described with reference to the communications system 300 of FIGS. 3A-3C, for simplicity of exposition. The process 1200 may be carried out in other communications systems, as well.

The WTRU 302 may establish one or more sessions to the EPC network 303 via any of the 3GPP access $304_1$ trusted-non-3GPP (Femto) access $304_2$ and untrusted-non-3GPP (Wi-Fi) access $304_3$, as shown at 1202 The PCRF 320 may perform discovery to determine whether there are any ANDSFs associated with the WTRU 302 using, for example, the ANDSF discovery process noted above, as shown at 1204. After discovering one or more associated ANDSFs, the PCRF 320 may subscribe to specific event notifications from such ANDSFs, including, for example, the ANDSF 322, as shown at 1206.

At some point, the WTRU 302 may detect an event that should be reported to the ANDSF 322, e.g., based on criteria previously specified to the WTRU 302 by the ANDSF 322, as shown at 1208. In turn, the WTRU 302 may report this event to the ANDSF 322, as shown at 1208. Based on the WTRU report and/or other events known to the ANDSF 322, the ANDSF 322 may generate a report to the PCRF 320, as shown at 1210. As shown at 1212, the PCRF 320 may then process the received ANDSF information along with other available information, and take an action to initiate management IP traffic among the accesses $304_{1-3}$. The action may be to initiate any of the following: a new bearer establishment, modification, or deletion over the same or different access system; blocking of an SDF by updating the Gating Control in the PCC rule; updating of event reporting and/or triggers to the ANDSF 322, PCEF 370, and/or BBERF 374; updating of QoS rules sent to the ANDSF 322, PCEF 370, and/or BBERF 374; and redirection (e.g., steering) of packets, belonging to an application defined by the ANDSF-provided application identifier, to the specified redirection address.

FIG. 13 is a flow diagram illustrating an example process 1300 for managing and/or enforcing polices for IP traffic management among multiple accesses of a network. For simplicity of exposition, the process 1300 is described with reference to the communications systems 300, 400 of FIGS. 3A-3C and 4, respectively. The process 1300 may be carried out in other communications systems, as well.

At 1302, the NMCF 324 may obtain performance metrics associated with any of the accesses $304_{1-3}$. The performance metrics may include any of usage, congestion, connectivity, loading and latency. The performance metrics may be provided via respective interfaces of the accesses $304_{1-3}$, and may be collected, derived, generated, garnered or otherwise obtained from network condition reports and/or other measurements provided from one or more of the accesses $304_{1-3}$. In various embodiments, the NMCF 324 may obtain performance information associated with one or more of the accesses $304_{1-3}$; and in turn, generate the performance metrics from the obtained performance information. In various embodiments, the performance metrics may be retransmission metrics associated with at least one access of the plurality of accesses $304_{1-3}$. The performance metrics may include other metrics, as well.

At 1304, any of the ANDSF 322 and PCRF 320 may adapt one or more rules of one or more policies for managing IP traffic associated with the WTRU 302 ("WTRU-IP traffic") among the plurality of accesses $304_{1-3}$ based, at least in part, on the performance metrics and a policy for managing bandwidth among the accesses $304_{1-3}$. For example, the PCRF 320 may adapt rules of QoS policy control of the WTRU IP traffic. Alternatively, the PCRF 320 may adapt rules of gating policy control of the WTRU IP traffic. As another alternative, the PCRF 320 may adapt rules of any of QoS and gating policy control of IP traffic not associated with the WTRU 302 ("non-WTRU-IP traffic")

The ANDSF 322 may, for example, adapt rules of policies for managing connections to the any of the accesses $304_{1-3}$. The ANDSF 322 may, alternatively, adapt rules of policies for managing any of discovery and selection of the accesses $304_{1-3}$ for the WTRU-IP traffic and/or the non-WTRU-IP traffic. Alternatively, the ANDSF may adapt rules of the ISMP and/or the ISRP for any of the WTRU-IP traffic and non-WTRU-IP traffic.

As another alternative, the ANDSF 322 may adapt rules of one or more policies for causing dynamic adaptation of bearers for the WTRU-IP traffic and/or the non-WTRU-IP traffic. Adaptation of the bearers may include any of establishment, modification and release of such bearers.

Once the ANDSF 322 and/or PCRF 320 adapt their respective rules, one or more of the adapted rules may be provided to the WTRU 302. The adapted rules provided to the WTRU 302 from the ANDSF 322 may be carried out through synchronization of the NETWORK MO and the UE MO, for example. In some instances, the adapted rules provided to the WTRU 302 from the ANDSF 322 may cause the WTRU 302 to adapt one or more locally-maintained rules of one or more policies for the WTRU-IP traffic among the plurality of accesses.

At 506, the PCEF 370 and/or the WTRU 302 may manage the WTRU-IP traffic among the accesses $304_{1-3}$ responsive to the adapted rules for managing IP traffic. The PCEF 370 may, for example, apply one of more of the adapted rules to the WTRU-IP traffic. The adapted rules may include one or more rules for QoS and/or gating policy control of the IP traffic, including, for example, managing one or more data flow of WTRU-IP traffic among the plurality of accesses and/or aggregating bandwidth from at least two of the accesses $304_{1-3}$ for the WTRU-IP traffic and/or the non-WTRU-IP traffic.

In some instances, the reception of the adapted rules at the WTRU 302 from the ANDSF 322 may cause the WTRU 302 to not only adapt one or more locally-maintained rules of one or more policies for managing the WTRU-IP traffic among the plurality of accesses, but also cause the WTRU 302 to apply one or more of the locally-maintained rules to the WTRU-IP traffic.

In various embodiments, the PCEF 370 (via the HA 307) and/or the WTRU 302 may re-route at least one retransmitted packet from one of accesses $304_{1-3}$ to another on a condition that the performance metric relating to packet retransmissions satisfies a threshold.

FIG. 14 is a flow diagram illustrating an example process 1400 for enabling interaction among access network discovery and selection function ("ANDSF") and policy control and charging ("PCC") entities. Such interaction may be useful for multi-access flow management, and/or bandwidth aggregation among the multiple accesses. For simplicity of exposition, the process 1400 is described with reference to the communications systems 300, 400 of FIGS. 3A-3C and 4, respectively. The process 1400 may be carried out in other communications systems, as well.

At 1402, a connection may be established between the PCRF 320 and the ANDSF 322. At 1402, information about the network ("network information") may be obtained at the PCRF 320, via the connection between the ANDSF 322 and the PCRF 320. At 1406, policy-configuration information for configuring a policy for facilitating flow management among the multiple accesses $304_{1-3}$ may be generated based, at least in part, on the network information obtained at the PCRF 320. At 1408; the policy-configuration information sending to any of the ANDSF 322, the WTRU 302, and the PCEF 370.

Although not shown, in various embodiments, information defining the policy ("policy definition information") may be obtained, at the PCRF 320, via the connection between the ANDSF 322 and PCRF 320. In various embodiments, the policy-configuration information may be generated based, at least in part, on the network information and the obtained by the PCRF 320 and the policy-definition information.

In various embodiments, the connection between the PCRF 320 and the ANDSF 322 may be established in accordance with any of a Diameter protocol, a Diameter application and a protocol based on the Diameter protocol. In various embodiments, the connection between the PCRF 320 and the ANDSF 322 may be established in accordance with a device management ("DM") protocol. This DM protocol may include a DM protocol in accordance with an Open-Mobile Alliance ("OMA") DM protocol.

In various embodiments, the obtained network information may include any of static and dynamically updated network information garnered from the policy-definition information, access network discovery information, network status information, subscriber information and traffic-identification information.

In various embodiments, the obtained network information may include network information detected by one or more WTRUs. In various embodiments, the WTRU-detected network information may be obtained by the ANDSF 322 via respective connections between the ANDSF 322 and the WTRUs.

FIGS. 15-18 are flow diagrams illustrating example processes 1500-1800 for enabling interaction among the ANDSF 322 and the PCC entities. Such interaction may be useful for multi-access flow management, and/or bandwidth aggregation among the multiple accesses. For simplicity of exposition, the processes 1500-1800 are described with reference embodiments disclosed under a heading entitled "Embodiments" (below).

The measurements and/or metrics identified below may be reported by the WTRU 302 and Trusted or untrusted accesses may be used to enhance policy-based Session Management, including any IP flow management, such a MAPCON), IFOM, Operator Policies for IP Interface Selection ("OPIIS").

In various embodiments, the measurements and/or metrics may be use to perform policy-based flow management across the multiple accesses $304_{1-3}$. The measurements and/or metrics may be extracted from RAT drivers, application statistics, etc.

A mechanism to discover Extended Service Set ("ESS") measurements-based PCC is provided; along with a process to make the ANQP information retrieved over Wi-Fi available to others technologies. Various embodiments of network-controlled and WTRU-initiated flow mobility are provided as well.

Measurements Based PCC Architecture Example

FIG. 19 is a block diagram illustrating an example of a communications system 1900 in which one or more disclosed embodiments may be implemented and/or carried out. The communications system 1900 may be suitable for implementing and/or carrying out any of BWM, BWA, flow management, IFOM and the like to IP traffic that may be carried over among multiple accesses and/or access systems; some, all or none of which use different access technologies. The communications system 1900 of FIG. 19 is similar to the communications system 300 of FIGS. 3A-3C, except as described herein.

As shown, the WTRU 302, SGSN 248, eNB 1902, trusted-non-3GPP access $304_2$, PGW 366 and ePDG 326 may include respective information collection functions ("ICF(s)"), and the WTRU 302, PCRF 320, ANDSF 322 and PCEF 370 may include respective policy update functions ("PUF(s)"). Each of the WTRU ICF, SGSN ICF, GGSN-ICF, eNB ICF, trusted-non-3GPP access ICF, PDN-GW ICF and ePDG ICF may monitor radio and/or network conditions available to such devices, and may obtain performance metrics associated with the available radio and/or network conditions.

As an example, the WTRU ICF may monitor radio and/or network conditions at the WTRU 302, and collect, derive, generate or otherwise obtain performance metrics, performance information and/or network condition reports associated with such conditions (collectively "WTRU-ICF performance metrics"). The WTRU ICF may report or otherwise provide the WTRU-ICF performance metrics to any of the WTRU PUF, PCRF PUF and ANDSF PUF. The WTRU ICF may, for example, report the WTRU-ICF performance metrics to the ANDSF 322 over the S14 interface. Similarly, the WTRU ICF may report the WTRU-ICF performance metrics to the PCRF 320 via an intermediate node, such as, ANDSF 322 or PDN GW 366 using appropriate interfaces indicated in FIG. 19.

The ANDSF 322 may store the WTRU-ICF performance metrics in an appropriate location using a suitable data structure. The ANDSF PUF, in turn, may obtain the stored WTRU-ICF performance metrics from the ANDSF data structure, and adapt (e.g., update) rules of policies using the ANDSF MO for managing IP traffic among accesses $304_{1-3}$ and $1904_{1-2}$ based, at least in part, on the obtained performance metrics and a BWM policy for managing bandwidth among accesses $304_{1-3}$ and $1904_{1-2}$.

The WTRU ICF may alternatively and/or additionally report the WTRU-ICF performance metrics to the PCRF 320. The WTRU ICF may report the WTRU-ICF performance metrics via the PCEF 370, for instance. The PCRF 320 may provide the WTRU-ICF performance metrics to the PCRF PUF. The PCRF may use the obtained WTRU-ICF performance metrics to adapt one or more of the rules of one or more of the policies for managing IP traffic among the accesses $304_{1-3}$ and $1904_{1-2}$ based, at least in part, on the obtained performance metrics and a policy for managing bandwidth among the plurality of accesses $304_{1-3}$ and $1904_{1-2}$.

The PGW ICF may monitor radio and/or network conditions at the PGW 366, and collect, derive, generate or otherwise obtain any of performance metrics, performance information and other measurements associated with the monitored conditions (collectively "PGW-ICF performance metrics"). The PGW-ICF may report or otherwise provide the PGW-ICF performance metrics to any of the WTRU PUF, PCRF PUF and ANDSF PUF. The PGW-ICF may be a sub-task of PGW 366 or a separate entity with an interface to the PGW 366.

The ePDG ICF may collect information about the untrusted non-3GPP access 304₃. The ePDG ICF, for example, may collect measurements related to a secure tunnel (e.g., an IPsec tunnel) that terminates at the ePDG 326. These measurements may include keep-alive messaging and other parameters used to maintain the tunnel. The ePDG ICF may determine performance metrics ("ePDG-ICF performance metrics"), such as, end-to-end network latency, latency over the untrusted non-3GPP access network and tunnel throughput, from the collected measurements. The ePDG ICF may report the ePDG-ICF performance metrics to any of the WTRU PUF, PCRF PUF and ANDSF PUF. The WTRU PUF may relay or otherwise provide the ePDG-ICF performance metrics to the PCRF PUF and/or ANDSF PUF. The PCRF PUF and ANDSF PUF may use the ePDG-ICF performance metrics to adapt one or more rules of one or more policies for managing IP traffic among the accesses $304_{1-3}$ and $1904_{1-2}$ based, at least in part, on the obtained performance metrics and a policy for managing bandwidth among the accesses $304_{1-3}$ and $1904_{1-2}$. Similarly, the WTRU PUF may relay or otherwise provide the PDN-GW-ICF or eNB-ICF or trusted-non-3GPP-IP-access performance metrics to the PCRF PUF and/or ANDSF PUF. More generally, any PUF may relay the performance metrics that it receives to any other PUF using appropriate interfaces.

Like the ePDG ICF, the PCEFs 370 of the PGW 366, SGW 364, and GGSN 270 may include ICF functionally for collection performance information for use in determining the end-to-end network latency and tunnel throughput.

Although being shown as included within the WTRU 302, PCRF 320 and ANDSF 322, the PUF(s) may be included on other points of the PCC architecture 319.

The architecture of the communications system 1900 may include (1) H/E(e)NB (e.g., Femto APs) and (2) CGW (e.g., an integrated Femto and Wi-Fi (IFW) AP). The H/E(e)NB and CGW may be in local premises, which may be residential, outdoor metro/campus/enterprise, indoor malls, etc. Such architecture is different from the interworked 3GPP and non-3GPP (Wi-Fi) access which interworking occurs in the PGW 366, which is located in the EPC network 303. Each of the H(e)NB and CGW may include both an ICF and PUF, which is different from the interworked 3GPP and non-3GPP access, where in the eNB 1902, trusted-non-3GPP access 1902, and ePDG 326 may include respective ICFs, but not respective PUFs. In various embodiments where edge-based' APs (e.g., Femto only or IFW), some policies may also be resident in edge (or local premises), which may interact and/or coordinate with the policy entities of the EPC network 303. If the Wi-Fi in the IFW-AP is not trusted and managed by a mobile network operator ("MNO"), then the IFW-AP might not include an ICF on the Wi-Fi of the IFW-AP.

In various embodiments, where the Wi-Fi AP is not trusted (e.g., no trust relationship exists between the MNO and the AP-provider, be they the end user or some HotSpot provider), the WTRU ICF may obtain AP-related measurement information, and relay it to the EPC network 303, since the WTRU 302 is a trusted entity of the MNO.

PCC Related Information

Example Information Stored in PUFs

FIG. 20 is a chart illustrating a Table 1 listing (i) various policy related information stored as ANDSF MOs at any of the PUFs, namely at WTRU, PCRF or ANDSF entities and (ii) other information that may be collected by any of the ICFs and stored in the ANDSF MO in any of the PUFs. ANDSF MOs enhanced to store any such other information is referred to as EANDSF or eANDSF.

Example RAN Information Provided by ICFs

FIG. 21 is a chart illustrating a Table 2 listing information that may be collected about the 3GPP RAN cell and be reported to any of the PUFs at WTRU 302, ANDSF 322 and PCRF 320.

Example 3G Specific Information

The 3G specific information that may be collected by any of the ICFs and stored at any of the PUFs may include one or more physical measurements set forth in 3GPP TS 25.215. For WTRU reported measurements, the 3G specific information may include CPICH RSCP, PCCPCH RSCP, UTRA carrier RSSI, GSM carrier RSSI, CPICH Ec/No, Transport channel BLER, UE transmitted power, UE GPS Information, E-UTRA RSRP, etc. For UTRAN reported measurements, the 3G specific information may include received total wide band power, SIR, SIR error, Transmitted carrier power, Transmitted code power, Transport channel BER, physical channel BER, Round trip time, etc. . . .

Example Wi-Fi Specific Information

The Wi-Fi specific information that may be collected by any of the ICFs and stored at any of the PUFs may include one or more measurements set forth in IEEE STD 802.11-2007. Examples of such collectable Wi-Fi specific information may include RTS Success and Failure Count, ACK Rate, FCS Error Count, etc . . .

Example Information Provided by Gateways (GWs) Entities

GWs entities may play an important role in the operation of the CN. They may serve as tunnel termination points, termination points for certain protocols, NATs, etc. As such, the gateway may possess some information useful for policy decision making.

One type of information available at the GWs is information about a specific WTRU, which may be (e.g., implicitly) obtained when a tunnel exists between the WTRU and the GWs. Such tunnel may be secured (e.g., with IPsec) or, alternatively, unsecured. The tunnel between a GW and the WTRU 302 provides a connection that encompasses all the non-CN intermediate steps involved in communication between CN and the WTRU 302. Thus, end-to-end performance metrics associated with the tunnel may be used as an indicator of how well non-CN controlled networks can be used to provide mobile network services to the WTRU 302. This information may be used to provide proper network management. An example of this is the tunnel between ePDG 326 and the WTRU 302, which tunnel is generally required for access over non-trusted non-3GPP accesses. Table 3 of FIG. 22 provides information that may be collected from WTRU-to-GW tunnels (e.g., WTRU-to-ePDG tunnels).

Another type of tunnel is one that exists between the access network gateway (e.g. HeNB or a trusted Wi-Fi AP/GW) and the corresponding GW in the CN (SGW for HeNB, PDN GW for Trusted Wi-Fi AP/GW). Like the per UE tunnel, such tunnel is typically secured, and carries aggregated user data from the access network GW and signaling, as well. A GTP is a frequently used as the transport protocol in such tunnels. Like the per-UE tunnel, the tunnel between an access network GW and the CN may be an indicator of a quality of connection between the two over what is, frequently, a third party network—or even the Internet (although, unlike the per-UE tunnel, the air-interface performance metrics might not be included in these metrics). The air-interface performance metrics may be provided by the network access gateway using measurements described in more detail below. Table 4 of FIG. 23 provides information that be collected at the CN gateway from each access network tunnel.

Example Backhaul Information

The access to a specific technology may be based, at least in part, on the state (e.g., load, IP protocol supported, etc.) of the backhaul. Under certain conditions, the radio interface can provide a high bandwidth with good quality of transmission, but the backhaul may be a bottleneck. Obtaining this information in advance may result in the WTRU 302 being prevented to connect to an AP that might not provide an expected QoS. Table 5 of FIG. 24 provides backhaul information that may be collected, reported and/or used for managing IP traffic.

Example ANQP Information

ANQP through Wi-Fi may provide the WTRU 302 with information related to the services and capabilities of the local AP, such as venue name information, emergency call number information, IP address type availability, etc . . .

While such information may be related to the Wi-Fi AP, the information may be relevant, for example, for neighboring networks. The WTRU 302 may operate as a relay for the ANQP information. The WTRU 302 may retrieve ANQP information received over Wi-Fi, and store the ANQP information locally, e.g. into ANDSF MO, to be further retrieved by an entity of the 3GPP network (e.g., the ANDSF Server) and/or other network.

Example Session & User Experience Information

The WTRU 302 may collect statistics of individual sessions, including PS & CS, as well as User Experience metrics and communicate such analytics to the network.

Examples of session-based analytics may include average throughput, average latency, TCP retransmission counts, any time-outs etc. The User Experience metrics may include dropped call and/or overall quality metric quantified into a set of numbers or descriptors (such as poor to excellent), etc.

The communication of such analytics to the network may be direct, via suitable NAS messages, or by updating the UE-MO, which may be subsequently synchronized with the ANDSF-Server.

Example Measurements-based PCC Functions

The policies may help the WTRU to adequately select an appropriate radio access based on the ISMP, and Discovery Information. For IP Flow mobility, PCC provides guidelines to ensure IP Flow Continuity and expected QoE.

While the WTRU information may provide good information about each individual WTRU, global information related to all WTRUs served by the same RAN may be used to provide a better policy decision. The WTRU 302 and RAN information can be used to optimize PCC functions, for instance.

The measurements received by ANDSF 322 through s14 and the measurements received at the PCRF 320 may be exchanged between both entities. The decisions about which measurements need to be available at the ANDSF 320 and/or at the PCRF 320 may depend on the requirements of the measurements-based PCC functions.

Example Multi-Network Load Balancing

In various embodiments, both of the ANDSF 322 and PCRF 320 may consider an overall system condition in determining appropriate policies or updating existing policies for managing IP traffic associated with each WTRU 302 among a set of the multiple accesses 304.

Figure 25:
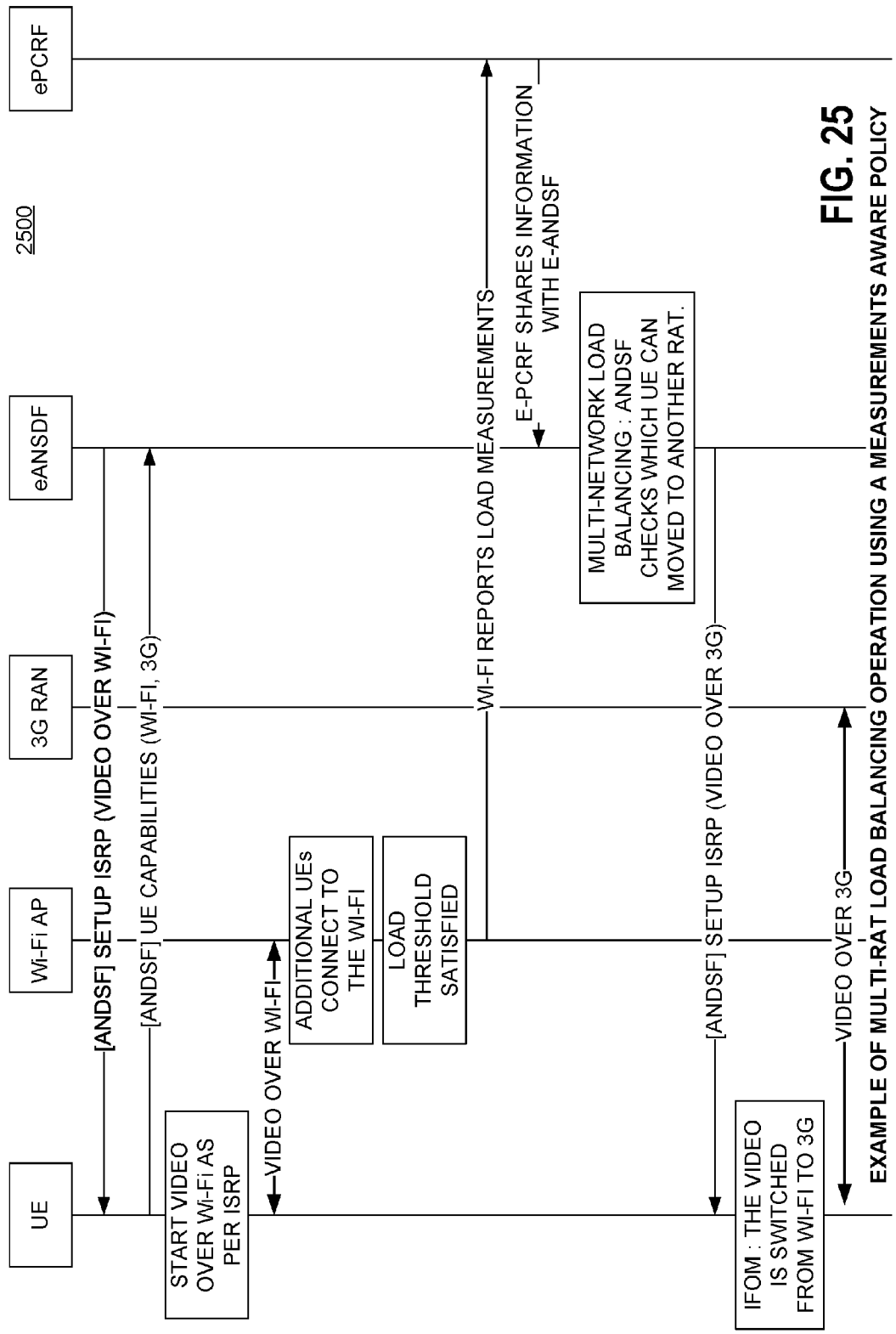
FIG. 25 is a flow diagram illustrating an example process for managing and/or enforcing polices for IP traffic management among multiple accesses.

As shown in procedure 2500 of FIG. 25, an operator might make a decision that all video calls should be processed over a local/high-speed radio access, such as Wi-Fi. To facilitate this, the policies (ISMP, ISRP) may be provisioned accordingly. If, however, all WTRUs in the same Wi-Fi cell strictly follow this policy, the Wi-Fi cell may become quickly constrained and/or overloaded.

The PCC polices may be provisioned to consider the cell information and the UE capabilities so that the operator may balance video calls between Wi-Fi (e.g., for the devices that support only Wi-Fi) and cellular (for the devices that supports only cellular or both Wi-Fi and cellular).

The ANDSF 322 may configure the WTRU with predefined operator policy to the WTRU 302, which provide the ANDSF with its own capabilities. After the WTRU 302 starts a video, and based on received ANDSF MO, the video may start over Wi-Fi. Meanwhile, others WTRUs join the Wi-Fi network, based on their own policies received too from the ANDSF.

All WTRUs may run their applications, and the Wi-Fi AP may detect that the load reaches a threshold, which may be previously provisioned by the operator or through policies. The Wi-Fi AP may report this event back to the PCRF 320 over S2a interface, and provide the load information to the PCRF 320. PCRF 320 may share the information with the ANDSF 322, which may perform a load balancing function to determine which WTRU(s) and related application(s) to de-place. Based on the load balancing decision, the ANDSF 320 may update the policies to the selected WTRU so that it performs flow mobility on the detected application.

FIG. 25 implicitly assumes that the Wi-Fi AP is trusted. If not trusted, the ICF in the Wi-Fi AP may inform the WTRU 302 of the load conditions, and the WTRU may relay it to the ANDSF 322. Subsequent steps in the procedure 2500 may be identical to the ones shown in FIG. 3.

Flow-based Traffic Management

Figure 26:
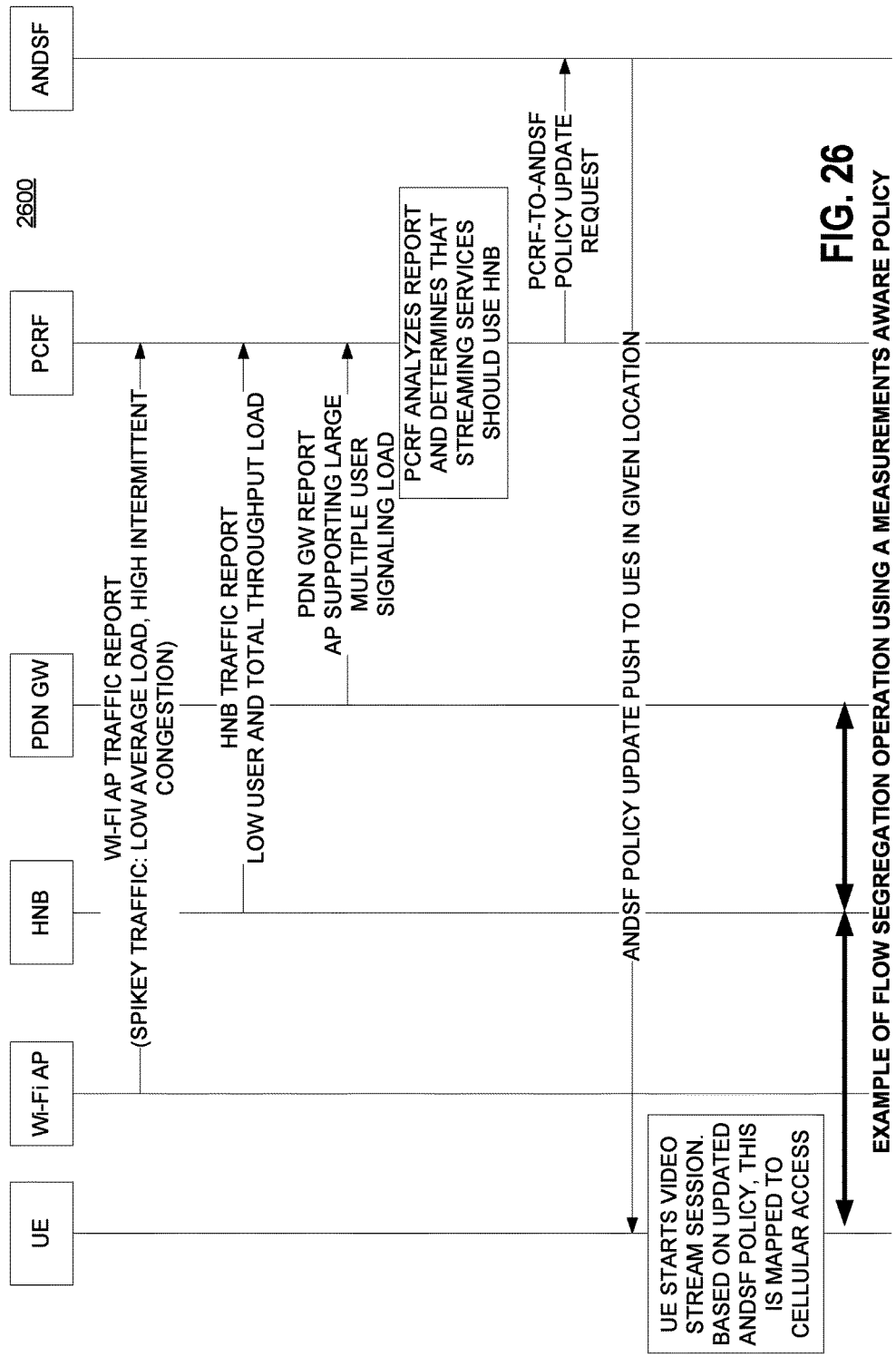
FIG. 26 is a flow diagram illustrating an example process for managing and/or enforcing polices for IP traffic management among multiple accesses.

The procedure 2600 of FIG. 26 may consider a Wi-Fi hot-spot owned by the operator (and thus "trusted"). The hot-spot may be currently supporting about 20 smart-phone devices browsing the Internet, using Facebook (which requires presence) and running other low-rate, high-signaling web-based services. By offloading web-browsing flows to the Wi-Fi network, the operator may significantly reduce the impact of the associated signaling on its network, while delivering the required QoE to all 20 users.

At some point, one of the users initiates a large video streaming session. If this session remains on Wi-Fi (which may be likely with a typical use of WTRU-centered approaches), it may significantly degrade the QoE for the remaining 19 users (as well as the web-browsing QoE of the "offending" user, should such user decide to continue browsing while streaming). Depending on their policy, the users may remain on the Wi-Fi network (unhappily); or move to the cellular network bringing all the issues associated with support of signaling load with them. In various embodiments, the video-stream flow may be moved to the cellular network where a dedicated channel may be allocated for it. By doing so, the network load introduced may be controllable (e.g., the operator may have full control over what the WTRU 302 actually received).

Moving a high-rate streaming data traffic from an offload access network (e.g., Wi-Fi) to the operator network may be counter to the traditional approach taken to high-rate data traffic (which is traditionally offloaded) and is desirable in this case because, for example, a number of very specific network conditions (presence of a large number of low-rate high-signaling users in the same location, relative availability of the licensed spectrum).

According to the procedure 2600 carried out, a flow segregation decision (flow-mapping) is made at the WTRU 302. Thus, WTRU IFOM flow-mobility mechanisms, such as those in 3GPP TS 23.261 as well as ANDSF may be utilized. Prior to making the decision, the PCRF 320 may have obtained a number of network measurements, such as, for example, (i) network air interface traffic characteristics from the Wi-Fi AP, indicating that the traffic is highly spiky; (ii) network air interface report from HNB indicating general availability of system capacity and (iii) a measurement from PGW 366 indicating that the Wi-Fi AP is supporting a large number of low-rate users, but such users tend to deliver heavy intermittent signaling load. Based on these measurements, the PCRF 320 was able to determine that in mapping flows to access networks, the WTRUs in this location may follow a non-standard policy. Such a policy was computed, provided to ANDSF 322, which distributed it to the WTRUs. When one of the WTRUs initiated a video-streaming flow, it was now-following a non-standard ANDSF policy, which was arrived at by (i) taking advantage of the numerous measurements available in the network, and (ii) taking advantage of the ability of the interactions between PCRF 320 and ANDSF 322.

Although FIG. 26 illustrates the HNB and Wi-Fi AP as separate entities, the HNB and Wi-Fi AP may be integrated or otherwise combined into an IFW-AP and located in the local premises. The local premises may also include a local policy function (PUF), which will interwork with the policy functions in the CN. Such hierarchical policy architecture may be implemented by designating certain policy rules as being entirely local, whereas another set of policy rules are decided locally only after consulting with the CN-based policies and a third set of policy rules, which are transparently communicated to and decided by the CN.

Enhanced UE-initiated IFOM

Figure 27:
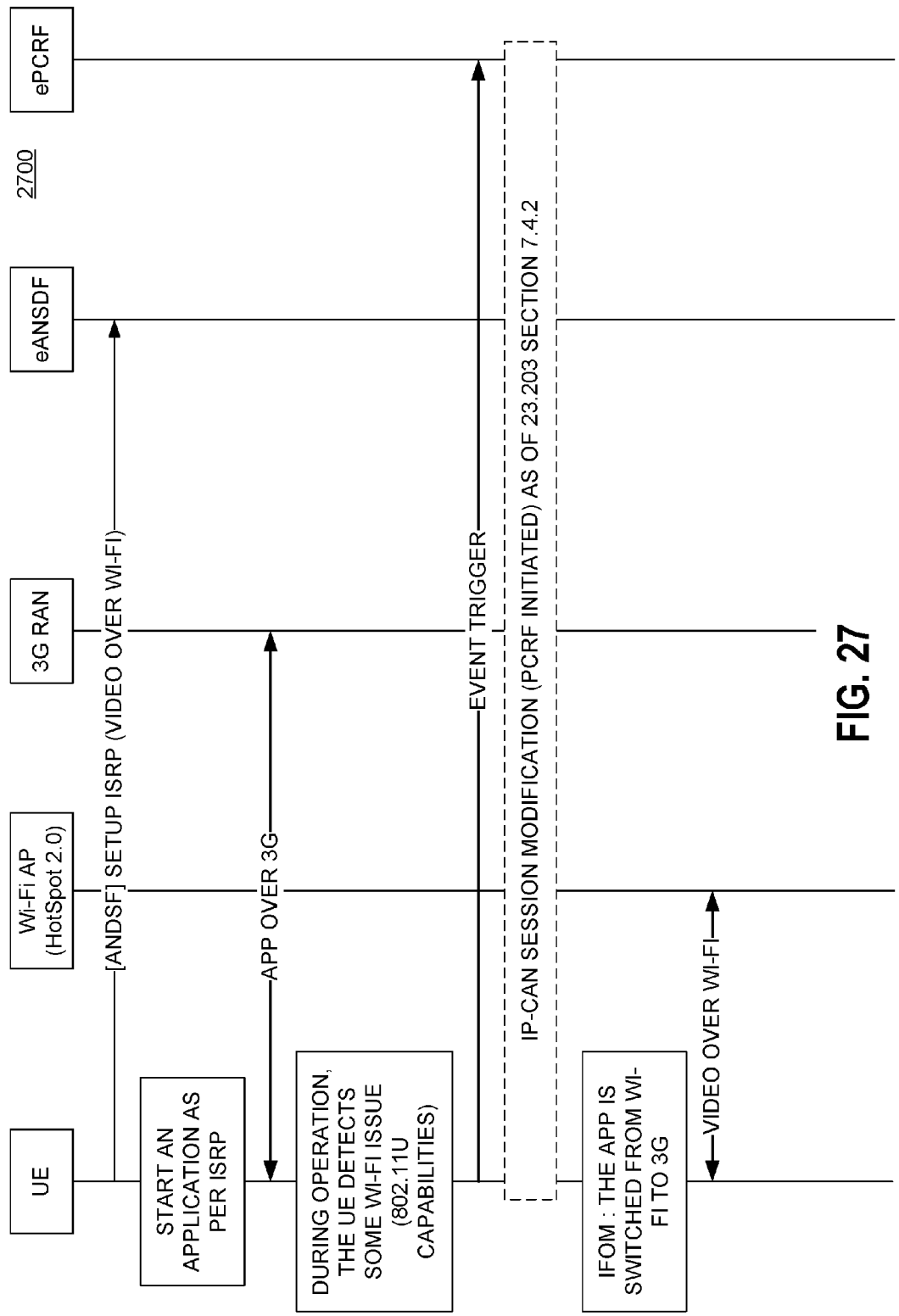
FIG. 27 is a flow diagram illustrating an example process for managing and/or enforcing polices for IP traffic management among multiple accesses.

As shown in the procedure 2700 of FIG. 27, for WTRU-initiated IFOM, the WTRU may rely on operator ISRP policies provided by the network to perform interface selection. The WTRU 302, however, may be aware of which type of connection (untrusted network or private network available not known by the network) are available to it. The ANDSF MO combined with WTRU 302 measurement may be used by the WTRU to decide to re-route any of all the active flows, and to decide on which interface to send any new (seamless and/or non seamless) flow.

The ANDSF 322 may configure the WTRU 302 with pre-defined operator policy to the WTRU 302, which may provide the ANDSF 322 with its own capabilities. The ISRP may be setup to run video over Wi-Fi. When the WTRU 302 starts a video, the only access available to it is 3G, so it runs it over the 3G access. Eventually, the WTRU crosses a Wi-Fi HotSpot. In various embodiments the Wi-Fi version is 802.11u for both WTRU 302 and the AP. The 802.11u provides additional information to WTRU 302 about Wi-Fi network selection. Based on ISRP information, the WTRU may decide to move the active session to Wi-Fi network and notify the PCRF 320 of the decision. PCRF 320, in turn, may perform an IP-CAN Session Modification as stated in TS 23.203 and move the application to the Wi-Fi network.

Measurements-based PCC Service Discovery

At an initial link set, either over Wi-Fi or 3GPP accesses, for the WTRU 302 to enable or disable the measurements reports for PCC, the WTRU may perform discovery to determine if the Measurements-based PCC service is available in the network.

One method for Wi-Fi AP is by introducing information into beacon frames, or by adding new fields in a Generic Advertisement Service (GAS) messages. For 3GPP, the network can add a measurement-based PCC capability field into the ANDSF MO and push the information to the WTRU when connected.

CONCLUSION

Embodiments

In an embodiment, a method may include obtaining performance metrics associated with a plurality of accesses of a network.

In an embodiment, the method may further include adapting one or more rules of one or more policies for managing internet protocol (IP) traffic among the plurality of accesses based, at least in part, on the performance metrics and a policy for managing bandwidth among the plurality of accesses.

In an embodiment, the method may further include managing IP traffic associated with at least one wireless transmit and/or receive unit ("WTRU") among the plurality of accesses responsive to the adapted rules.

In an embodiment, adapting one or more rules may include adapting one or more rules of one or more policies for managing quality of service ("QoS") of the IP traffic associated with the at least one WTRU among the plurality of accesses.

In an embodiment, adapting one or more rules may include adapting one or more rules of one or more policies for managing gating of the IP traffic associated with the at least one WTRU among the plurality of accesses.

In an embodiment, adapting one or more rules may include adapting one or more rules of one or more policies for managing quality of service ("QoS") of IP traffic not associated with the at least one WTRU among the plurality of accesses.

In an embodiment, adapting one or more rules may include adapting one or more rules of one or more policies for managing gating of IP traffic not associated with the at least one WTRU among the plurality of accesses.

In an embodiment, adapting one or more rules may include adapting one or more rules of one or more policies for managing connections to the plurality of accesses for the IP traffic associated with the at least one WTRU.

In an embodiment, adapting one or more rules may include adapting one or more rules of one or more policies for managing connections to the plurality of accesses for the IP traffic not associated with the at least one WTRU.

In an embodiment, adapting one or more rules may include adapting one or more rules of one or more policies for managing selection of the plurality of accesses for the IP traffic associated with the at least one WTRU.

In an embodiment, adapting one or more rules may include adapting one or more rules of one or more policies for managing selection of the plurality of accesses for the IP traffic not associated with the at least one WTRU.

In an embodiment, adapting one or more rules may include adapting one or more rules of one or more policies for managing discovery of the plurality of accesses for the IP traffic associated with the at least one WTRU.

In an embodiment, adapting one or more rules may include adapting one or more rules of one or more policies for managing discovery of the plurality of accesses for the IP traffic not associated with the at least one WTRU.

In an embodiment, adapting one or more rules may include adapting one or more rules of one or more policies so as to cause dynamic adaptation of bearers for the IP traffic associated with the at least one WTRU.

In an embodiment, adapting one or more rules may include adapting one or more rules of one or more policies so as to cause dynamic adaptation of bearers for the IP traffic not associated with the at least one WTRU.

In an embodiment, adaptation of bearers may include any of establishment, modification and release of the bearers.

In an embodiment, adapting one or more rules may include providing one or more of the adapted rules to the at least one WTRU.

In an embodiment, adapting one or more rules may include providing one or more of the adapted rules to the at least one WTRU so as to cause the at least one WTRU to adapt one or more locally-maintained rules of one or more policies for managing IP traffic among the plurality of accesses.

In an embodiment, managing IP traffic may include causing the at least one WTRU to apply one or more of the locally-maintained rules.

In an embodiment, the applied locally-maintained rules may include at least one adapted rule.

In an embodiment, managing IP traffic may include applying one of more of the adapted rules to the IP traffic.

In an embodiment, the applied adapted rules may include at least one adapted rule of at least one policy for managing QoS of the IP traffic.

In an embodiment, the applied adapted rules may include at least adapted rule of at least one policy for managing gating of the IP traffic.

In an embodiment, the applied adapted rules may include at least adapted rule of at least one policy for managing connections to the plurality of accesses.

In an embodiment, the applied adapted rules may include at least adapted rule of at least one policy for managing selection of the plurality of accesses for the IP traffic.

In an embodiment, the applied adapted rules may include at least adapted rule of at least one policy for managing discovery of the plurality of accesses for the IP traffic.

In an embodiment, managing IP traffic may include managing a data flow of IP traffic among the plurality of accesses.

In an embodiment, a data flow may include a data flow of the IP traffic associated with the at least one WTRU.

In an embodiment, managing a data flow may include managing QoS for the data flow.

In an embodiment, managing IP traffic may include aggregating bandwidth from at least two accesses of the plurality of accesses for the IP traffic associated with the at least one WTRU.

In an embodiment, managing IP traffic may include aggregating bandwidth from at least two accesses of the plurality of accesses for IP traffic not associated with the at least one WTRU.

In an embodiment, aggregating bandwidth from the plurality of accesses may include distributing respective portions of the IP traffic among the at least two accesses.

In an embodiment, the policy for managing bandwidth among the plurality of accesses may include: one or more rules for causing adaption of one or more rules of one or more policies for managing any of QoS of IP traffic among the plurality of accesses; gating of the IP traffic among the plurality of accesses; connections to the plurality of accesses; selection of the plurality of accesses for the IP traffic; and discovery of the plurality of accesses for the IP traffic.

In an embodiment, managing IP traffic may include: gating at least a portion of the IP traffic from at least one of the plurality of accesses.

In an embodiment, at least two accesses of the plurality of accesses use different access technologies.

In an embodiment, the plurality of accesses may include any of a 3GPP access, a non-3GPP trusted access and a non-3GPP untrusted access.

In an embodiment, the performance metrics may include: any of usage, congestion, connectivity, loading and latency.

In an embodiment, obtaining the usage of the plurality of accesses may include obtaining packet-based measurements from at least one access of the plurality of accesses.

In an embodiment, the performance metrics are obtained via respective interfaces of the plurality of accesses.

In an embodiment, the performance metrics are obtained from radio reports provided from one or more of the plurality of accesses.

In an embodiment, obtaining the performance metrics may include obtaining information for generating the performance metrics; and generating the performance metrics from the obtained information.

In an embodiment, the performance metrics may include performance metrics relating to packet retransmissions associated with at least one access of the plurality of accesses.

In an embodiment, the performance metrics relating to packet retransmissions may include a number of retransmissions.

In an embodiment, the performance metrics relating to packet retransmissions may include rate of retransmissions.

In an embodiment, the performance metrics relating to packet retransmissions may include performance metrics relating to packet retransmissions by the at least one WTRU.

In an embodiment, the performance metrics relating to packet retransmissions may include performance metrics relating to packet retransmissions by at least one base station of the at least one access of the plurality of accesses.

In an embodiment, managing IP traffic associated with at least one WTRU among the plurality of access networks may include re-routing at least one retransmitted packet from a first access of the plurality of accesses to a second access of the plurality of access networks on a condition that the performance metric relating to packet retransmissions satisfies a threshold.

In an embodiment, the method may further include triggering adaptation of the one or more rules responsive to the performance metrics relating to packet retransmissions satisfying the threshold.

In an embodiment, the policy for managing bandwidth among the plurality of accesses is stored in database of an Access Network Discovery and Selection Function ("ANDSF") entity.

In an embodiment, at least one rule of the one or more rules of one or more policies for managing IP traffic among the plurality of accesses is maintained in the database of the ANDSF entity.

In an embodiment, at least one rule of the one or more rules of one or more policies for managing IP traffic among the plurality of accesses is maintained in a Policy and Charging Enforcement Function ("PCEF") entity.

In an embodiment, at least policy of the one or more policies for managing IP traffic among the plurality of accesses is maintained in a Policy and Charging Rules Function ("PCRF").

In an embodiment, at least one rule of the one or more rules of one or more policies for managing IP traffic among the plurality of accesses is maintained in a database of an Access Network Discovery and Selection Function ("ANDSF") entity.

In an embodiment, at least one rule of the one or more rules of one or more policies for managing IP traffic among the plurality of accesses is maintained in the database of the ANDSF entity.

In an embodiment, at least one rule of the one or more rules of one or more policies for managing IP traffic among the plurality of accesses is maintained in a Policy and Charging Enforcement Function ("PCEF") entity.

In an embodiment, at least policy of the one or more policies for managing IP traffic among the plurality of accesses is maintained in a Policy and Charging Rules Function ("PCRF").

In an embodiment, the PCEF entity is a PCEF entity of a converged gateway ("CGW").

In an embodiment, the PCRF entity is a PCRF entity of the CGW.

In an embodiment, the policy for managing bandwidth among the plurality of accesses may include: any of policy activation time, policy persistence, user permissions, WTRU identity, WTRU priority for uplink and downlink, service classification/identification requirements, preferred access per service for uplink and downlink, minimum QoS per IP flow and maximum QoS per IP flow.

In an embodiment, the plurality of access networks includes at least two of (i) wireless local area networks (WLANs), (ii) cellular networks, (iii) Bluetooth networks and (iii) peer-to-peer networks.

In an embodiment, a system may include a network monitoring and control function ("NMCF") entity configured to obtain performance metrics associated with a plurality of accesses of a network.

In an embodiment, the system may further include a policy and charging rules function ("PCRF") entity configured to adapt rules of at least one policy for managing internet protocol (IP) traffic associated with a wireless transmit and/or receive unit ("WTRU") among the plurality of accesses based, at least in part, on the performance metrics and a policy for managing bandwidth among the plurality of accesses; and In an embodiment, the system may further include a policy and charging enforcement function ("PCEF") configured to manage IP traffic associated with the WTRU among the plurality of accesses responsive to the rules for managing IP traffic.

In an embodiment, the PCEF may include a bandwidth management ("BWM") function ("BWMF").

In an embodiment, the BWMF is configured to (i) obtain packet-based measurements from the IP traffic, (ii) obtain the performance metrics from the NMCF entity, and (iii) provide the packet-based measurements and performance metrics to the PCEF.

In an embodiment, the PCRF entity is configured to adapt one or more rules of one or more policies for managing quality of service ("QoS") of the IP traffic associated with the at least one WTRU among the plurality of accesses.

In an embodiment, the PCRF entity is configured to adapt one or more rules of one or more policies for managing gating of the IP traffic associated with the at least one WTRU among the plurality of accesses.

In an embodiment, the ANDSF entity is configured to adapt one or more rules of one or more policies for managing connections to the plurality of accesses for the IP traffic associated with the at least one WTRU.

In an embodiment, the ANDSF entity is configured to adapt one or more rules of one or more policies for managing connections to the plurality of accesses for the IP traffic not associated with the at least one WTRU.

In an embodiment, the ANDSF entity is configured to adapt one or more rules of one or more policies for managing selection of the plurality of accesses for the IP traffic associated with the at least one WTRU.

In an embodiment, the ANDSF entity is configured to adapt one or more rules of one or more policies for managing discovery of the plurality of accesses for the IP traffic associated with the at least one WTRU.

In an embodiment, the ANDSF entity is configured to adapt one or more rules of one or more policies so as to cause dynamic adaptation of bearers for the IP traffic associated with the at least one WTRU.

In an embodiment, adaptation of bearers may include any of establishment, modification and release of the bearers.

In an embodiment, any of the ANDSF and PCRF entities is configured to provide one or more of the adapted rules to the at least one WTRU.

In an embodiment, a converged gateway may include a network monitoring and control function ("NMCF") entity configured to obtain performance metrics associated with a plurality of accesses of a network.

In an embodiment, the converged gateway may further include a policy and charging rules function ("PCRF") entity configured to adapt rules of at least one policy for managing internet protocol (IP) traffic associated with a wireless transmit and/or receive unit ("WTRU") among the plurality of accesses based, at least in part, on the performance metrics and a policy for managing bandwidth among the plurality of accesses; and In an embodiment, the converged gateway may further include a policy and charging enforcement function ("PCEF") configured to manage IP traffic associated with the WTRU among the plurality of accesses responsive to the rules for managing IP traffic.

In an embodiment, a method may include establishing a connection between a policy charging and rules function ("PCRF") and an access network discovery and selection function ("ANDSF") of a network may include multiple accesses;

In an embodiment, the method may further include obtaining information about the network ("network information"), at the PCRF, via the connection between the ANDSF and the PCRF; and In an embodiment, the method may further include generating based, at least in part, on the network information obtained at the PCRF, policy-configuration information for configuring a policy for facilitating flow management across the multiple accesses.

In an embodiment, the method may further include sending the policy-configuration information to any of the ANDSF, a wireless transmit and/or receive unit ("WTRU"), and a policy and charging enforcement function ("PCEF").

In an embodiment, the method may further include obtaining, at the PCRF via the connection between the ANDSF and PCRF, information defining the policy ("policy definition information"), wherein generating policy-configuration information may include: generating the policy-configuration information based, at least in part, on the network information and the obtained by the PCRF and the policy-definition information.

In an embodiment, establishing a connection between a PCRF and an ANDSF may include establishing a connection between the PCRF and the ANDSF in accordance with any of a Diameter protocol, a Diameter application and a protocol based on the Diameter protocol.

In an embodiment, establishing a connection between a PCRF and an ANDSF may include establishing a connection between the PCRF and the ANDSF in accordance with a device management ("DM") protocol.

In an embodiment, the DM protocol may include a DM protocol in accordance with an open-mobile alliance ("OMA") DM protocol.

In an embodiment, the obtained network information may include any of static and dynamically updated network information garnered from policy-definition information, access network discovery information, network status information, subscriber information and traffic-identification information.

In an embodiment, the obtained network information may include network information detected by at least one WTRU.

In an embodiment, the WTRU detected network information is obtained by the ANDSF via at least one connection between the ANDSF and the at least one WTRU, respectively.

In an embodiment, the at least one connection between the ANDSF and the WTRU may include a connection in accordance with an OMA DM protocol.

In an embodiment, the WTRU detected network information obtained by the ANDSF from a WTRU may include any of the policy-definition information, access network discovery information, network status information and traffic-identification information.

In an embodiment, the network status information may include any of a measurement and metric associated with congestion detected by (i) the WTRU for any of a cell, access point and PDN; and (ii) an application.

In an embodiment, the information available to the ANDSF may include information obtained by the ANDSF from a repository of subscriber information.

In an embodiment, the repository of subscriber information may include any of a home location register ("HLR"), visitor location register ("VLR"), home subscriber server ("HSS") and subscriber profile repository ("SPR").

In an embodiment, the policy-definition information may include information related to any of an inter-system mobility policy and an inter-system routing policy.

In an embodiment, obtaining network information, at the PCRF, via the connection between the ANDSF and the PCRF may include: receiving the network information responsive to a request from the PCRF.

In an embodiment, obtaining network information, at the PCRF, via the connection between the ANDSF and the PCRF may include: receiving the network information responsive to a synchronization routing among any of the PCRF, ANDSF and WTRU.

In an embodiment, obtaining network information, at the PCRF, via the connection between the ANDSF and the PCRF may include: receiving the network information responsive to an event detected at the ANDSF.

In an embodiment, the method may further include receiving an event notification, wherein the event notification may include the network information, and wherein obtaining network information, at the PCRF, via the connection between the ANDSF and the PCRF may include: extracting the network information from the event notification.

In an embodiment, the PCRF subscribes to an event report for generating the event notification.

In an embodiment, the event may include any of a policy update from the ANDSF, PLMN change, QoS change, IFOM routing change, access change, access link condition, WTRU IP address change, location update, application detection, and traffic-identification detection.

In an embodiment, obtaining network information, at the PCRF, via the connection between the ANDSF and the PCRF may include: receiving the network information without a request for the network information.

In an embodiment, obtaining policy-definition information, at the PCRF, via the connection between the ANDSF and the PCRF may include: receiving the policy-definition information responsive to a request from the PCRF.

In an embodiment, obtaining policy-definition information, at the PCRF, via the connection between the ANDSF and the PCRF may include: receiving the policy-definition information responsive to a synchronization routing among any of the PCRF, ANDSF and WTRU.

In an embodiment, obtaining policy-definition information, at the PCRF, via the connection between the ANDSF and the PCRF may include: receiving the policy-definition information responsive to an event detected at the ANDSF.

In an embodiment, the method may further include receiving an event notification, wherein the event notification may include the policy-definition information, and wherein obtaining policy-definition information, at the PCRF, via the connection between the ANDSF and the PCRF may include: extracting the policy-definition information from the event notification.

In an embodiment, the PCRF subscribes to an event report for generating the event notification.

In an embodiment, the event may include any of a policy update from the ANDSF, PLMN change, QoS change, IFOM routing change, access change, access link condition, WTRU IP address change, location update, application detection, and traffic-identification detection.

In an embodiment, obtaining policy-definition information, at the PCRF, via the connection between the ANDSF and the PCRF may include: receiving the policy-definition information without a request for the policy-definition information.

In an embodiment, the method may further include using the policy-configuration information at any of the WTRU and PCEF to perform IP flow management ("IFOM") across the multiple accesses.

In an embodiment, the network information may include network information aggregated by the ANDSF.

In an embodiment, the obtained network information may include network information detected by a plurality of WTRUs, and wherein the WTRU detected network information is aggregated by the ANDSF.

In an embodiment, the obtained network information may include network information detected by a plurality of WTRUs and network information detected by a network monitoring and control function ("NMCF"), and wherein the WTRU-detected and NMCF-detected network information is aggregated by the ANDSF.

In an embodiment, a method may include establishing a connection between a PCRF and an ANDSF of a network may include multiple accesses.

In an embodiment, the method may further include establishing a connection between the PCRF and a WTRU via the connection between the PCRF and ANDSF.

In an embodiment, the method may further include obtaining network information from the WTRU at the PCRF.

In an embodiment, the method may further include generating, based, at least in part, on the network information obtained at the PCRF, policy-configuration information for configuring a policy for facilitating flow management across the multiple accesses.

In an embodiment, the method may further include sending the policy-configuration information to any of the ANDSF, a wireless transmit and/or receive unit ("WTRU"), and a policy and charging enforcement function ("PCEF").

In an embodiment, the method may further include obtaining policy definition information at the PCRF via the connection between the ANDSF and PCRF, wherein generating policy-configuration information may include generating the policy-configuration information based, at least in part, on the network information and the obtained by the PCRF and the policy-definition information.

In an embodiment, a method may include establishing a connection among a WTRU and a PCRF and an ANDSF of a network may include multiple accesses.

In an embodiment, the method may further include synchronizing network and policy-definition information among the WTRU and a PCRF and an ANDSF.

In an embodiment, the method may further include generating, based, at least in part, on the network information obtained at the PCRF, policy-configuration information for configuring a policy for facilitating flow management across the multiple accesses.

In an embodiment, the method may further include sending the policy-configuration information to any of the ANDSF, a wireless transmit and/or receive unit ("WTRU"), and a policy and charging enforcement function ("PCEF").

In an embodiment, the method may further include obtaining policy definition information, at the PCRF via the connection between the ANDSF and PCRF, wherein generating policy-configuration information may include generating the policy-configuration information based, at least in part, on the network information and the obtained by the PCRF and the policy-definition information.

In an embodiment, a method may include establishing a connection between a PCRF and an ANDSF of a network may include multiple accesses.

In an embodiment, the method may further include obtaining network information from a WTRU at the PCRF.

In an embodiment, the method may further include generating, based, at least in part, on the network information obtained at the PCRF, policy-configuration information for configuring a policy for facilitating flow management across the multiple accesses.

In an embodiment, the method may further include sending the policy-configuration information to any of the ANDSF, a wireless transmit and/or receive unit ("WTRU"), and a policy and charging enforcement function ("PCEF").

In an embodiment, the method may further include obtaining policy definition information at the PCRF via the connection between the ANDSF and PCRF, wherein generating policy-configuration information may include generating the policy-configuration information based, at least in part, on the network information and the obtained by the PCRF and the policy-definition information.

In an embodiment, the method may further include any of the network information and the policy information is maintained in an ANDSF Managed Object ("MO").

In an embodiment, the method may further include obtaining other network information at the PCRF from any of the a WTRU, PCEF, a bearer binding and event reporting function ("BBERF"), subscription profile repository ("SPR"), a traffic detection function ("TDF"), an application function ("AF"), a base station, and a network monitoring and control function ("NMCF").

In an embodiment, the network information obtained from any of the WTRU, PCEF, BBERF, SPR, TDF, AF, base station, and NMCF may include any of (i) perceived congestion via any of a cell, an access point and PDN; (ii) detected applications; and (iii) detected flows.

In an embodiment, the policy-configuration information may include policy-configuration information for configuring an ANDSF MO managed by the ANDSF.

In an embodiment, the policy-configuration information may include: any of (i) information identifying an access of the multiple accesses being used for a connection of a WTRU; and (ii) information identifying an IP flow associated with the connection.

In an embodiment, the method may further include receiving, from the ANDSF, a request for the policy-configuration information, wherein sending the policy-related information may include: sending the requested policy-related information responsive to the request.

In an embodiment, the method may further include detecting, at the PCRF, an event corresponding to an event trigger for triggering the PCRF to notify the ANDSF of the event; and sending, from the PCRF to the ANDSF, a notification of the event, wherein sending policy-configuration information may include: sending the requested policy-configuration information responsive to the notification of the event.

In an embodiment, the method may further include detecting, at the PCRF, an event corresponding to an event trigger for triggering the PCRF to send to the ANDSF the policy-configuration information, wherein sending policy-configuration information may include: sending the requested policy-related information responsive to the detected event.

In an embodiment, a method for discovering an ANDSF serving a WTRU may include configuring a PCRF with an address of each of a plurality of AND SFs; receiving, at the PCRF from a PCEF, information related to a connection of the WTRU obtained when the WTRU establishes a bearer; and querying one or more of the plurality of ANDSFs to determine the ANDSF serving the WTRU.

In an embodiment, a method for discovering an ANDSF serving a WTRU may include configuring a PCRF with an address of each of a plurality of AND SFs; receiving, at the PCRF from a PCEF, information related to a connection of the WTRU obtained by the PCEF when the WTRU establishes a bearer; limiting a search of the plurality of ANDSFs to a subset of the plurality of ANDSFs based on the received information related to a connection of the WTRU; and querying the subset of the plurality of ANDSFs to determine the ANDSF serving the WTRU.

In an embodiment, a method for discovering an ANDSF serving a WTRU may include: configuring an SPR with an address of each of a plurality of ANDSFs; obtaining, at the PCRF from the SPR, information related to the WTRU obtained by the SPR when the WTRU establishes a bearer; querying the SPR for the address of at least one ANDSF of the plurality of ANDSFs; and querying, based on the address of at least one ANDSF, the at least one ANDSF to determine the ANDSF serving the WTRU.

In an embodiment, a method for discovering an ANDSF serving a WTRU may include: configuring a SPR with an address of each of a plurality of ANDSFs; obtaining, at the PCRF from the SPR, information related to the WTRU obtained by the SPR when the WTRU establishes a bearer;

limiting a search of the plurality of ANDSFs to a subset of the plurality of ANDSFs based on the obtained information related to the WTRU; querying the SPR for the address of at least one ANDSF of the subset of the plurality of ANDSFs; and querying, based on the address of at least one ANDSF, the at least one ANDSF to determine the ANDSF serving the WTRU.

In an embodiment, a method may include obtaining, at a PCRF, a metric associated with at least one link formed in a network may include multiple accesses; and responsive to the metric, configuring a policy directed to any of inter-system mobility and inter-system routing.

In an embodiment, configuring a policy directed to any of inter-system mobility and inter-system routing may include: generating policy-configuration information based, at least in part, on the metric.

In an embodiment, the method may further include establishing a connection between the PCRF and an access network discovery and selection function ("ANDSF"); and sending the policy-configuration information from the PCRF to the ANDSF.

In an embodiment, the method may further include establishing a connection between the PCRF and the ANDSF; and sending, from the PCRF to the ANDSF, policy-configuration information based, at least in part, on the metric.

In an embodiment, the policy-configuration information may include any of a rule, parameter, setting, attribute, variable, expression, characteristic, directive, command, subscription and event trigger for implementing the policy.

In an embodiment, the policy-configuration information may include: any of (i) information identifying an access of the multiple accesses being used for a connection of a "WTRU"; and (ii) information identifying an IP flow associated with the connection.

In an embodiment, the method may further include receiving the configuration information at the ANDSF; and storing the configuration information in memory.

In an embodiment, the memory may include a data structure, and wherein storing the configuration information in memory may include: storing the configuration information in the data structure.

In an embodiment, the data structure may include an ANDSF management object ("ANDSF MO"), and wherein storing the policy-configuration information in the data structure may include: storing the policy-configuration information in the ANDSF MO.

In an embodiment, the method may further include obtaining, at the ANDSF from the WTRU, any of updated location and IP flow mobility ("IFOM") information.

In an embodiment, the method may further include managing IFOM across the multiple accesses responsive to the configured policy.

In an embodiment, at least one link may include a link of a data path between a WTRU and a data source In an embodiment, the multiple accesses may include respective radio access technologies ("RATs"), and wherein the at least one link may include: at least one link of the multiple RATs.

In an embodiment, obtaining information associated with a condition of a network may include: receiving the information from a PCEF.

In an embodiment, obtaining information associated with a condition of a network may include: receiving the information via a policy and charging enforcement function PCEF.

In an embodiment, obtaining information associated with a condition of a network may include: receiving the information from an ANDSF.

In an embodiment, obtaining information associated with a condition of a network may include: receiving the information from a WTRU via an ANDSF.

In an embodiment, obtaining information associated with a condition of a network may include: receiving the information from a NMCF.

In an embodiment, obtaining information associated with a condition of a network may include: establishing an interface between the PCRF and AND SF.

In an embodiment, the policy may include any of a policy and charging control ("PCC") rule, quality-of-service ("QoS") control rule, IP-CAN bearer and/or session policy information rule, usage monitoring control information rule, an IFOM routing rule and an application detection and control ("ADC") rule.

In an embodiment, managing a policy associated with IFOM across the multiple accesses may include: generating, responsive to the information associated with a condition of a network, a rule for enforcing the policy; and sending the rule to a PCEF.

In an embodiment, managing a policy associated with IFOM across the multiple accesses may include: generating, responsive to the information associated with a condition of a network, a rule for enforcing the policy; and sending the rule to a PCEF.

In an embodiment, the metric may include a measure of any of congestion, connectivity, loading and latency associated with the at least one link.

In an embodiment, an apparatus may be configured to perform any of the above methods.

In an embodiment, a system may be configured to perform be configured to perform any of the above methods.

In an embodiment, a converged gateway may be configured to perform be configured to perform any of the above methods.

In an embodiment, a tangible computer readable storage medium having stored thereon computer executable instructions for performing any of the above methods.

Variations of the method, apparatus and system described above are possible without departing from the scope of the invention. In view of the wide variety of embodiments that can be applied, it should be understood that the illustrated embodiments are exemplary only, and should not be taken as limiting the scope of the following claims. For instance, in the exemplary embodiments described herein include handheld devices, which may include or be utilized with any appropriate voltage source, such as a battery and the like, providing any appropriate voltage.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the exemplary embodiments are not limited to the above-mentioned memories and that other platforms and memories may support the described methods.

No element, act, or instruction used in the description of the present application should be construed as critical or essential to the invention unless explicitly described as such. Also, as used herein, each of the articles "a" and "an" are intended to include one or more items. Where only one item is intended, the terms "a single" or similar language is used. Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method comprising:
   obtaining, at a policy and charging rules function (PCRF) element, user plane congestion information associated with a radio access network (RAN); and
   adapting, at a network element, a bearer used for transporting internet protocol (IP) traffic associated with a wireless transmit and/or receive unit (WTRU) based, at least in part, on the user plane congestion information and a rule specified by the PCRF element for enforcing a Quality of Service (QoS) policy.

2. The method of claim 1, further comprising: adapting, at the PCRF element, the rule for enforcing a QoS policy based, at least in part, on any of (i) precedence of the IP traffic, (ii) subscription information associated with one or more WTRUs, and (iii) whether the WTRU has connections to a plurality of accesses.

3. The method of claim 1, further comprising: adapting, at the PCRF element, the rule for enforcing a QoS policy with any of a QoS parameter and a service data flow (SDF) filter to cause dynamic adaptation of the bearer.

4. The method of claim 1, wherein adaptation of the bearer comprises any of establishment, modification and release of the bearer.

5. The method of claim 1, further comprising: managing a data flow of the IP traffic among first and second accesses, wherein the first access comprises the RAN.

6. The method of claim 1, further comprising: aggregating bandwidth from first and second accesses for transmission of the IP traffic, wherein the first access comprises the RAN.

7. The method of claim 1, further comprising:
   gating and/or traffic shaping at least a portion of the IP traffic at one or both of (i) a first access, and (ii) a second access,
   wherein the first access comprises the RAN.

8. The method of claim 1, wherein obtaining user plane congestion information comprises: receiving the user plane congestion information at the PCRF element from the information collection and reporting element.

9. The method of claim 1, further comprising:
   responsive to the user plane congestion information satisfying a threshold,
   re-routing, to another RAN, any of (i) a packet of the IP traffic, and (ii) a packet of IP traffic associated with other WTRUs.

10. The method of claim 1, further comprising: selectively gating and/or traffic shaping the IP traffic, at the network element, based, at least in part, on a rule specified by the PCRF element for enforcing a traffic management policy.

11. The method of claim 10, wherein selectively gating and/or traffic shaping the IP traffic comprises:
    performing flow identification of a flow of the IP traffic;
    performing flow filtering of the identified flow; and
    dropping at least one packet of the filtered flow based, at least in part, on the rule specified by the PCRF element for enforcing a traffic management policy; or
    routing at least one packet of the filtered flow to an access selected from a plurality of accesses based, at least in part, on the rule specified by the PCRF element for enforcing a traffic management policy.

12. The method of claim 11, wherein adapting a bearer comprises: releasing the bearer at the network element.

13. The method of claim 1, wherein adapting a bearer comprises: modifying the bearer at the network element, and wherein modifying the bearer comprises: adapting the bearer based on any of a precedence, QoS parameter and SDF filter specified by the rule for enforcing a QoS policy.

14. A system comprising:
a policy and charging rules function (PCRF) element configured to obtain user plane congestion information associated with a radio access network (RAN); and
a network element configured to adapt a bearer used for transporting internet protocol (IP) traffic associated with a wireless transmit and/or receive unit (WTRU) based, at least in part, on the user plane congestion information and a rule specified by the PCRF element for enforcing a Quality of Service (QoS) policy.

15. The system of claim 14, wherein the PCRF element is configured to adapt the rule for enforcing a QoS policy based, at least in part, on any of (i) precedence of the IP traffic, (ii) subscription information associated with one or more WTRUs, and (iii) whether the WTRU has connections to a plurality of accesses.

16. The system of claim 14, wherein the PCRF element is configured to adapt the rule for enforcing a QoS policy with any of a QoS parameter and a service data flow (SDF) filter to cause dynamic adaptation of the bearer.

17. The system of claim 14, wherein adaptation of the bearer comprises any of establishment, modification and release of the bearer.

18. The system of claim 14, wherein the network element is configured to manage a data flow of the IP traffic among first and second accesses, wherein the first access comprises the RAN.

19. The system of claim 14, wherein the network element is configured to aggregate bandwidth from first and second accesses for transmission of the IP traffic, wherein the first access comprises the RAN.

20. The system of claim 14, wherein the network element is configured to:
gate and/or traffic shape at least a portion of the IP traffic at one or both of (i) a first access, and (ii) a second access, wherein the first access comprises the RAN.

21. The system of claim 14, wherein the PCRF element is configured to receive the user plane congestion information from an information collection and reporting element.

22. The system of claim 14, wherein the network element is configured to:
responsive to the user plane congestion information satisfying a threshold,
re-route, to another RAN, any of (i) a packet of the IP traffic, and (ii) a packet of IP traffic associated with other WTRUs.

23. The system of claim 14, wherein the network element is configured to selectively gate and/or traffic shape the IP traffic based, at least in part, on a rule specified by the PCRF element for enforcing a traffic management policy.

24. The system of claim 23, wherein the network element is configured to:
perform flow identification of a flow of the IP traffic;
perform flow filtering of the identified flow; and
drop at least one packet of the filtered flow based, at least in part, on the rule specified by the PCRF element for enforcing a traffic management policy; or
routing at least one packet of the filtered flow to an access selected from a plurality of accesses based, at least in part, on the rule specified by the PCRF element for enforcing a traffic management policy.

25. The system of claim 24, wherein the network element is configured to release the bearer.

26. The system of claim 14, wherein the network element is configured to adapt the bearer based on any of a precedence, QoS parameter and SDF filter specified by the rule for enforcing a QoS policy.

27. The method of claim 1, wherein the user plane congestion information is obtained via a standardized reference point at the PCRF element.

28. The system of claim 14, wherein the user plane congestion information is obtained via a standardized reference point at the PCRF element.

* * * * *